US010033944B2

(12) United States Patent
Högasten et al.

(10) Patent No.: US 10,033,944 B2
(45) Date of Patent: Jul. 24, 2018

(54) TIME SPACED INFRARED IMAGE ENHANCEMENT

(71) Applicant: FLIR Systems, Inc., Wilsonville, OR (US)

(72) Inventors: Nicholas Högasten, Santa Barbara, CA (US); Dwight Dumpert, Goleta, CA (US); Theodore R. Hoelter, Goleta, CA (US); Jeffrey S. Scott, Goleta, CA (US); Katrin Strandemar, Rimbo (SE); Mark Nussmeier, Goleta, CA (US); Eric A. Kurth, Santa Barbara, CA (US); Pierre Boulanger, Goleta, CA (US); Barbara Sharp, Santa Barbara, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 15/269,905

(22) Filed: Sep. 19, 2016

(65) Prior Publication Data
US 2017/0078590 A1 Mar. 16, 2017

Related U.S. Application Data

(63) Continuation of application No. 14/138,040, filed on Dec. 21, 2013, now Pat. No. 9,451,183, which is a (Continued)

(51) Int. Cl.
*G06K 9/40* (2006.01)
*H04N 5/33* (2006.01)
(Continued)

(52) U.S. Cl.
CPC ............... *H04N 5/33* (2013.01); *G06K 9/40* (2013.01); *H04N 5/2257* (2013.01); *H04N 5/262* (2013.01); *H04N 5/265* (2013.01)

(58) Field of Classification Search
CPC ...... H04N 5/33; H04N 5/2256; H04N 5/2354; H04N 5/23293; H04N 5/262; H04N 5/332;
(Continued)

(56) References Cited

U.S. PATENT DOCUMENTS 2,764,055 A 9/1956 Clemens et al.
5,128,796 A 7/1992 Barney et al.
(Continued)

FOREIGN PATENT DOCUMENTS

CA 2764055 7/2012
CN 2874947 2/2007
(Continued)

OTHER PUBLICATIONS

Darpa, "Broad Agency Announcement Low Cost Thermal Imager Manufacturing (LCTI-M)", Microsystems Technology Office, DARPA-BAA-11-27, Jan. 24, 2011. pp. 1-42, Arlington, VA.
(Continued)

*Primary Examiner* — Ali Bayat
(74) *Attorney, Agent, or Firm* — Haynes and Boone, LLP

(57) ABSTRACT

Techniques using small form factor infrared imaging modules are disclosed. An imaging system may include visible spectrum imaging modules, infrared imaging modules, and other modules to interface with a user and/or a monitoring system. Visible spectrum imaging modules and infrared imaging modules may be positioned in proximity to a scene that will be monitored while visible spectrum-only images of the scene are either not available or less desirable than infrared images of the scene. Imaging modules may be configured to capture images of the scene at different times. Image analytics and processing may be used to generate combined images with infrared imaging features and increased detail and contrast. Triple fusion processing,
(Continued)

including selectable aspects of non-uniformity correction processing, true color processing, and high contrast processing, may be performed on the captured images. Control signals based on the combined images may be presented to a user and/or a monitoring system.

19 Claims, 38 Drawing Sheets

Related U.S. Application Data continuation-in-part of application No. 14/101,245, filed on Dec. 9, 2013, now Pat. No. 9,706,139, which is a continuation of application No. PCT/US2012/041744, filed on Jun. 8, 2012, said application No. 14/138,040 is a continuation-in-part of application No. 14/099,818, filed on Dec. 6, 2013, now Pat. No. 9,723,227, which is a continuation of application No. PCT/US2012/041749, filed on Jun. 8, 2012, said application No. 14/138,040 is a continuation-in-part of application No. 14/101,258, filed on Dec. 9, 2013, now Pat. No. 9,723,228, which is a continuation of application No. PCT/US2012/041739, filed on Jun. 8, 2012, said application No. 14/138,040 is a continuation-in-part of application No. 13/437,645, filed on Apr. 2, 2012, now Pat. No. 9,171,361, which is a continuation-in-part of application No. 13/105,765, filed on May 11, 2011, now Pat. No. 8,565,547, and a continuation-in-part of application No. 12/766,739, filed on Apr. 23, 2010, now Pat. No. 8,520,970, said application No. 13/105,765 is a continuation of application No. PCT/EP2011/056432, filed on Apr. 21, 2011, and a continuation-in-part of application No. 12/766,739, filed on Apr. 23, 2010, now Pat. No. 8,520,970, said application No. PCT/EP2011/056432 is a continuation-in-part of application No. 12/766,739, filed on Apr. 23, 2010, now Pat. No. 8,520,970, said application No. 14/138,040 is a continuation-in-part of application No. 12/477,828, filed on Jun. 3, 2009, now Pat. No. 8,749,635, and a continuation-in-part of application No. 14/029,683, filed on Sep. 17, 2013, now Pat. No. 9,208,542, which is a continuation-in-part of application No. 13/622,178, filed on Sep. 18, 2012, now Pat. No. 9,237,284, which is a continuation-in-part of application No. 13/529,772, filed on Jun. 21, 2012, now Pat. No. 8,780,208, which is a continuation of application No. 12/396,340, filed on Mar. 2, 2009, now Pat. No. 8,208,026, said application No. 14/138,040 is a continuation-in-part of application No. 14/029,716, filed on Sep. 17, 2013, now Pat. No. 9,235,876, which is a continuation-in-part of application No. 13/622,178, filed on Sep. 18, 2012, now Pat. No. 9,237,284, which is a continuation-in-part of application No. 13/529,772, filed on Jun. 21, 2012, now Pat. No. 8,780,208, which is a continuation of application No. 12/396,340, filed on Mar. 2, 2009, now Pat. No. 8,208,026.

(60) Provisional application No. 61/792,582, filed on Mar. 15, 2013, provisional application No. 61/793,952, filed on Mar. 15, 2013, provisional application No. 61/746,069, filed on Dec. 26, 2012, provisional application No. 61/746,074, filed on Dec. 26, 2012, provisional application No. 61/656,889, filed on Jun. 7, 2012, provisional application No. 61/545,056, filed on Oct. 7, 2011, provisional application No. 61/495,873, filed on Jun. 10, 2011, provisional application No. 61/495,879, filed on Jun. 10, 2011, provisional application No. 61/495,888, filed on Jun. 10, 2011, provisional application No. 61/473,207, filed on Apr. 8, 2011, provisional application No. 61/748,018, filed on Dec. 31, 2012, provisional application No. 61/745,489, filed on Dec. 21, 2012, provisional application No. 61/745,504, filed on Dec. 21, 2012.

(51) Int. Cl.
*H04N 5/262* (2006.01)
*H04N 5/225* (2006.01)
*H04N 5/265* (2006.01)

(58) Field of Classification Search
CPC ...... H04N 5/225; H04N 5/2353; H04N 5/365; H04N 5/3651; H04N 9/045; G02B 23/12; G02B 23/18; G02B 23/02; G02B 23/00; G01J 2003/2806; G01J 2003/2813
See application file for complete search history.

(56) References Cited

U.S. PATENT DOCUMENTS

| | | | |
|---|---|---|---|
| 6,081,612 A | 6/2000 | Gutkowicz-Krusin et al. | |
| 6,348,951 B1 | 2/2002 | Kim | |
| 6,396,543 B1 | 5/2002 | Shin et al. | |
| 6,424,843 B1 | 7/2002 | Reitmaa et al. | |
| 6,444,983 B1 | 9/2002 | McManus et al. | |
| 6,633,231 B1 | 10/2003 | Okamoto et al. | |
| 6,681,120 B1 | 1/2004 | Kim, II | |
| 6,707,044 B2 | 3/2004 | Lannestedt et al. | |
| 6,759,949 B2 | 7/2004 | Miyahara | |
| 6,792,136 B1 | 9/2004 | Niesen | |
| 6,883,054 B2 | 4/2005 | Yamaguchi et al. | |
| 6,911,652 B2 | 6/2005 | Walkenstein | |
| 7,030,378 B2 | 4/2006 | Allen et al. | |
| 7,050,107 B1 | 5/2006 | Frank et al. | |
| D524,785 S | 7/2006 | Huang | |
| 7,084,857 B2 | 8/2006 | Lieberman et al. | |
| 7,147,246 B2 * | 12/2006 | Breed | B60R 21/0152 280/735 |
| 7,208,733 B2 | 4/2007 | Mian et al. | |
| 7,263,379 B1 | 8/2007 | Parkulo et al. | |
| 7,284,921 B2 | 10/2007 | Lapstun et al. | |
| 7,296,747 B2 | 11/2007 | Rohs | |
| 7,305,368 B2 | 12/2007 | Lieberman et al. | |
| 7,321,783 B2 | 1/2008 | Kim, II | |
| 7,333,832 B2 | 2/2008 | Tsai et al. | |
| 7,377,835 B2 | 5/2008 | Parkulo et al. | |
| 7,420,663 B2 | 9/2008 | Wang et al. | |
| 7,453,064 B2 | 11/2008 | Lee | |
| 7,470,902 B1 | 12/2008 | Kraemer et al. | |
| 7,477,309 B2 | 1/2009 | Cuccias | |
| 7,567,818 B2 | 7/2009 | Pylkko | |
| 7,572,077 B2 | 8/2009 | Lapstun et al. | |
| 7,575,077 B2 | 8/2009 | Priepke et al. | |
| 7,579,592 B2 | 8/2009 | Kaushal | |
| 7,595,904 B2 | 9/2009 | Lapstun et al. | |
| 7,620,265 B1 | 11/2009 | Wolff et al. | |
| 7,627,364 B2 | 12/2009 | Sato | |
| 7,697,962 B2 | 4/2010 | Cradick et al. | |
| 7,723,686 B2 | 5/2010 | Hannebauer | |
| 7,725,141 B2 | 5/2010 | Su | |
| 7,728,281 B2 | 6/2010 | Chen | |
| 7,735,974 B2 | 6/2010 | Silverbrook et al. | |
| 7,747,454 B2 | 6/2010 | Bartfeld et al. | |
| 7,760,919 B2 | 7/2010 | Namgoong | |
| 7,761,114 B2 | 7/2010 | Silverbrook et al. | |
| 7,773,870 B2 | 8/2010 | Naruse | |
| 7,801,733 B2 | 9/2010 | Lee et al. | |
| 7,810,733 B2 | 10/2010 | Silverbrook et al. | |

(56) References Cited

U.S. PATENT DOCUMENTS

| | | | |
|---|---|---|---|
| 7,872,574 B2 | 1/2011 | Betts et al. | |
| 7,900,842 B2 | 3/2011 | Silverbrook et al. | |
| 7,903,152 B2 | 3/2011 | Kim, II | |
| 7,947,222 B2 | 5/2011 | Bae et al. | |
| 7,960,700 B2 | 6/2011 | Craig et al. | |
| 7,994,480 B2 * | 8/2011 | Johnson | G01C 3/08 250/332 |
| 8,049,163 B1 | 11/2011 | Granneman et al. | |
| 8,153,980 B1 | 4/2012 | Brady et al. | |
| 8,189,050 B1 | 5/2012 | Hughes et al. | |
| 8,275,413 B1 | 9/2012 | Fraden et al. | |
| 8,305,577 B2 | 11/2012 | Kivioja et al. | |
| 8,345,226 B2 | 1/2013 | Zhang | |
| 8,374,438 B1 | 2/2013 | Wagner | |
| 8,379,123 B2 * | 2/2013 | Townsend | H04N 9/045 348/294 |
| 8,428,385 B2 | 4/2013 | Whiteside et al. | |
| 8,537,343 B2 | 9/2013 | Zhang | |
| 8,781,420 B2 | 7/2014 | Schlub et al. | |
| 8,825,112 B1 | 9/2014 | Fraden et al. | |
| 8,836,793 B1 | 9/2014 | Kriesel et al. | |
| 9,438,825 B2 * | 9/2016 | Mumaw | H04N 5/33 |
| 2001/0042825 A1 | 11/2001 | Young | |
| 2002/0006337 A1 | 1/2002 | Kimura et al. | |
| 2002/0074499 A1 | 6/2002 | Butler | |
| 2002/0122036 A1 | 9/2002 | Sasaki | |
| 2002/0135571 A1 | 9/2002 | Klocek et al. | |
| 2002/0140542 A1 | 10/2002 | Prokoski et al. | |
| 2002/0149600 A1 | 10/2002 | Van Splunter et al. | |
| 2003/0007193 A1 | 1/2003 | Sato et al. | |
| 2003/0060108 A1 | 3/2003 | Chu et al. | |
| 2003/0093805 A1 | 5/2003 | Gin | |
| 2003/0112871 A1 | 6/2003 | Demos | |
| 2003/0122957 A1 | 7/2003 | Emme | |
| 2003/0146975 A1 | 8/2003 | Joung et al. | |
| 2003/0198400 A1 | 10/2003 | Alderson et al. | |
| 2003/0223623 A1 | 12/2003 | Gutta et al. | |
| 2004/0047518 A1 | 3/2004 | Tiana | |
| 2004/0101298 A1 | 5/2004 | Mandelbaum et al. | |
| 2004/0127156 A1 | 7/2004 | Park | |
| 2004/0128070 A1 | 7/2004 | Schmidt et al. | |
| 2004/0157612 A1 | 8/2004 | Kim, II | |
| 2004/0165788 A1 | 8/2004 | Perez et al. | |
| 2004/0169860 A1 | 9/2004 | Jung et al. | |
| 2004/0200961 A1 | 10/2004 | Parrish et al. | |
| 2004/0207036 A1 | 10/2004 | Ikeda | |
| 2004/0211907 A1 | 10/2004 | Wellman et al. | |
| 2004/0256561 A1 | 12/2004 | Beuhler et al. | |
| 2005/0030314 A1 | 2/2005 | Dawson | |
| 2005/0067852 A1 | 3/2005 | Jeong | |
| 2005/0068333 A1 | 3/2005 | Nakahashi et al. | |
| 2005/0089241 A1 | 4/2005 | Kawanishi et al. | |
| 2005/0093890 A1 | 5/2005 | Baudisch | |
| 2005/0110803 A1 | 5/2005 | Sugimura | |
| 2005/0138569 A1 | 6/2005 | Baxter et al. | |
| 2005/0169655 A1 | 8/2005 | Koyama et al. | |
| 2005/0184993 A1 | 8/2005 | Ludwin et al. | |
| 2005/0213813 A1 | 9/2005 | Lin et al. | |
| 2005/0213853 A1 | 9/2005 | Maier et al. | |
| 2005/0219249 A1 | 10/2005 | Xie et al. | |
| 2005/0247867 A1 | 11/2005 | Volgt et al. | |
| 2005/0248912 A1 | 11/2005 | Kang et al. | |
| 2005/0265688 A1 | 12/2005 | Kobayashi | |
| 2005/0270784 A1 | 12/2005 | Hahn et al. | |
| 2005/0277447 A1 | 12/2005 | Buil et al. | |
| 2006/0039686 A1 | 2/2006 | Soh et al. | |
| 2006/0060984 A1 | 3/2006 | Wakabayashi et al. | |
| 2006/0077246 A1 | 4/2006 | Kawakami et al. | |
| 2006/0097172 A1 | 5/2006 | Park | |
| 2006/0120712 A1 | 6/2006 | Kim | |
| 2006/0132642 A1 | 6/2006 | Hosaka et al. | |
| 2006/0140501 A1 | 6/2006 | Tadas | |
| 2006/0147191 A1 | 7/2006 | Kim | |
| 2006/0154559 A1 | 7/2006 | Yoshida | |
| 2006/0210249 A1 | 9/2006 | Seto | |
| 2006/0234744 A1 | 10/2006 | Sung et al. | |
| 2006/0240867 A1 | 10/2006 | Wang et al. | |
| 2006/0268110 A1 | 11/2006 | Koike et al. | |
| 2006/0268112 A1 | 11/2006 | Ikeda | |
| 2006/0279758 A1 | 12/2006 | Myoki | |
| 2006/0285907 A1 | 12/2006 | Kang et al. | |
| 2006/0290796 A1 | 12/2006 | Nikkanen et al. | |
| 2007/0004449 A1 | 1/2007 | Sham | |
| 2007/0019077 A1 | 1/2007 | Park | |
| 2007/0019099 A1 | 1/2007 | Lieberman et al. | |
| 2007/0019103 A1 | 1/2007 | Lieberman et al. | |
| 2007/0033309 A1 | 2/2007 | Kuwabara et al. | |
| 2007/0034800 A1 | 2/2007 | Huang | |
| 2007/0052616 A1 | 3/2007 | Yoon | |
| 2007/0057764 A1 | 3/2007 | Sato et al. | |
| 2007/0103479 A1 | 5/2007 | Kim et al. | |
| 2007/0103742 A1 | 5/2007 | Ernandes et al. | |
| 2007/0120879 A1 | 5/2007 | Kanade et al. | |
| 2007/0132858 A1 | 6/2007 | Chiba et al. | |
| 2007/0139739 A1 | 6/2007 | Kim et al. | |
| 2007/0159524 A1 | 7/2007 | Kim et al. | |
| 2007/0183657 A1 | 8/2007 | Kidono et al. | |
| 2007/0189583 A1 | 8/2007 | Shimada et al. | |
| 2007/0211965 A1 | 9/2007 | Helbing et al. | |
| 2007/0222798 A1 | 9/2007 | Kuno | |
| 2007/0248284 A1 | 10/2007 | Bernsen et al. | |
| 2007/0274541 A1 | 11/2007 | Uetake et al. | |
| 2007/0285439 A1 | 12/2007 | King et al. | |
| 2007/0286517 A1 | 12/2007 | Paik et al. | |
| 2007/0299226 A1 | 12/2007 | Park et al. | |
| 2008/0002960 A1 | 1/2008 | Ito et al. | |
| 2008/0038579 A1 | 2/2008 | Schuisky et al. | |
| 2008/0056612 A1 | 3/2008 | Park et al. | |
| 2008/0079834 A1 | 4/2008 | Chung et al. | |
| 2008/0112012 A1 | 5/2008 | Yokoyama et al. | |
| 2008/0144885 A1 | 6/2008 | Zucherman et al. | |
| 2008/0151056 A1 | 6/2008 | Ahamefula | |
| 2008/0165190 A1 | 7/2008 | Min et al. | |
| 2008/0165342 A1 | 7/2008 | Yoshida et al. | |
| 2008/0170082 A1 | 7/2008 | Kim | |
| 2008/0211916 A1 | 9/2008 | Ono | |
| 2008/0218474 A1 | 9/2008 | Ahn et al. | |
| 2008/0248833 A1 | 10/2008 | Silverbrook et al. | |
| 2008/0266079 A1 | 10/2008 | Lontka | |
| 2008/0278772 A1 | 11/2008 | Silverbrook et al. | |
| 2008/0284880 A1 | 11/2008 | Numata | |
| 2008/0292144 A1 | 11/2008 | Kim | |
| 2008/0297614 A1 | 12/2008 | Lieberman et al. | |
| 2009/0002475 A1 | 1/2009 | Jelley et al. | |
| 2009/0023421 A1 | 1/2009 | Parkulo et al. | |
| 2009/0027525 A1 | 1/2009 | Lin et al. | |
| 2009/0040042 A1 | 2/2009 | Lontka | |
| 2009/0040195 A1 | 2/2009 | Njolstad et al. | |
| 2009/0050806 A1 | 2/2009 | Schmidt et al. | |
| 2009/0052883 A1 | 2/2009 | Lee et al. | |
| 2009/0115877 A1 | 5/2009 | Verdant | |
| 2009/0129700 A1 | 5/2009 | Rother et al. | |
| 2009/0131104 A1 | 5/2009 | Yoon | |
| 2009/0148019 A1 | 6/2009 | Hamada et al. | |
| 2009/0213110 A1 | 8/2009 | Kato et al. | |
| 2009/0215479 A1 | 8/2009 | Karmarkar | |
| 2009/0227287 A1 | 9/2009 | Kotidis | |
| 2009/0238238 A1 | 9/2009 | Hollander et al. | |
| 2009/0278048 A1 | 11/2009 | Choe et al. | |
| 2009/0297062 A1 | 12/2009 | Molne et al. | |
| 2010/0066809 A1 | 3/2010 | Cormack et al. | |
| 2010/0066866 A1 | 3/2010 | Lim | |
| 2010/0090965 A1 | 4/2010 | Birkler | |
| 2010/0090983 A1 | 4/2010 | Challener et al. | |
| 2010/0103141 A1 | 4/2010 | Challener et al. | |
| 2010/0113068 A1 | 5/2010 | Rothschild | |
| 2010/0123078 A1 | 5/2010 | Guinta | |
| 2010/0131268 A1 | 5/2010 | Moeller | |
| 2010/0144387 A1 | 6/2010 | Chou | |
| 2010/0163730 A1 | 7/2010 | Schmidt et al. | |
| 2010/0234067 A1 | 9/2010 | Silverbrook et al. | |
| 2010/0245582 A1 | 9/2010 | Harel | |
| 2010/0245585 A1 | 9/2010 | Fisher et al. | |
| 2010/0245826 A1 | 9/2010 | Lee | |

(56) References Cited

U.S. PATENT DOCUMENTS

| | | |
|---|---|---|
| 2010/0314543 A1 | 12/2010 | Lee et al. |
| 2011/0043486 A1 | 2/2011 | Hagiwara et al. |
| 2011/0063446 A1 | 3/2011 | McMordie et al. |
| 2011/0102599 A1 | 5/2011 | Kwon et al. |
| 2011/0117532 A1 | 5/2011 | Relyea et al. |
| 2011/0121978 A1 | 5/2011 | Schwörer et al. |
| 2011/0122075 A1 | 5/2011 | Seo et al. |
| 2011/0128384 A1 | 6/2011 | Tiscareno et al. |
| 2011/0234864 A1 | 9/2011 | Inokuma |
| 2011/0262053 A1 | 10/2011 | Strandemar |
| 2011/0293179 A1 | 12/2011 | Dikmen et al. |
| 2012/0007987 A1 | 1/2012 | Gaber |
| 2012/0083314 A1 | 4/2012 | Ng et al. |
| 2012/0113299 A1 | 5/2012 | Palik |
| 2012/0140881 A1 | 6/2012 | Yoshimatsu et al. |
| 2012/0147243 A1 | 6/2012 | Townsend et al. |
| 2012/0154596 A1 | 6/2012 | Wajs |
| 2012/0154598 A1 | 6/2012 | Houde-Walter et al. |
| 2012/0169866 A1 | 7/2012 | Schmidt et al. |
| 2012/0184252 A1 | 7/2012 | Hirsch |
| 2012/0211648 A1 | 8/2012 | Linsacum et al. |
| 2012/0224019 A1 | 9/2012 | Samadani et al. |
| 2012/0229650 A1 | 9/2012 | Matthews |
| 2012/0262584 A1 | 10/2012 | Strandemar |
| 2012/0273688 A1 | 11/2012 | Tsai et al. |
| 2012/0274814 A1 | 11/2012 | Wajs |
| 2012/0276954 A1 | 11/2012 | Kowalsky |
| 2012/0287286 A1 | 11/2012 | Nomura |
| 2012/0292518 A1 | 11/2012 | Goldstein |
| 2012/0312976 A1 | 12/2012 | Boulanger et al. |
| 2012/0320086 A1 | 12/2012 | Kasama et al. |
| 2013/0204570 A1 | 8/2013 | Mendelson et al. |
| 2013/0320220 A1 | 12/2013 | Donowsky |
| 2015/0334315 A1 | 11/2015 | Teich et al. |

FOREIGN PATENT DOCUMENTS

| | | |
|---|---|---|
| CN | 2899321 | 5/2007 |
| CN | 201203922 | 3/2009 |
| CN | 101635754 | 1/2010 |
| CN | 201481406 | 5/2010 |
| CN | 201550169 | 8/2010 |
| CN | 101859209 | 10/2010 |
| CN | 201628839 | 11/2010 |
| CN | 101945154 | 1/2011 |
| CN | 102045423 | 5/2011 |
| CN | 102045448 | 5/2011 |
| CN | 102055836 | 5/2011 |
| CN | 201869255 | 6/2011 |
| CN | 201897853 | 7/2011 |
| CN | 102178510 | 9/2011 |
| CN | 202261481 | 5/2012 |
| CN | 102880289 | 1/2013 |
| CN | 202998279 | 6/2013 |
| DE | 102006057431 | 6/2008 |
| EP | 0 398 725 | 11/1990 |
| EP | 0 837 600 | 4/1998 |
| EP | 1 253 779 | 10/2002 |
| EP | 2477391 | 7/2012 |
| JP | 1997275518 | 4/1999 |
| JP | 2004048571 | 2/2004 |
| JP | 2006098098 | 4/2006 |
| JP | 2006105655 | 4/2006 |
| JP | 2007006475 | 1/2007 |
| JP | 2007325842 | 12/2007 |
| JP | 2010181324 | 8/2010 |
| JP | 2012231309 | 11/2012 |
| KR | 20000026757 | 5/2000 |
| KR | 100227582 | 11/2000 |
| KR | 100272582 | 11/2000 |
| KR | 20000073381 | 12/2000 |
| KR | 100285817 | 1/2001 |
| KR | 20010001341 | 1/2001 |
| KR | 20010002462 | 1/2001 |
| KR | 20010010010 | 2/2001 |
| KR | 20010014992 | 2/2001 |
| KR | 20010044756 | 6/2001 |
| KR | 20010050263 | 6/2001 |
| KR | 20010060752 | 7/2001 |
| KR | 20010068202 | 7/2001 |
| KR | 20010070355 | 7/2001 |
| KR | 20010074565 | 8/2001 |
| KR | 20020006967 | 1/2002 |
| KR | 20020044339 | 6/2002 |
| KR | 20020049605 | 6/2002 |
| KR | 20020061406 | 7/2002 |
| KR | 20020061920 | 7/2002 |
| KR | 20020069690 | 9/2002 |
| KR | 20020078469 | 10/2002 |
| KR | 20020083368 | 11/2002 |
| KR | 20020083961 | 11/2002 |
| KR | 20020085124 | 11/2002 |
| KR | 20020085490 | 11/2002 |
| KR | 20020095752 | 12/2002 |
| KR | 20030000332 | 1/2003 |
| KR | 20030007030 | 1/2003 |
| KR | 20030012444 | 2/2003 |
| KR | 20030016607 | 3/2003 |
| KR | 20030024545 | 3/2003 |
| KR | 20030037101 | 5/2003 |
| KR | 20030051140 | 6/2003 |
| KR | 20030055693 | 7/2003 |
| KR | 20030056667 | 7/2003 |
| KR | 20030067116 | 8/2003 |
| KR | 20030085742 | 11/2003 |
| KR | 20030088968 | 11/2003 |
| KR | 20040001684 | 1/2004 |
| KR | 20040001686 | 1/2004 |
| KR | 20040023826 | 3/2004 |
| KR | 20040027692 | 4/2004 |
| KR | 20040033223 | 4/2004 |
| KR | 20040033532 | 4/2004 |
| KR | 20040033986 | 4/2004 |
| KR | 20040033993 | 4/2004 |
| KR | 20040039868 | 5/2004 |
| KR | 20040040296 | 5/2004 |
| KR | 20040042475 | 5/2004 |
| KR | 20040044624 | 5/2004 |
| KR | 100437890 | 6/2004 |
| KR | 20040054416 | 6/2004 |
| KR | 20040058969 | 7/2004 |
| KR | 20040062802 | 7/2004 |
| KR | 20040064855 | 7/2004 |
| KR | 20040066724 | 7/2004 |
| KR | 20040068864 | 8/2004 |
| KR | 20040070840 | 8/2004 |
| KR | 20040076308 | 9/2004 |
| KR | 20040086994 | 10/2004 |
| KR | 20040102386 | 12/2004 |
| KR | 20050008245 | 1/2005 |
| KR | 20050011313 | 1/2005 |
| KR | 20050012505 | 2/2005 |
| KR | 20050014448 | 2/2005 |
| KR | 20050015293 | 2/2005 |
| KR | 20050015526 | 2/2005 |
| KR | 20050015745 | 2/2005 |
| KR | 20050018370 | 2/2005 |
| KR | 20050023950 | 3/2005 |
| KR | 20050028537 | 3/2005 |
| KR | 20050033308 | 4/2005 |
| KR | 101006660 | 9/2005 |
| KR | 1020050095463 | 9/2005 |
| KR | 100547739 | 1/2006 |
| KR | 20060023957 | 3/2006 |
| KR | 1020060019715 | 3/2006 |
| KR | 100645746 | 5/2006 |
| KR | 20060054877 | 5/2006 |
| KR | 20060071220 | 6/2006 |
| KR | 100612890 | 8/2006 |
| KR | 100633792 | 10/2006 |
| KR | 100646966 | 11/2006 |
| KR | 20060119077 | 11/2006 |
| KR | 20060119236 | 11/2006 |
| KR | 20060120318 | 11/2006 |

(56) References Cited

FOREIGN PATENT DOCUMENTS

| | | |
|---|---|---|
| KR | 20060121595 | 11/2006 |
| KR | 100660125 | 12/2006 |
| KR | 100663528 | 1/2007 |
| KR | 100672377 | 1/2007 |
| KR | 20070002590 | 1/2007 |
| KR | 20070005263 | 1/2007 |
| KR | 20070005553 | 1/2007 |
| KR | 20070009380 | 1/2007 |
| KR | 100677913 | 2/2007 |
| KR | 100689465 | 3/2007 |
| KR | 20070028201 | 3/2007 |
| KR | 100722974 | 5/2007 |
| KR | 100729813 | 6/2007 |
| KR | 20070067650 | 6/2007 |
| KR | 100743171 | 7/2007 |
| KR | 100743254 | 7/2007 |
| KR | 20070068501 | 7/2007 |
| KR | 20070078477 | 8/2007 |
| KR | 20070082960 | 8/2007 |
| KR | 20070087513 | 8/2007 |
| KR | 20070091486 | 9/2007 |
| KR | 100766953 | 10/2007 |
| KR | 100771364 | 10/2007 |
| KR | 20070104957 | 10/2007 |
| KR | 100777428 | 11/2007 |
| KR | 20070115754 | 12/2007 |
| KR | 20070122344 | 12/2007 |
| KR | 20070122345 | 12/2007 |
| KR | 100802525 | 2/2008 |
| KR | 20080013314 | 2/2008 |
| KR | 20080015099 | 2/2008 |
| KR | 20080015100 | 2/2008 |
| KR | 20080015973 | 2/2008 |
| KR | 20080018407 | 2/2008 |
| KR | 100822053 | 4/2008 |
| KR | 20080045551 | 5/2008 |
| KR | 100841243 | 6/2008 |
| KR | 20080053057 | 6/2008 |
| KR | 20080054596 | 6/2008 |
| KR | 100846192 | 7/2008 |
| KR | 20080059882 | 7/2008 |
| KR | 20080069007 | 7/2008 |
| KR | 100854932 | 8/2008 |
| KR | 20080071070 | 8/2008 |
| KR | 20080078315 | 8/2008 |
| KR | 100866177 | 10/2008 |
| KR | 100866475 | 11/2008 |
| KR | 100866476 | 11/2008 |
| KR | 100866573 | 11/2008 |
| KR | 100870724 | 11/2008 |
| KR | 20080096918 | 11/2008 |
| KR | 20080098409 | 11/2008 |
| KR | 100871916 | 12/2008 |
| KR | 20080112331 | 12/2008 |
| KR | 20090003899 | 1/2009 |
| KR | 20090018486 | 2/2009 |
| KR | 20090020864 | 2/2009 |
| KR | 100888554 | 3/2009 |
| KR | 20090036734 | 4/2009 |
| KR | 100897170 | 5/2009 |
| KR | 20090052526 | 5/2009 |
| KR | 100901784 | 6/2009 |
| KR | 100903348 | 6/2009 |
| KR | 20090089931 | 8/2009 |
| KR | 100922497 | 10/2009 |
| KR | 20090105424 | 10/2009 |
| KR | 100932752 | 12/2009 |
| KR | 100935495 | 1/2010 |
| KR | 20100006652 | 1/2010 |
| KR | 2010022327 | 3/2010 |
| KR | 20100039170 | 4/2010 |
| KR | 100958030 | 5/2010 |
| KR | 20100059681 | 6/2010 |
| KR | 20100070116 | 6/2010 |
| KR | 20100070119 | 6/2010 |
| KR | 20100072994 | 7/2010 |
| KR | 100977516 | 8/2010 |
| KR | 2010091758 | 8/2010 |
| KR | 20100089125 | 8/2010 |
| KR | 20100090521 | 8/2010 |
| KR | 20100091758 | 8/2010 |
| KR | 20100098958 | 9/2010 |
| KR | 100985816 | 10/2010 |
| KR | 100990904 | 11/2010 |
| KR | 20100123021 | 11/2010 |
| KR | 20110006437 | 1/2011 |
| KR | 20110011264 | 2/2011 |
| KR | 2011024290 | 3/2011 |
| KR | 20110019994 | 3/2011 |
| KR | 101111167 | 4/2011 |
| KR | 1111167 | 2/2012 |
| KR | 1020130142810 | 12/2013 |
| TW | 201116030 | 5/2011 |
| WO | WO 97/22860 | 6/1997 |
| WO | WO 9722860 | 6/1997 |
| WO | WO 03/093963 | 11/2003 |
| WO | WO 2004/027459 | 4/2004 |
| WO | WO 2005/002228 | 1/2005 |
| WO | WO 2005/015143 | 2/2005 |
| WO | WO 2005/088846 | 9/2005 |
| WO | WO 2006/096211 | 9/2006 |
| WO | WO 2006/112866 | 10/2006 |
| WO | WO 2007/006242 | 1/2007 |
| WO | WO 2008/087373 | 7/2008 |
| WO | WO 2008/094102 | 8/2008 |
| WO | WO 2009/122114 | 10/2009 |
| WO | WO 2010/005152 | 1/2010 |
| WO | WO 2010/033142 | 3/2010 |
| WO | WO 2011/131758 | 10/2011 |
| WO | WO 2012/027739 | 3/2012 |
| WO | WO 2012/170946 | 12/2012 |
| WO | WO 2012/170949 | 12/2012 |
| WO | WO 2012/170953 | 12/2012 |
| WO | WO 2012/170954 | 12/2012 |

OTHER PUBLICATIONS

Jang et al., "Pseudo-Color Image Fusion Based on Intensity-Hue-Saturation Color Space", International Conference on Multisensor Fusion and Integration for Intelligent Systems, Aug. 20-22, 2008, pp. 366-371, IEEE, Piscataway, N.J.

Sissinto et al., "Fusion of Infrared and Visible Images using Empirical Mode Decomposition and Spatial Opponent Processing", Applied Imagery Pattern Recognition Workshop (AIPR), Oct. 11-13, 2011, pp. 1-6, IEEE, Piscataway, N.J.

* cited by examiner

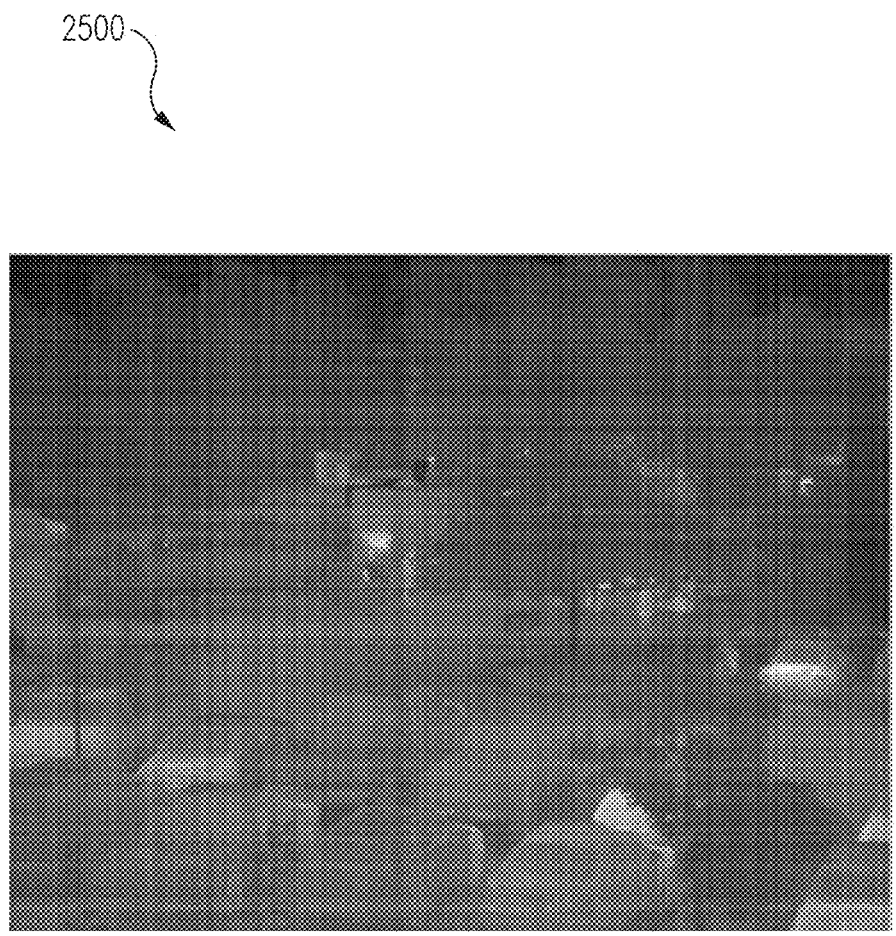
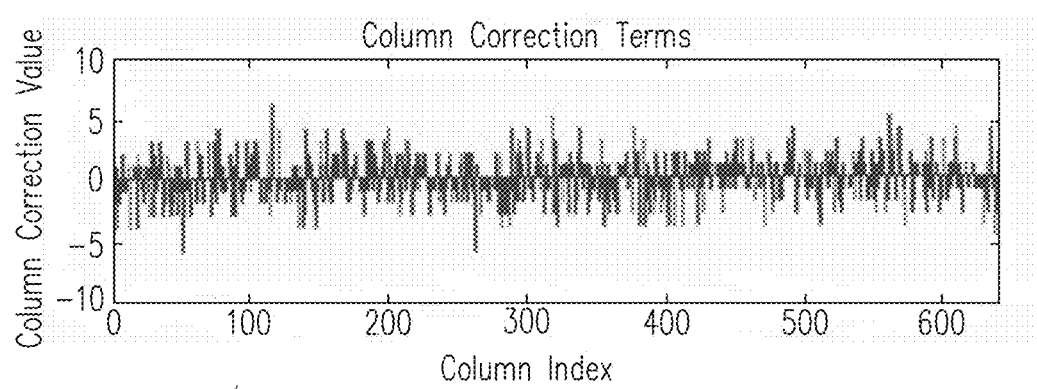
FIG. 18A

4500
FIG. 29
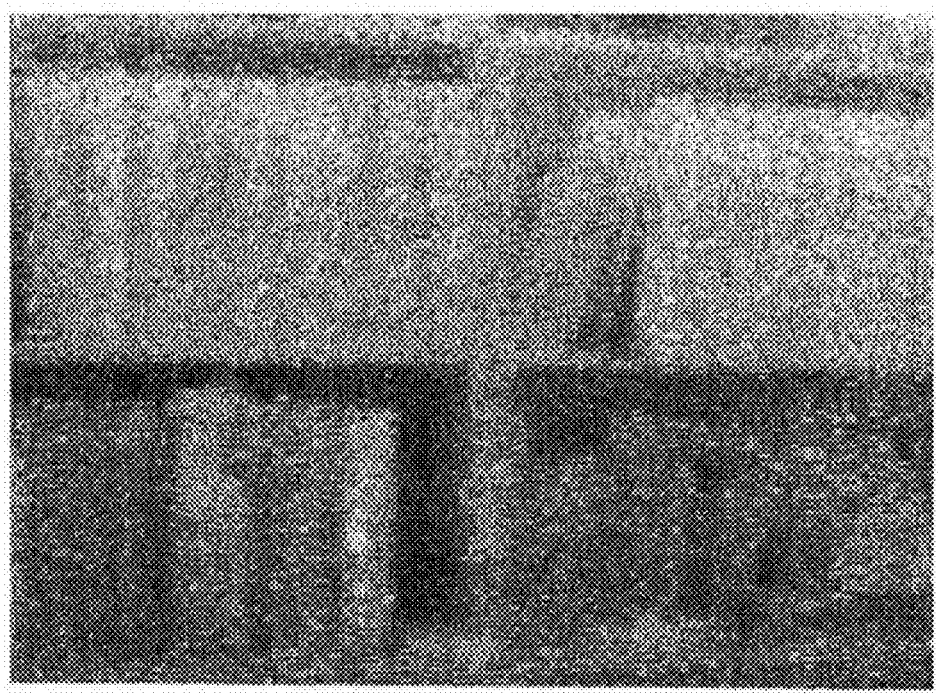
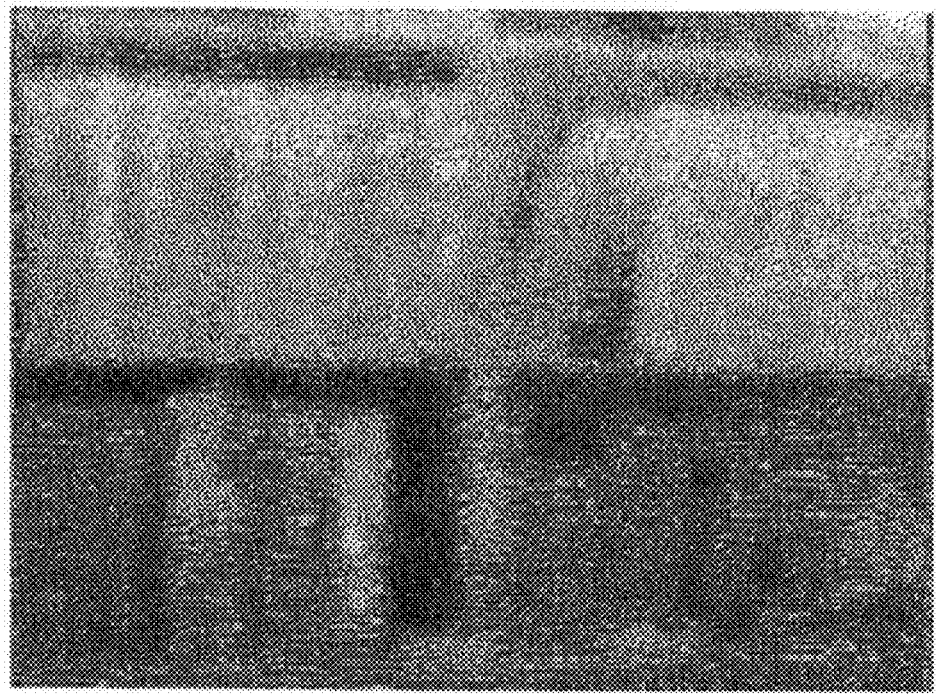
4600
FIG. 30

FIG. 31
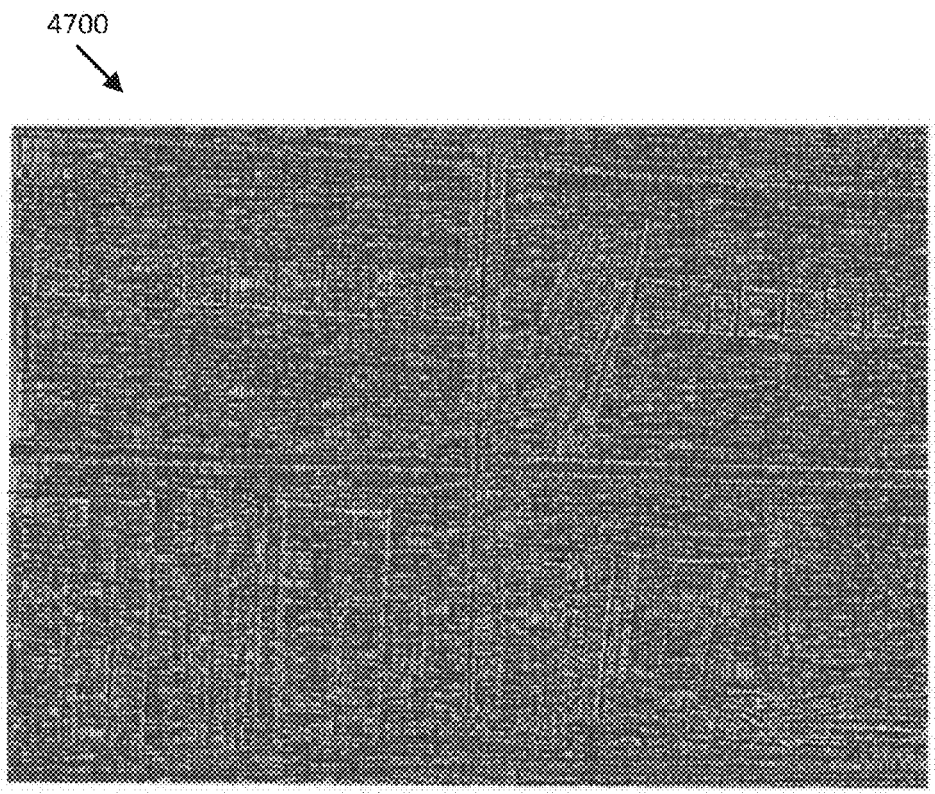
4700
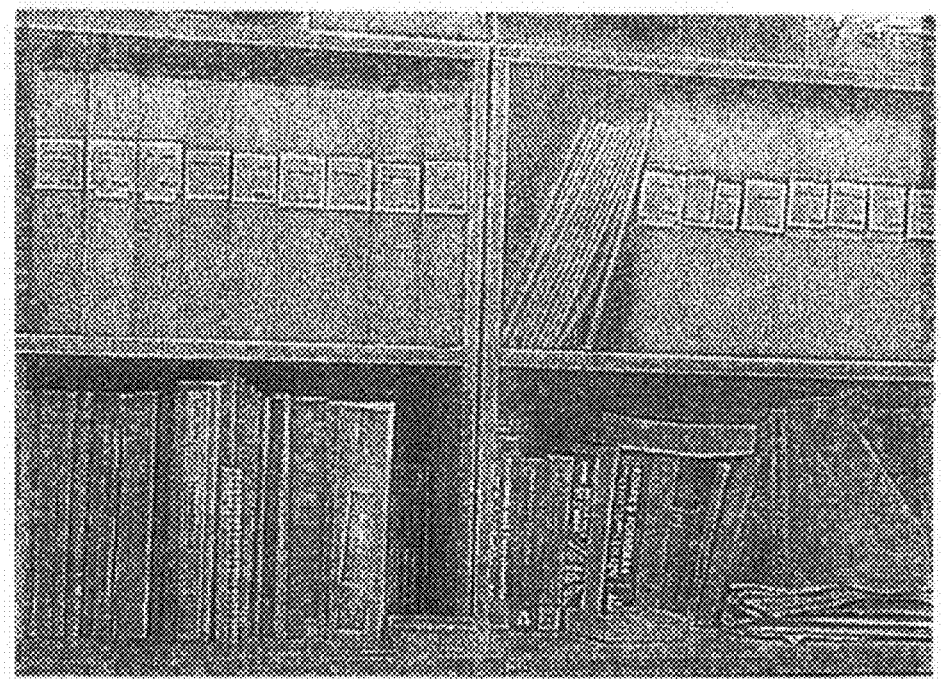
4800  FIG. 32

4900

5000

TIME SPACED INFRARED IMAGE ENHANCEMENT

CROSS-REFERENCE TO RELATED APPLICATIONS

This application is a continuation of U.S. patent application Ser. No. 14/138,040 filed Dec. 21, 2013 and entitled "TIME SPACED INFRARED IMAGE ENHANCEMENT" which is hereby incorporated by reference in its entirety.

U.S. patent application Ser. No. 14/138,040 claims the benefit of U.S. Provisional Patent Application No. 61/792,582 filed Mar. 15, 2013 and entitled "TIME SPACED INFRARED IMAGE ENHANCEMENT" which is hereby incorporated by reference in its entirety.

U.S. patent application Ser. No. 14/138,040 claims the benefit of U.S. Provisional Patent Application No. 61/793,952 filed Mar. 15, 2013 and entitled "INFRARED IMAGING ENHANCEMENT WITH FUSION" which is hereby incorporated by reference in its entirety.

U.S. patent application Ser. No. 14/138,040 claims the benefit of U.S. Provisional Patent Application No. 61/746,069 filed Dec. 26, 2012 and entitled "TIME SPACED INFRARED IMAGE ENHANCEMENT" which is hereby incorporated by reference in its entirety.

U.S. patent application Ser. No. 14/138,040 claims the benefit of U.S. Provisional Patent Application No. 61/746,074 filed Dec. 26, 2012 and entitled "INFRARED IMAGING ENHANCEMENT WITH FUSION" which is hereby incorporated by reference in its entirety.

U.S. patent application Ser. No. 14/138,040 is a continuation-in-part of U.S. patent application Ser. No. 14/101,245 filed Dec. 9, 2013 and entitled "LOW POWER AND SMALL FORM FACTOR INFRARED IMAGING" which is hereby incorporated by reference in its entirety.

U.S. patent application Ser. No. 14/101,245 is a continuation of International Patent Application No. PCT/US2012/041744 filed Jun. 8, 2012 and entitled "LOW POWER AND SMALL FORM FACTOR INFRARED IMAGING" which is hereby incorporated by reference in its entirety.

International Patent Application No. PCT/US2012/041744 claims the benefit of U.S. Provisional Patent Application No. 61/656,889 filed Jun. 7, 2012 and entitled "LOW POWER AND SMALL FORM FACTOR INFRARED IMAGING" which is hereby incorporated by reference in its entirety.

International Patent Application No. PCT/US2012/041744 claims the benefit of U.S. Provisional Patent Application No. 61/545,056 filed Oct. 7, 2011 and entitled "NON-UNIFORMITY CORRECTION TECHNIQUES FOR INFRARED IMAGING DEVICES" which is hereby incorporated by reference in its entirety.

International Patent Application No. PCT/US2012/041744 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041744 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041744 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

U.S. patent application Ser. No. 14/138,040 is a continuation-in-part of U.S. patent application Ser. No. 14/099,818 filed Dec. 6, 2013 and entitled "NON-UNIFORMITY CORRECTION TECHNIQUES FOR INFRARED IMAGING DEVICES" which is hereby incorporated by reference in its entirety.

U.S. patent application Ser. No. 14/099,818 is a continuation of International Patent Application No. PCT/US2012/041749 filed Jun. 8, 2012 and entitled "NON-UNIFORMITY CORRECTION TECHNIQUES FOR INFRARED IMAGING DEVICES" which is hereby incorporated by reference in its entirety.

International Patent Application No. PCT/US2012/041749 claims the benefit of U.S. Provisional Patent Application No. 61/545,056 filed Oct. 7, 2011 and entitled "NON-UNIFORMITY CORRECTION TECHNIQUES FOR INFRARED IMAGING DEVICES" which is hereby incorporated by reference in its entirety.

International Patent Application No. PCT/US2012/041749 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041749 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041749 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

U.S. patent application Ser. No. 14/138,040 is a continuation-in-part of U.S. patent application Ser. No. 14/101,258 filed Dec. 9, 2013 and entitled "INFRARED CAMERA SYSTEM ARCHITECTURES" which is hereby incorporated by reference in its entirety.

U.S. patent application Ser. No. 14/101,258 is a continuation of International Patent Application No. PCT/US2012/041739 filed Jun. 8, 2012 and entitled "INFRARED CAMERA SYSTEM ARCHITECTURES" which is hereby incorporated by reference in its entirety.

International Patent Application No. PCT/US2012/041739 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041739 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041739 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

U.S. patent application Ser. No. 14/138,040 is a continuation-in-part of U.S. patent application Ser. No. 13/437,645 filed Apr. 2, 2012 and entitled "INFRARED RESOLUTION AND CONTRAST ENHANCEMENT WITH FUSION" which is hereby incorporated by reference in its entirety.

U.S. patent application Ser. No. 13/437,645 is a continuation-in-part of U.S. patent application Ser. No. 13/105,765 filed May 11, 2011 and entitled "INFRARED RESOLUTION AND CONTRAST ENHANCEMENT WITH FUSION" which is hereby incorporated by reference in its entirety.

U.S. patent application Ser. No. 13/437,645 also claims the benefit of U.S. Provisional Patent Application No. 61/473,207 filed Apr. 8, 2011 and entitled "INFRARED RESOLUTION AND CONTRAST ENHANCEMENT WITH FUSION" which is hereby incorporated by reference in its entirety.

U.S. patent application Ser. No. 13/437,645 is also a continuation-in-part of U.S. patent application Ser. No. 12/766,739 filed Apr. 23, 2010 and entitled "INFRARED RESOLUTION AND CONTRAST ENHANCEMENT WITH FUSION" which is hereby incorporated by reference in its entirety.

U.S. patent application Ser. No. 13/105,765 is a continuation of International Patent Application No. PCT/EP2011/056432 filed Apr. 21, 2011 and entitled "INFRARED RESOLUTION AND CONTRAST ENHANCEMENT WITH FUSION" which is hereby incorporated by reference in its entirety.

U.S. patent application Ser. No. 13/105,765 is also a continuation-in-part of U.S. patent application Ser. No. 12/766,739 which is hereby incorporated by reference in its entirety.

International Patent Application No. PCT/EP2011/056432 is a continuation-in-part of U.S. patent application Ser. No. 12/766,739 which is hereby incorporated by reference in its entirety.

International Patent Application No. PCT/EP2011/056432 also claims the benefit of U.S. Provisional Patent Application No. 61/473,207 which is hereby incorporated by reference in its entirety.

U.S. patent application Ser. No. 14/138,040 claims the benefit of U.S. Provisional Patent Application No. 61/748,018 filed Dec. 31, 2012 and entitled "COMPACT MULTI-SPECTRUM IMAGING WITH FUSION" which is hereby incorporated by reference in its entirety.

U.S. patent application Ser. No. 14/138,040 is a continuation-in-part of U.S. patent application Ser. No. 12/477,828 filed Jun. 3, 2009 and entitled "INFRARED CAMERA SYSTEMS AND METHODS FOR DUAL SENSOR APPLICATIONS" which is hereby incorporated by reference in its entirety.

U.S. patent application Ser. No. 14/138,040 is a continuation-in-part of U.S. patent application Ser. No. 14/029,683 filed Sep. 17, 2013 and entitled "PIXEL-WISE NOISE REDUCTION IN THERMAL IMAGES", which is hereby incorporated by reference in its entirety.

U.S. patent application Ser. No. 14/029,683 claims the benefit of U.S. Provisional Patent Application No. 61/745,489 filed Dec. 21, 2012 and entitled "ROW AND COLUMN NOISE REDUCTION IN THERMAL IMAGES", which is hereby incorporated by reference in its entirety.

U.S. patent application Ser. No. 14/029,683 claims the benefit of U.S. Provisional Patent Application No. 61/745,504 filed Dec. 21, 2012 and entitled "PIXEL-WISE NOISE REDUCTION IN THERMAL IMAGES", which is hereby incorporated by reference in its entirety.

U.S. patent application Ser. No. 14/029,683 is a continuation-in-part of U.S. patent application Ser. No. 13/622,178 filed Sep. 18, 2012 and entitled "SYSTEMS AND METHODS FOR PROCESSING INFRARED IMAGES", which is a continuation-in-part of U.S. patent application Ser. No. 13/529,772 filed Jun. 21, 2012 and entitled "SYSTEMS AND METHODS FOR PROCESSING INFRARED IMAGES", which is a continuation of U.S. patent application Ser. No. 12/396,340 filed Mar. 2, 2009 and entitled "SYSTEMS AND METHODS FOR PROCESSING INFRARED IMAGES", all of which are hereby incorporated by reference in their entirety.

U.S. patent application Ser. No. 14/138,040 is a continuation-in-part of U.S. patent application Ser. No. 14/029,716 filed Sep. 17, 2013 and entitled "ROW AND COLUMN NOISE REDUCTION IN THERMAL IMAGES", which is hereby incorporated by reference in its entirety.

U.S. patent application Ser. No. 14/029,716 claims the benefit of U.S. Provisional Patent Application No. 61/745,489 filed Dec. 21, 2012 and entitled "ROW AND COLUMN NOISE REDUCTION IN THERMAL IMAGES", which is hereby incorporated by reference in its entirety.

U.S. patent application Ser. No. 14/029,716 claims the benefit of U.S. Provisional Patent Application No. 61/745,504 filed Dec. 21, 2012 and entitled "PIXEL-WISE NOISE REDUCTION IN THERMAL IMAGES", which is hereby incorporated by reference in its entirety.

U.S. patent application Ser. No. 14/029,716 is a continuation-in-part of U.S. patent application Ser. No. 13/622,178 filed Sep. 18, 2012 and entitled "SYSTEMS AND METHODS FOR PROCESSING INFRARED IMAGES", which is a continuation-in-part of U.S. patent application Ser. No. 13/529,772 filed Jun. 21, 2012 and entitled "SYSTEMS AND METHODS FOR PROCESSING INFRARED IMAGES", which is a continuation of U.S. patent application Ser. No. 12/396,340 filed Mar. 2, 2009 and entitled "SYSTEMS AND METHODS FOR PROCESSING INFRARED IMAGES", all of which are hereby incorporated by reference in their entirety.

TECHNICAL FIELD

One or more embodiments of the invention relate generally to infrared imaging devices and more particularly, for example, to systems and methods for enhanced imaging using infrared imaging devices.

BACKGROUND

Visible spectrum cameras are used in a variety of imaging applications to capture color or monochrome images derived from visible light. Visible spectrum cameras are often used for daytime or other applications when there is sufficient ambient light or when image details are not obscured by smoke, fog, or other environmental conditions detrimentally affecting the visible spectrum.

Infrared cameras are used in a variety of imaging applications to capture infrared (e.g., thermal) emissions from objects as infrared images. Infrared cameras may be used for nighttime or other applications when ambient lighting is poor or when environmental conditions are otherwise non-conducive to visible spectrum imaging. Infrared cameras may also be used for applications in which additional non-visible-spectrum information about a scene is desired. Conventional infrared cameras typically produce infrared images that are difficult to interpret due to, for example, lack of resolution, lack of contrast between objects, and excess noise.

SUMMARY

Techniques are disclosed for systems and methods using small form factor infrared imaging modules to image a scene. In one embodiment, an imaging system may include one or more visible spectrum imaging modules and infrared imaging modules, a processor, a memory, a display, a communication module, and modules to interface with a user and/or a monitoring and notification system. Visible spectrum imaging modules and infrared imaging modules may be positioned in proximity to a scene that will be monitored while a visible spectrum-only image of the scene is either not available or less desirable than an infrared image of the scene.

The visible spectrum imaging modules may be configured to capture visible spectrum images of the scene at a first time, and the infrared imaging modules may be configured to capture infrared images of the scene at a second time. The second time may be substantially different from the first time, or the times may be substantially simultaneous. Various image analytics and processing may be performed on the captured images to form combined images with infrared imaging features and increased available detail and contrast.

In one embodiment, triple fusion processing, including selectable aspects of non-uniformity correction processing, true color processing, and high contrast processing may be performed on the captured images. Notifications and control signals may be generated based on the combined images and then presented to a user and/or a monitoring and notification system.

In another embodiment, a system includes a memory adapted to receive a visible spectrum image of a scene and an infrared image of the scene, and a processor in communication with the memory. The processor may be configured to receive control parameters, derive color characteristics of the scene from at least one of the images, and derive high spatial frequency content from at least one of the images. In some embodiments, the images used derive the color characteristics and the high spatial frequency may or may not be the same images and/or types of images. The processor may be configured to generate a combined image comprising relative contributions of the color characteristics and the high spatial frequency content, where the relative contributions may be determined by the control parameters.

In a further embodiment, a method includes receiving a visible spectrum image of a scene and an infrared image of the scene, receiving control parameters, deriving color characteristics of the scene from at least one of the images, and deriving high spatial frequency content from at least one of the images. In some embodiments, the images used derive the color characteristics and the high spatial frequency may or may not be the same images and/or types of images. The method may include generating a combined image comprising relative contributions of the color characteristics and the high spatial frequency content, where the relative contributions may be determined by the control parameters.

Another embodiment may include a non-transitory machine-readable medium having a plurality of machine-readable instructions which when executed by one or more processors of an imaging system are adapted to cause the imaging system to perform a method for imaging a scene. The method may include receiving a visible spectrum image of a scene and an infrared image of the scene, receiving control parameters, deriving color characteristics of the scene from at least one of the images, and deriving high spatial frequency content from at least one of the images. In some embodiments, the images used derive the color characteristics and the high spatial frequency may or may not be the same images and/or types of images. The method may include generating a combined image comprising relative contributions of the color characteristics and the high spatial frequency content, where the relative contributions may be determined by the control parameters.

In another embodiment, a system includes a visible spectrum imaging module configured to capture a visible spectrum image of a scene at a first time, and an infrared imaging module configured to capture an infrared image of the scene at a second time, where the infrared image includes a radiometric component. A processor in communication with the visible spectrum imaging module and the infrared imaging module may be configured to process the visible spectrum image and the infrared image to generate a combined image comprising visible spectrum characteristics of the scene derived from the visible spectrum image and infrared characteristics of the scene derived from the radiometric component of the infrared image.

In a further embodiment, a method includes receiving a visible spectrum image of a scene captured at a first time by a visible spectrum imaging module, and receiving an infrared image of the scene captured at a second time by an infrared imaging module, where the infrared image comprises a radiometric component. The method may further include processing the visible spectrum image and the infrared image to generate a combined image comprising visible spectrum characteristics of the scene derived from the visible spectrum image and infrared characteristics of the scene derived from the radiometric component of the infrared image.

Another embodiment may include a non-transitory machine-readable medium having a plurality of machine-readable instructions which when executed by one or more processors of an imaging system are adapted to cause the imaging system to perform a method for imaging a scene. The method may include receiving a visible spectrum image of a scene captured at a first time by a visible spectrum imaging module, and receiving an infrared image of the scene captured at a second time by an infrared imaging module, where the infrared image comprises a radiometric component. The method may further include processing the visible spectrum image and the infrared image to generate a combined image comprising visible spectrum characteristics of the scene derived from the visible spectrum image and infrared characteristics of the scene derived from the radiometric component of the infrared image.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 18A-C show an exemplary implementation of column and row noise filtering for an infrared image in accordance with embodiments of the disclosure.

FIG. 29 illustrates an infrared image in accordance with an embodiment of the disclosure.

FIG. 30 illustrates the infrared image of FIG. 29 after low pass filtering in accordance with an embodiment of the disclosure.

FIG. 31 illustrates high spatial frequency content derived from a visible spectrum image using high pass filtering in accordance with an embodiment of the disclosure.

FIG. 32 illustrates a combination of the low pass filtered infrared image of FIG. 30 with the high pass filtered visible spectrum image of FIG. 31 generated in accordance with an embodiment of the disclosure.

Embodiments of the invention and their advantages are best understood by referring to the detailed description that follows. It should be appreciated that like reference numerals are used to identify like elements illustrated in one or more of the figures.

DETAILED DESCRIPTION

Figure 1:
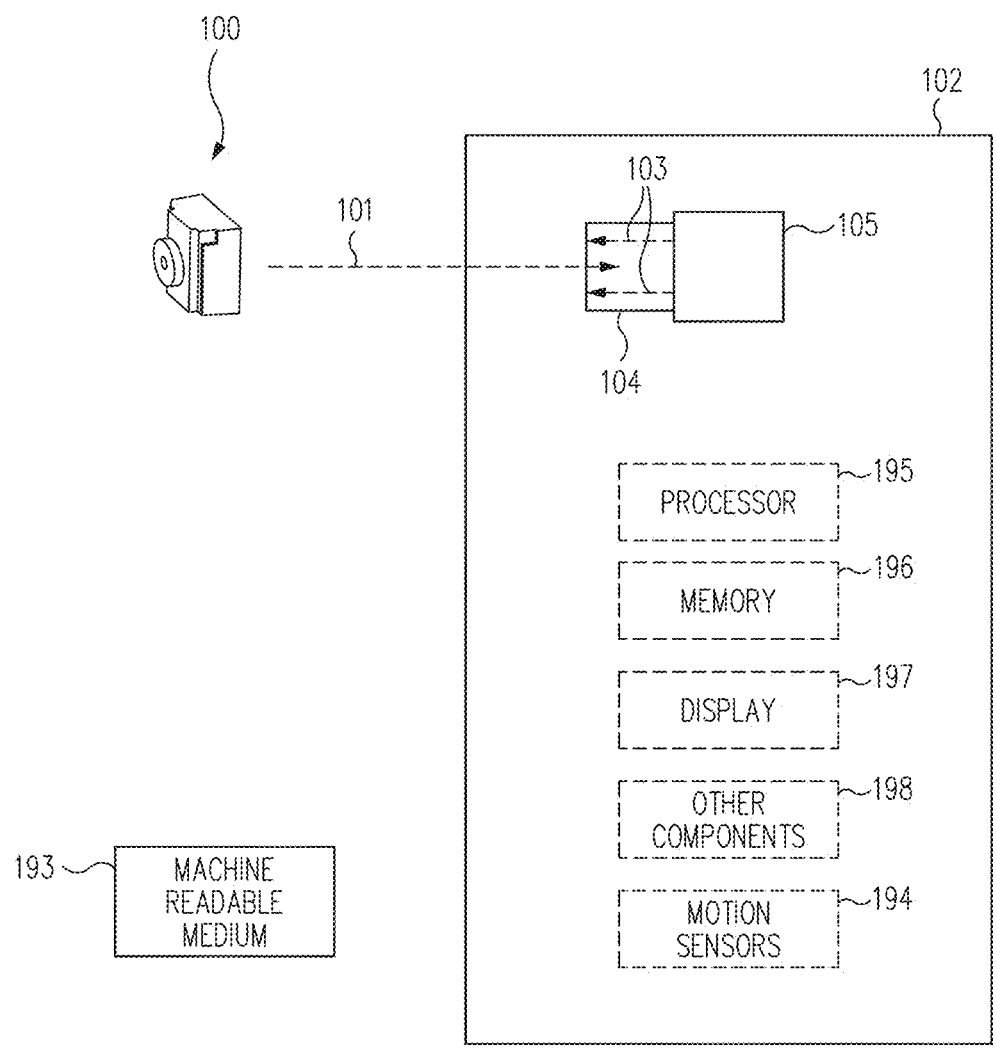
FIG. 1 illustrates an infrared imaging module configured to be implemented in a host device in accordance with an embodiment of the disclosure.

FIG. 1 illustrates an infrared imaging module 100 (e.g., an infrared camera or an infrared imaging device) configured to be implemented in a host device 102 in accordance with an embodiment of the disclosure. Infrared imaging module 100 may be implemented, for one or more embodiments, with a small form factor and in accordance with wafer level packaging techniques or other packaging techniques.

In one embodiment, infrared imaging module 100 may be configured to be implemented in a small portable host device 102, such as a mobile telephone, a tablet computing device, a laptop computing device, a personal digital assistant, a visible light camera, a music player, or any other appropriate mobile device. In this regard, infrared imaging module 100 may be used to provide infrared imaging features to host device 102. For example, infrared imaging module 100 may be configured to capture, process, and/or otherwise manage infrared images (e.g., also referred to as image frames) and provide such infrared images to host device 102 for use in any desired fashion (e.g., for further processing, to store in memory, to display, to use by various applications running on host device 102, to export to other devices, or other uses).

In various embodiments, infrared imaging module 100 may be configured to operate at low voltage levels and over a wide temperature range. For example, in one embodiment, infrared imaging module 100 may operate using a power supply of approximately 2.4 volts, 2.5 volts, 2.8 volts, or lower voltages, and operate over a temperature range of approximately −20 degrees C. to approximately +60 degrees C. (e.g., providing a suitable dynamic range and performance over an environmental temperature range of approximately 80 degrees C.). In one embodiment, by operating infrared imaging module 100 at low voltage levels, infrared imaging module 100 may experience reduced amounts of self heating in comparison with other types of infrared imaging devices. As a result, infrared imaging module 100 may be operated with reduced measures to compensate for such self heating.

Figure 2:
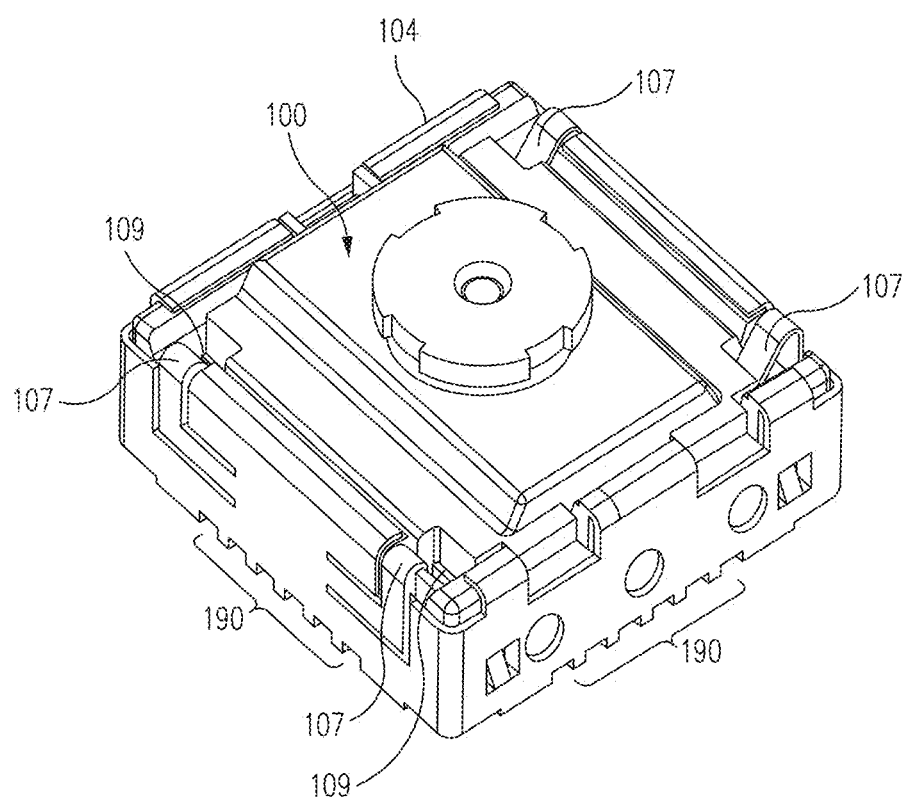
FIG. 2 illustrates an assembled infrared imaging module in accordance with an embodiment of the disclosure.

As shown in FIG. 1, host device 102 may include a socket 104, a shutter 105, motion sensors 194, a processor 195, a memory 196, a display 197, and/or other components 198. Socket 104 may be configured to receive infrared imaging module 100 as identified by arrow 101. In this regard, FIG. 2 illustrates infrared imaging module 100 assembled in socket 104 in accordance with an embodiment of the disclosure.

Motion sensors 194 may be implemented by one or more accelerometers, gyroscopes, or other appropriate devices that may be used to detect movement of host device 102. Motion sensors 194 may be monitored by and provide information to processing module 160 or processor 195 to detect motion. In various embodiments, motion sensors 194 may be implemented as part of host device 102 (as shown in FIG. 1), infrared imaging module 100, or other devices attached to or otherwise interfaced with host device 102.

Processor 195 may be implemented as any appropriate processing device (e.g., logic device, microcontroller, processor, application specific integrated circuit (ASIC), or other device) that may be used by host device 102 to execute appropriate instructions, such as software instructions provided in memory 196. Display 197 may be used to display captured and/or processed infrared images and/or other images, data, and information. Other components 198 may be used to implement any features of host device 102 as may be desired for various applications (e.g., clocks, temperature sensors, a visible light camera, or other components). In addition, a machine readable medium 193 may be provided for storing non-transitory instructions for loading into memory 196 and execution by processor 195.

In various embodiments, infrared imaging module 100 and socket 104 may be implemented for mass production to facilitate high volume applications, such as for implementation in mobile telephones or other devices (e.g., requiring small form factors). In one embodiment, the combination of infrared imaging module 100 and socket 104 may exhibit overall dimensions of approximately 8.5 mm by 8.5 mm by 5.9 mm while infrared imaging module 100 is installed in socket 104.

Figure 3:
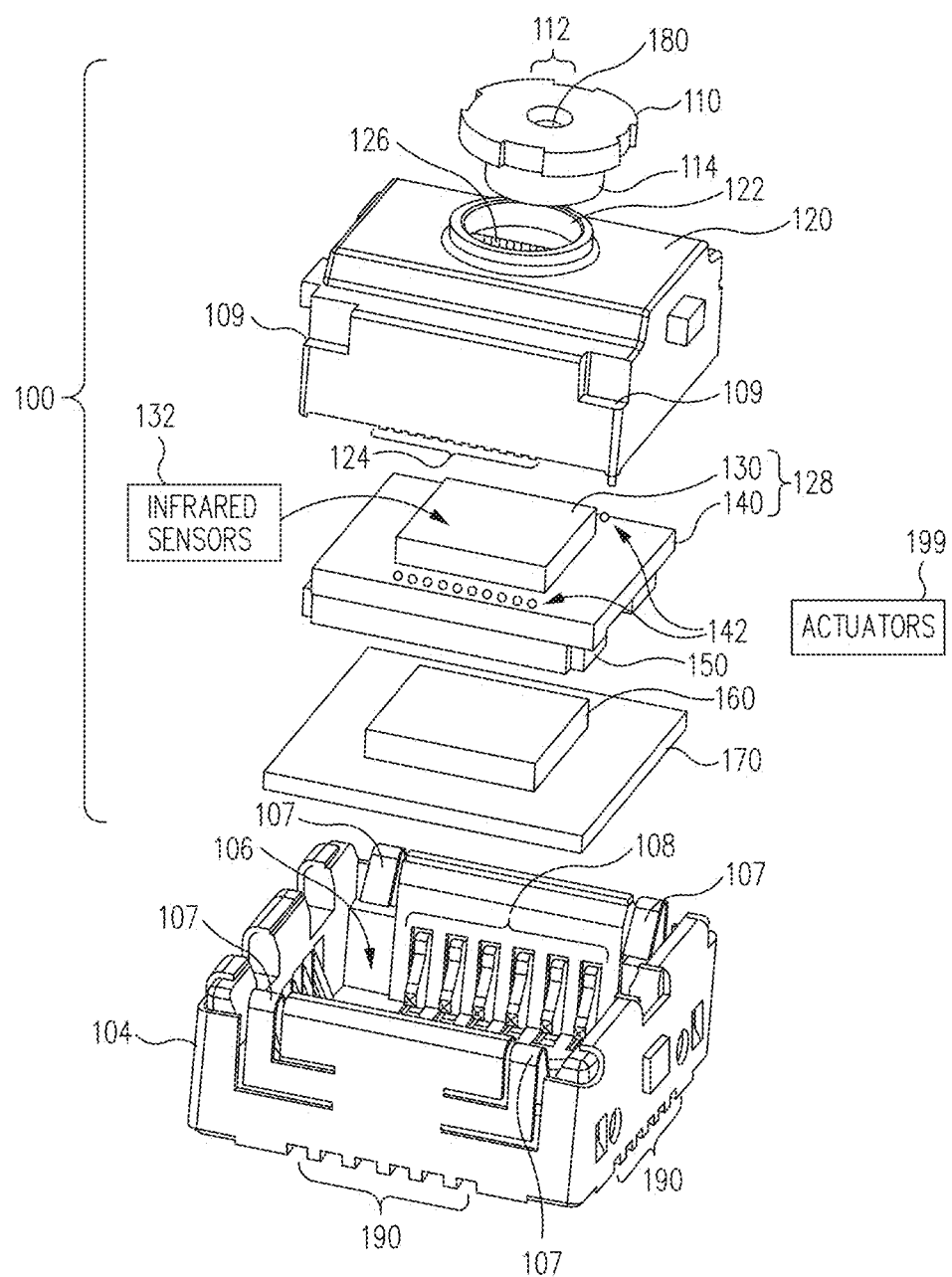
FIG. 3 illustrates an exploded view of an infrared imaging module juxtaposed over a socket in accordance with an embodiment of the disclosure.

FIG. 3 illustrates an exploded view of infrared imaging module 100 juxtaposed over socket 104 in accordance with an embodiment of the disclosure. Infrared imaging module 100 may include a lens barrel 110, a housing 120, an infrared sensor assembly 128, a circuit board 170, a base 150, and a processing module 160.

Lens barrel 110 may at least partially enclose an optical element 180 (e.g., a lens) which is partially visible in FIG. 3 through an aperture 112 in lens barrel 110. Lens barrel 110 may include a substantially cylindrical extension 114 which may be used to interface lens barrel 110 with an aperture 122 in housing 120.

Infrared sensor assembly 128 may be implemented, for example, with a cap 130 (e.g., a lid) mounted on a substrate 140. Infrared sensor assembly 128 may include a plurality of infrared sensors 132 (e.g., infrared detectors) implemented in an array or other fashion on substrate 140 and covered by cap 130. For example, in one embodiment, infrared sensor assembly 128 may be implemented as a focal plane array (FPA). Such a focal plane array may be implemented, for example, as a vacuum package assembly (e.g., sealed by cap 130 and substrate 140). In one embodiment, infrared sensor assembly 128 may be implemented as a wafer level package (e.g., infrared sensor assembly 128 may be singulated from a set of vacuum package assemblies provided on a wafer). In one embodiment, infrared sensor assembly 128 may be implemented to operate using a power supply of approximately 2.4 volts, 2.5 volts, 2.8 volts, or similar voltages.

Infrared sensors 132 may be configured to detect infrared radiation (e.g., infrared energy) from a target scene including, for example, mid wave infrared wave bands (MWIR), long wave infrared wave bands (LWIR), and/or other thermal imaging bands as may be desired in particular implementations. In one embodiment, infrared sensor assembly 128 may be provided in accordance with wafer level packaging techniques.

Infrared sensors 132 may be implemented, for example, as microbolometers or other types of thermal imaging infrared sensors arranged in any desired array pattern to provide a plurality of pixels. In one embodiment, infrared sensors 132 may be implemented as vanadium oxide (VOx) detectors with a 17 μm pixel pitch. In various embodiments, arrays of approximately 32 by 32 infrared sensors 132, approximately 64 by 64 infrared sensors 132, approximately 80 by 64 infrared sensors 132, or other array sizes may be used.

Substrate 140 may include various circuitry including, for example, a read out integrated circuit (ROIC) with dimensions less than approximately 5.5 mm by 5.5 mm in one embodiment. Substrate 140 may also include bond pads 142 that may be used to contact complementary connections positioned on inside surfaces of housing 120 when infrared imaging module 100 is assembled as shown in FIG. 3. In one embodiment, the ROIC may be implemented with low-dropout regulators (LDO) to perform voltage regulation to reduce power supply noise introduced to infrared sensor assembly 128 and thus provide an improved power supply rejection ratio (PSRR). Moreover, by implementing the LDO with the ROIC (e.g., within a wafer level package), less die area may be consumed and fewer discrete die (or chips) are needed.

Figure 4:
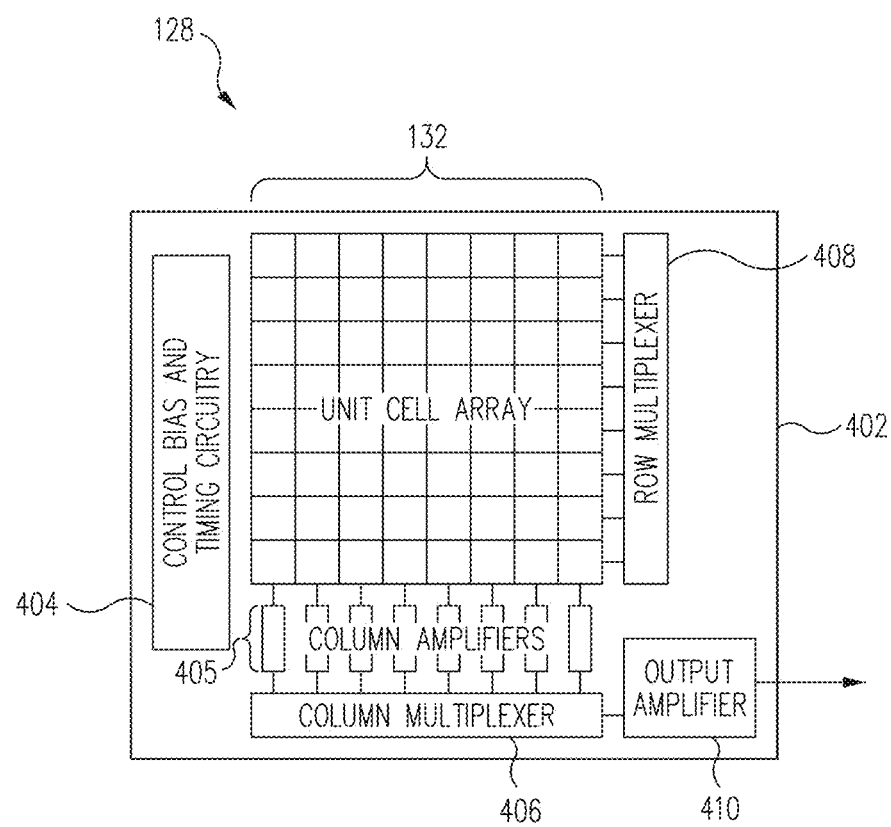
FIG. 4 illustrates a block diagram of an infrared sensor assembly including an array of infrared sensors in accordance with an embodiment of the disclosure.

FIG. 4 illustrates a block diagram of infrared sensor assembly 128 including an array of infrared sensors 132 in accordance with an embodiment of the disclosure. In the illustrated embodiment, infrared sensors 132 are provided as part of a unit cell array of a ROTC 402. ROIC 402 includes bias generation and timing control circuitry 404, column amplifiers 405, a column multiplexer 406, a row multiplexer 408, and an output amplifier 410. Image frames (e.g., thermal images) captured by infrared sensors 132 may be provided by output amplifier 410 to processing module 160, processor 195, and/or any other appropriate components to perform various processing techniques described herein.

Although an 8 by 8 array is shown in FIG. 4, any desired array configuration may be used in other embodiments. Further descriptions of ROICs and infrared sensors (e.g., microbolometer circuits) may be found in U.S. Pat. No. 6,028,309 issued Feb. 22, 2000, which is incorporated herein by reference in its entirety.

Infrared sensor assembly 128 may capture images (e.g., image frames) and provide such images from its ROTC at various rates. Processing module 160 may be used to perform appropriate processing of captured infrared images and may be implemented in accordance with any appropriate architecture. In one embodiment, processing module 160 may be implemented as an ASIC. In this regard, such an ASIC may be configured to perform image processing with high performance and/or high efficiency. In another embodiment, processing module 160 may be implemented with a general purpose central processing unit (CPU) which may be configured to execute appropriate software instructions to perform image processing, coordinate and perform image processing with various image processing blocks, coordinate interfacing between processing module 160 and host device 102, and/or other operations. In yet another embodiment, processing module 160 may be implemented with a field programmable gate array (FPGA). Processing module 160 may be implemented with other types of processing and/or logic circuits in other embodiments as would be understood by one skilled in the art.

In these and other embodiments, processing module 160 may also be implemented with other components where appropriate, such as, volatile memory, non-volatile memory, and/or one or more interfaces (e.g., infrared detector interfaces, inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces).

In some embodiments, infrared imaging module 100 may further include one or more actuators 199 which may be used to adjust the focus of infrared image frames captured by infrared sensor assembly 128. For example, actuators 199 may be used to move optical element 180, infrared sensors 132, and/or other components relative to each other to selectively focus and defocus infrared image frames in accordance with techniques described herein. Actuators 199 may be implemented in accordance with any type of motion-inducing apparatus or mechanism, and may be positioned at any location within or external to infrared imaging module 100 as appropriate for different applications.

When infrared imaging module 100 is assembled, housing 120 may substantially enclose infrared sensor assembly 128, base 150, and processing module 160. Housing 120 may facilitate connection of various components of infrared imaging module 100. For example, in one embodiment, housing 120 may provide electrical connections 126 to connect various components as further described.

Electrical connections 126 (e.g., conductive electrical paths, traces, or other types of connections) may be electrically connected with bond pads 142 when infrared imaging module 100 is assembled. In various embodiments, electrical connections 126 may be embedded in housing 120, provided on inside surfaces of housing 120, and/or otherwise provided by housing 120. Electrical connections 126 may terminate in connections 124 protruding from the bottom surface of housing 120 as shown in FIG. 3. Connections 124 may connect with circuit board 170 when infrared imaging module 100 is assembled (e.g., housing 120 may rest atop circuit board 170 in various embodiments). Processing module 160 may be electrically connected with circuit board 170 through appropriate electrical connections. As a result, infrared sensor assembly 128 may be electrically connected with processing module 160 through, for example, conductive electrical paths provided by: bond pads 142, complementary connections on inside surfaces of housing 120, electrical connections 126 of housing 120, connections 124, and circuit board 170. Advantageously, such an arrangement may be implemented without requiring wire bonds to be provided between infrared sensor assembly 128 and processing module 160.

In various embodiments, electrical connections 126 in housing 120 may be made from any desired material (e.g., copper or any other appropriate conductive material). In one embodiment, electrical connections 126 may aid in dissipating heat from infrared imaging module 100.

Other connections may be used in other embodiments. For example, in one embodiment, sensor assembly 128 may be attached to processing module 160 through a ceramic board that connects to sensor assembly 128 by wire bonds and to processing module 160 by a ball grid array (BGA). In another embodiment, sensor assembly 128 may be mounted directly on a rigid flexible board and electrically connected with wire bonds, and processing module 160 may be mounted and connected to the rigid flexible board with wire bonds or a BGA.

The various implementations of infrared imaging module 100 and host device 102 set forth herein are provided for purposes of example, rather than limitation. In this regard, any of the various techniques described herein may be applied to any infrared camera system, infrared imager, or other device for performing infrared/thermal imaging.

Substrate 140 of infrared sensor assembly 128 may be mounted on base 150. In various embodiments, base 150 (e.g., a pedestal) may be made, for example, of copper formed by metal injection molding (MIM) and provided with a black oxide or nickel-coated finish. In various embodiments, base 150 may be made of any desired material, such as for example zinc, aluminum, or magnesium, as desired for a given application and may be formed by any desired applicable process, such as for example aluminum casting, MIM, or zinc rapid casting, as may be desired for particular applications. In various embodiments, base 150 may be implemented to provide structural support, various circuit paths, thermal heat sink properties, and other features where appropriate. In one embodiment, base 150 may be a multi-layer structure implemented at least in part using ceramic material.

In various embodiments, circuit board 170 may receive housing 120 and thus may physically support the various components of infrared imaging module 100. In various embodiments, circuit board 170 may be implemented as a printed circuit board (e.g., an FR4 circuit board or other types of circuit boards), a rigid or flexible interconnect (e.g., tape or other type of interconnects), a flexible circuit substrate, a flexible plastic substrate, or other appropriate structures. In various embodiments, base 150 may be implemented with the various features and attributes described for circuit board 170, and vice versa.

Socket 104 may include a cavity 106 configured to receive infrared imaging module 100 (e.g., as shown in the assembled view of FIG. 2). Infrared imaging module 100 and/or socket 104 may include appropriate tabs, arms, pins, fasteners, or any other appropriate engagement members which may be used to secure infrared imaging module 100 to or within socket 104 using friction, tension, adhesion, and/or any other appropriate manner. Socket 104 may include engagement members 107 that may engage surfaces 109 of housing 120 when infrared imaging module 100 is inserted into a cavity 106 of socket 104. Other types of engagement members may be used in other embodiments.

Infrared imaging module 100 may be electrically connected with socket 104 through appropriate electrical connections (e.g., contacts, pins, wires, or any other appropriate connections). For example, socket 104 may include electrical connections 108 which may contact corresponding electrical connections of infrared imaging module 100 (e.g., interconnect pads, contacts, or other electrical connections on side or bottom surfaces of circuit board 170, bond pads 142 or other electrical connections on base 150, or other connections). Electrical connections 108 may be made from any desired material (e.g., copper or any other appropriate conductive material). In one embodiment, electrical connections 108 may be mechanically biased to press against electrical connections of infrared imaging module 100 when infrared imaging module 100 is inserted into cavity 106 of socket 104. In one embodiment, electrical connections 108 may at least partially secure infrared imaging module 100 in socket 104. Other types of electrical connections may be used in other embodiments.

Socket 104 may be electrically connected with host device 102 through similar types of electrical connections. For example, in one embodiment, host device 102 may include electrical connections (e.g., soldered connections, snap-in connections, or other connections) that connect with electrical connections 108 passing through apertures 190. In various embodiments, such electrical connections may be made to the sides and/or bottom of socket 104.

Various components of infrared imaging module 100 may be implemented with flip chip technology which may be used to mount components directly to circuit boards without the additional clearances typically needed for wire bond connections. Flip chip connections may be used, as an example, to reduce the overall size of infrared imaging module 100 for use in compact small form factor applications. For example, in one embodiment, processing module 160 may be mounted to circuit board 170 using flip chip connections. For example, infrared imaging module 100 may be implemented with such flip chip configurations.

In various embodiments, infrared imaging module 100 and/or associated components may be implemented in accordance with various techniques (e.g., wafer level packaging techniques) as set forth in U.S. patent application Ser. No. 12/844,124 filed Jul. 27, 2010, and U.S. Provisional Patent Application No. 61/469,651 filed Mar. 30, 2011, which are incorporated herein by reference in their entirety. Furthermore, in accordance with one or more embodiments, infrared imaging module 100 and/or associated components may be implemented, calibrated, tested, and/or used in accordance with various techniques, such as for example as set forth in U.S. Pat. No. 7,470,902 issued Dec. 30, 2008, U.S. Pat. No. 6,028,309 issued Feb. 22, 2000, U.S. Pat. No. 6,812,465 issued Nov. 2, 2004, U.S. Pat. No. 7,034,301 issued Apr. 25, 2006, U.S. Pat. No. 7,679,048 issued Mar. 16, 2010, U.S. Pat. No. 7,470,904 issued Dec. 30, 2008, U.S. patent application Ser. No. 12/202,880 filed Sep. 2, 2008, and U.S. patent application Ser. No. 12/202,896 filed Sep. 2, 2008, which are incorporated herein by reference in their entirety.

In some embodiments, host device 102 may include other components 198 such as a non-thermal camera (e.g., a visible light camera or other type of non-thermal imager). The non-thermal camera may be a small form factor imaging module or imaging device, and may, in some embodiments, be implemented in a manner similar to the various embodiments of infrared imaging module 100 disclosed herein, with one or more sensors and/or sensor arrays responsive to radiation in non-thermal spectrums (e.g., radiation in visible light wavelengths, ultraviolet wavelengths, and/or other non-thermal wavelengths). For example, in some embodiments, the non-thermal camera may be implemented with a charge-coupled device (CCD) sensor, an electron multiplying CCD (EMCCD) sensor, a complementary metal-oxide-semiconductor (CMOS) sensor, a scientific CMOS (sC-MOS) sensor, or other filters and/or sensors.

In some embodiments, the non-thermal camera may be co-located with infrared imaging module 100 and oriented such that a field-of-view (FOV) of the non-thermal camera at least partially overlaps a FOV of infrared imaging module 100. In one example, infrared imaging module 100 and a non-thermal camera may be implemented as a dual sensor module sharing a common substrate according to various techniques described in U.S. Provisional Patent Application No. 61/748,018 filed Dec. 31, 2012, which is incorporated herein by reference.

For embodiments having such a non-thermal light camera, various components (e.g., processor 195, processing module 160, and/or other processing component) may be configured to superimpose, fuse, blend, or otherwise combine infrared images (e.g., including thermal images) captured by infrared imaging module 100 and non-thermal images (e.g., including visible light images) captured by a non-thermal camera, whether captured at substantially the same time or different times (e.g., time-spaced over hours, days, daytime versus nighttime, and/or otherwise).

In some embodiments, thermal and non-thermal images may be processed to generate combined images (e.g., one or more processes performed on such images in some embodiments). For example, scene-based NUC processing may be performed (as further described herein), true color processing may be performed, and/or high contrast processing may be performed.

Regarding true color processing, thermal images may be blended with non-thermal images by, for example, blending a radiometric component of a thermal image with a corresponding component of a non-thermal image according to a blending parameter, which may be adjustable by a user and/or machine in some embodiments. For example, luminance or chrominance components of the thermal and non-thermal images may be combined according to the blending parameter. In one embodiment, such blending techniques may be referred to as true color infrared imagery. For example, in daytime imaging, a blended image may comprise a non-thermal color image, which includes a luminance component and a chrominance component, with its luminance value replaced by the luminance value from a thermal image. The use of the luminance data from the thermal image causes the intensity of the true non-thermal color image to brighten or dim based on the temperature of the object. As such, these blending techniques provide thermal imaging for daytime or visible light images.

Regarding high contrast processing, high spatial frequency content may be obtained from one or more of the thermal and non-thermal images (e.g., by performing high pass filtering, difference imaging, and/or other techniques). A combined image may include a radiometric component of a thermal image and a blended component including infrared (e.g., thermal) characteristics of a scene blended with the high spatial frequency content, according to a blending parameter, which may be adjustable by a user and/or machine in some embodiments. In some embodiments, high spatial frequency content from non-thermal images may be blended with thermal images by superimposing the high spatial frequency content onto the thermal images, where the high spatial frequency content replaces or overwrites those portions of the thermal images corresponding to where the high spatial frequency content exists. For example, the high spatial frequency content may include edges of objects depicted in images of a scene, but may not exist within the interior of such objects. In such embodiments, blended image data may simply include the high spatial frequency content, which may subsequently be encoded into one or more components of combined images.

For example, a radiometric component of thermal image may be a chrominance component of the thermal image, and the high spatial frequency content may be derived from the luminance and/or chrominance components of a non-thermal image. In this embodiment, a combined image may include the radiometric component (e.g., the chrominance component of the thermal image) encoded into a chrominance component of the combined image and the high spatial frequency content directly encoded (e.g., as blended image data but with no thermal image contribution) into a luminance component of the combined image. By doing so, a radiometric calibration of the radiometric component of the thermal image may be retained. In similar embodiments, blended image data may include the high spatial frequency content added to a luminance component of the thermal images, and the resulting blended data encoded into a luminance component of resulting combined images.

For example, any of the techniques disclosed in the following applications may be used in various embodiments: U.S. patent application Ser. No. 12/477,828 filed Jun. 3, 2009; U.S. patent application Ser. No. 12/766,739 filed Apr. 23, 2010; U.S. patent application Ser. No. 13/105,765 filed May 11, 2011; U.S. patent application Ser. No. 13/437,645 filed Apr. 2, 2012; U.S. Provisional Patent Application No. 61/473,207 filed Apr. 8, 2011; U.S. Provisional Patent Application No. 61/746,069 filed Dec. 26, 2012; U.S. Provisional Patent Application No. 61/746,074 filed Dec. 26, 2012; U.S. Provisional Patent Application No. 61/748,018 filed Dec. 31, 2012; U.S. Provisional Patent Application No. 61/792,582 filed Mar. 15, 2013; U.S. Provisional Patent Application No. 61/793,952 filed Mar. 15, 2013; and International Patent Application No. PCT/EP2011/056432 filed Apr. 21, 2011, all of such applications are incorporated herein by reference in their entirety. Any of the techniques described herein, or described in other applications or patents referenced herein, may be applied to any of the various thermal devices, non-thermal devices, and uses described herein.

Referring again to FIG. 1, in various embodiments, host device 102 may include shutter 105. In this regard, shutter 105 may be selectively positioned over socket 104 (e.g., as identified by arrows 103) while infrared imaging module 100 is installed therein. In this regard, shutter 105 may be used, for example, to protect infrared imaging module 100 when not in use. Shutter 105 may also be used as a temperature reference as part of a calibration process (e.g., a NUC process or other calibration processes) for infrared imaging module 100 as would be understood by one skilled in the art.

In various embodiments, shutter 105 may be made from various materials such as, for example, polymers, glass, aluminum (e.g., painted or anodized) or other materials. In various embodiments, shutter 105 may include one or more coatings to selectively filter electromagnetic radiation and/or adjust various optical properties of shutter 105 (e.g., a uniform blackbody coating or a reflective gold coating).

In another embodiment, shutter 105 may be fixed in place to protect infrared imaging module 100 at all times. In this case, shutter 105 or a portion of shutter 105 may be made from appropriate materials (e.g., polymers or infrared transmitting materials such as silicon, germanium, zinc selenide, or chalcogenide glasses) that do not substantially filter desired infrared wavelengths. In another embodiment, a shutter may be implemented as part of infrared imaging module 100 (e.g., within or as part of a lens barrel or other components of infrared imaging module 100), as would be understood by one skilled in the art.

Alternatively, in another embodiment, a shutter (e.g., shutter 105 or other type of external or internal shutter) need not be provided, but rather a NUC process or other type of calibration may be performed using shutterless techniques. In another embodiment, a NUC process or other type of calibration using shutterless techniques may be performed in combination with shutter-based techniques.

Infrared imaging module 100 and host device 102 may be implemented in accordance with any of the various techniques set forth in U.S. Provisional Patent Application No. 61/495,873 filed Jun. 10, 2011, U.S. Provisional Patent Application No. 61/495,879 filed Jun. 10, 2011, and U.S. Provisional Patent Application No. 61/495,888 filed Jun. 10, 2011, which are incorporated herein by reference in their entirety.

In various embodiments, the components of host device 102 and/or infrared imaging module 100 may be implemented as a local or distributed system with components in communication with each other over wired and/or wireless networks. Accordingly, the various operations identified in this disclosure may be performed by local and/or remote components as may be desired in particular implementations.

Figure 5:
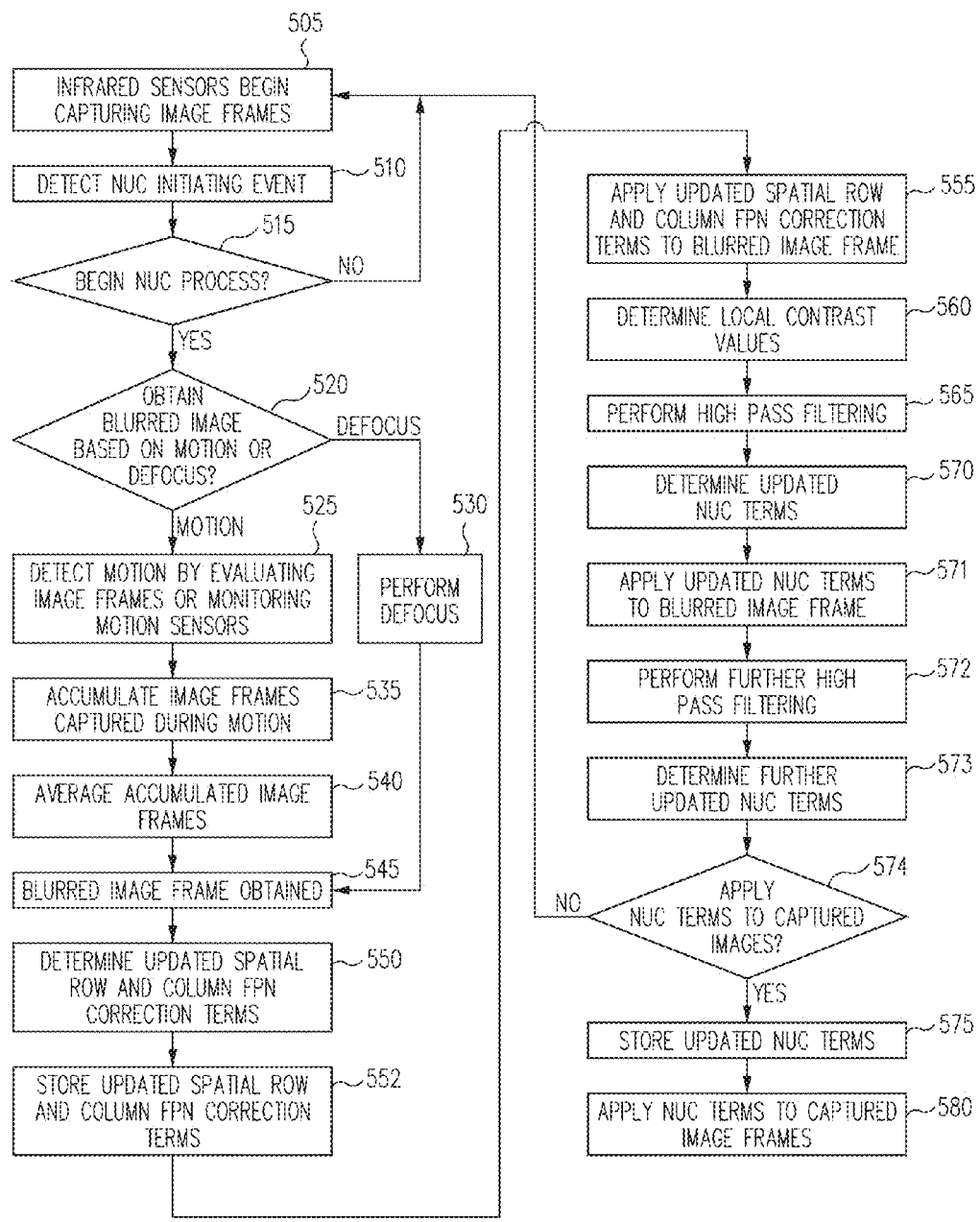
FIG. 5 illustrates a flow diagram of various operations to determine non-uniformity correction (NUC) terms in accordance with an embodiment of the disclosure.

FIG. 5 illustrates a flow diagram of various operations to determine NUC terms in accordance with an embodiment of the disclosure. In some embodiments, the operations of FIG. 5 may be performed by processing module 160 or processor 195 (both also generally referred to as a processor) operating on image frames captured by infrared sensors 132.

In block 505, infrared sensors 132 begin capturing image frames of a scene. Typically, the scene will be the real world environment in which host device 102 is currently located. In this regard, shutter 105 (if optionally provided) may be opened to permit infrared imaging module to receive infrared radiation from the scene. Infrared sensors 132 may continue capturing image frames during all operations shown in FIG. 5. In this regard, the continuously captured image frames may be used for various operations as further discussed. In one embodiment, the captured image frames may be temporally filtered (e.g., in accordance with the process of block 826 further described herein with regard to FIG. 8) and be processed by other terms (e.g., factory gain terms 812, factory offset terms 816, previously determined NUC terms 817, column FPN terms 820, and row FPN terms 824 as further described herein with regard to FIG. 8) before they are used in the operations shown in FIG. 5.

In block 510, a NUC process initiating event is detected. In one embodiment, the NUC process may be initiated in response to physical movement of host device 102. Such movement may be detected, for example, by motion sensors 194 which may be polled by a processor. In one example, a user may move host device 102 in a particular manner, such as by intentionally waving host device 102 back and forth in an "erase" or "swipe" movement. In this regard, the user may move host device 102 in accordance with a predetermined speed and direction (velocity), such as in an up and down, side to side, or other pattern to initiate the NUC process. In this example, the use of such movements may permit the user to intuitively operate host device 102 to simulate the "erasing" of noise in captured image frames.

In another example, a NUC process may be initiated by host device 102 if motion exceeding a threshold value is detected (e.g., motion greater than expected for ordinary use). It is contemplated that any desired type of spatial translation of host device 102 may be used to initiate the NUC process.

In yet another example, a NUC process may be initiated by host device 102 if a minimum time has elapsed since a previously performed NUC process. In a further example, a NUC process may be initiated by host device 102 if infrared imaging module 100 has experienced a minimum temperature change since a previously performed NUC process. In a still further example, a NUC process may be continuously initiated and repeated.

In block 515, after a NUC process initiating event is detected, it is determined whether the NUC process should actually be performed. In this regard, the NUC process may be selectively initiated based on whether one or more additional conditions are met. For example, in one embodiment, the NUC process may not be performed unless a minimum time has elapsed since a previously performed NUC process. In another embodiment, the NUC process may not be performed unless infrared imaging module 100 has experienced a minimum temperature change since a previously performed NUC process. Other criteria or conditions may be used in other embodiments. If appropriate criteria or conditions have been met, then the flow diagram continues to block 520. Otherwise, the flow diagram returns to block 505.

In the NUC process, blurred image frames may be used to determine NUC terms which may be applied to captured image frames to correct for FPN. As discussed, in one embodiment, the blurred image frames may be obtained by accumulating multiple image frames of a moving scene (e.g., captured while the scene and/or the thermal imager is in motion). In another embodiment, the blurred image frames may be obtained by defocusing an optical element or other component of the thermal imager.

Accordingly, in block 520 a choice of either approach is provided. If the motion-based approach is used, then the flow diagram continues to block 525. If the defocus-based approach is used, then the flow diagram continues to block 530.

Referring now to the motion-based approach, in block 525 motion is detected. For example, in one embodiment, motion may be detected based on the image frames captured by infrared sensors 132. In this regard, an appropriate motion detection process (e.g., an image registration process, a frame-to-frame difference calculation, or other appropriate process) may be applied to captured image frames to determine whether motion is present (e.g., whether static or moving image frames have been captured). For example, in one embodiment, it can be determined whether pixels or regions around the pixels of consecutive image frames have changed more than a user defined amount (e.g., a percentage and/or threshold value). If at least a given percentage of pixels have changed by at least the user defined amount, then motion will be detected with sufficient certainty to proceed to block 535.

In another embodiment, motion may be determined on a per pixel basis, wherein only pixels that exhibit significant changes are accumulated to provide the blurred image frame. For example, counters may be provided for each pixel and used to ensure that the same number of pixel values are accumulated for each pixel, or used to average the pixel values based on the number of pixel values actually accumulated for each pixel. Other types of image-based motion detection may be performed such as performing a Radon transform.

In another embodiment, motion may be detected based on data provided by motion sensors 194. In one embodiment, such motion detection may include detecting whether host device 102 is moving along a relatively straight trajectory through space. For example, if host device 102 is moving along a relatively straight trajectory, then it is possible that certain objects appearing in the imaged scene may not be sufficiently blurred (e.g., objects in the scene that may be aligned with or moving substantially parallel to the straight trajectory). Thus, in such an embodiment, the motion detected by motion sensors 194 may be conditioned on host device 102 exhibiting, or not exhibiting, particular trajectories.

In yet another embodiment, both a motion detection process and motion sensors 194 may be used. Thus, using any of these various embodiments, a determination can be made as to whether or not each image frame was captured while at least a portion of the scene and host device 102 were in motion relative to each other (e.g., which may be caused by host device 102 moving relative to the scene, at least a portion of the scene moving relative to host device 102, or both).

It is expected that the image frames for which motion was detected may exhibit some secondary blurring of the captured scene (e.g., blurred thermal image data associated with the scene) due to the thermal time constants of infrared sensors 132 (e.g., microbolometer thermal time constants) interacting with the scene movement.

In block 535, image frames for which motion was detected are accumulated. For example, if motion is detected for a continuous series of image frames, then the image frames of the series may be accumulated. As another example, if motion is detected for only some image frames, then the non-moving image frames may be skipped and not included in the accumulation. Thus, a continuous or discontinuous set of image frames may be selected to be accumulated based on the detected motion.

In block 540, the accumulated image frames are averaged to provide a blurred image frame. Because the accumulated image frames were captured during motion, it is expected that actual scene information will vary between the image frames and thus cause the scene information to be further blurred in the resulting blurred image frame (block 545).

In contrast, FPN (e.g., caused by one or more components of infrared imaging module 100) will remain fixed over at least short periods of time and over at least limited changes in scene irradiance during motion. As a result, image frames captured in close proximity in time and space during motion will suffer from identical or at least very similar FPN. Thus, although scene information may change in consecutive image frames, the FPN will stay essentially constant. By averaging, multiple image frames captured during motion will blur the scene information, but will not blur the FPN. As a result, FPN will remain more clearly defined in the blurred image frame provided in block 545 than the scene information.

In one embodiment, 32 or more image frames are accumulated and averaged in blocks 535 and 540. However, any desired number of image frames may be used in other embodiments, but with generally decreasing correction accuracy as frame count is decreased.

Referring now to the defocus-based approach, in block 530, a defocus operation may be performed to intentionally defocus the image frames captured by infrared sensors 132. For example, in one embodiment, one or more actuators 199 may be used to adjust, move, or otherwise translate optical element 180, infrared sensor assembly 128, and/or other components of infrared imaging module 100 to cause infrared sensors 132 to capture a blurred (e.g., unfocused) image frame of the scene. Other non-actuator based techniques are also contemplated for intentionally defocusing infrared image frames such as, for example, manual (e.g., user-initiated) defocusing.

Although the scene may appear blurred in the image frame, FPN (e.g., caused by one or more components of infrared imaging module 100) will remain unaffected by the defocusing operation. As a result, a blurred image frame of the scene will be provided (block 545) with FPN remaining more clearly defined in the blurred image than the scene information.

In the above discussion, the defocus-based approach has been described with regard to a single captured image frame. In another embodiment, the defocus-based approach may include accumulating multiple image frames while the infrared imaging module 100 has been defocused and averaging the defocused image frames to remove the effects of temporal noise and provide a blurred image frame in block 545.

Thus, it will be appreciated that a blurred image frame may be provided in block 545 by either the motion-based approach or the defocus-based approach. Because much of the scene information will be blurred by either motion, defocusing, or both, the blurred image frame may be effectively considered a low pass filtered version of the original captured image frames with respect to scene information.

In block 550, the blurred image frame is processed to determine updated row and column FPN terms (e.g., if row and column FPN terms have not been previously determined then the updated row and column FPN terms may be new row and column FPN terms in the first iteration of block 550). As used in this disclosure, the terms row and column may be used interchangeably depending on the orientation of infrared sensors 132 and/or other components of infrared imaging module 100.

In one embodiment, block 550 includes determining a spatial FPN correction term for each row of the blurred image frame (e.g., each row may have its own spatial FPN correction term), and also determining a spatial FPN correction term for each column of the blurred image frame (e.g., each column may have its own spatial FPN correction term). Such processing may be used to reduce the spatial and slowly varying (1/f) row and column FPN inherent in thermal imagers caused by, for example, 1/f noise characteristics of amplifiers in ROIC 402 which may manifest as vertical and horizontal stripes in image frames.

Advantageously, by determining spatial row and column FPN terms using the blurred image frame, there will be a reduced risk of vertical and horizontal objects in the actual imaged scene from being mistaken for row and column noise (e.g., real scene content will be blurred while FPN remains unblurred).

Figure 6:
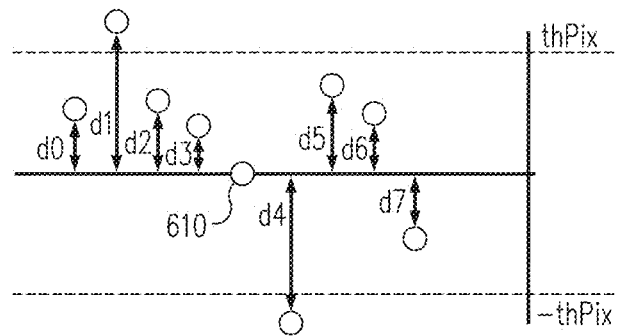
FIG. 6 illustrates differences between neighboring pixels in accordance with an embodiment of the disclosure.

In one embodiment, row and column FPN terms may be determined by considering differences between neighboring pixels of the blurred image frame. For example, FIG. 6 illustrates differences between neighboring pixels in accordance with an embodiment of the disclosure. Specifically, in FIG. 6 a pixel 610 is compared to its 8 nearest horizontal neighbors: d0-d3 on one side and d4-d7 on the other side. Differences between the neighbor pixels can be averaged to obtain an estimate of the offset error of the illustrated group of pixels. An offset error may be calculated for each pixel in a row or column and the average result may be used to correct the entire row or column.

To prevent real scene data from being interpreted as noise, upper and lower threshold values may be used (thPix and −thPix). Pixel values falling outside these threshold values (pixels d1 and d4 in this example) are not used to obtain the offset error. In addition, the maximum amount of row and column FPN correction may be limited by these threshold values.

Further techniques for performing spatial row and column FPN correction processing are set forth in U.S. patent application Ser. No. 12/396,340 filed Mar. 2, 2009 which is incorporated herein by reference in its entirety.

Referring again to FIG. 5, the updated row and column FPN terms determined in block 550 are stored (block 552) and applied (block 555) to the blurred image frame provided in block 545. After these terms are applied, some of the spatial row and column FPN in the blurred image frame may be reduced. However, because such terms are applied generally to rows and columns, additional FPN may remain such as spatially uncorrelated FPN associated with pixel to pixel drift or other causes. Neighborhoods of spatially correlated FPN may also remain which may not be directly associated with individual rows and columns. Accordingly, further processing may be performed as discussed below to determine NUC terms.

In block 560, local contrast values (e.g., edges or absolute values of gradients between adjacent or small groups of pixels) in the blurred image frame are determined. If scene information in the blurred image frame includes contrasting areas that have not been significantly blurred (e.g., high contrast edges in the original scene data), then such features may be identified by a contrast determination process in block 560.

For example, local contrast values in the blurred image frame may be calculated, or any other desired type of edge detection process may be applied to identify certain pixels in the blurred image as being part of an area of local contrast. Pixels that are marked in this manner may be considered as containing excessive high spatial frequency scene information that would be interpreted as FPN (e.g., such regions may correspond to portions of the scene that have not been sufficiently blurred). As such, these pixels may be excluded from being used in the further determination of NUC terms. In one embodiment, such contrast detection processing may rely on a threshold that is higher than the expected contrast value associated with FPN (e.g., pixels exhibiting a contrast value higher than the threshold may be considered to be scene information, and those lower than the threshold may be considered to be exhibiting FPN).

In one embodiment, the contrast determination of block 560 may be performed on the blurred image frame after row and column FPN terms have been applied to the blurred image frame (e.g., as shown in FIG. 5). In another embodiment, block 560 may be performed prior to block 550 to determine contrast before row and column FPN terms are determined (e.g., to prevent scene based contrast from contributing to the determination of such terms).

Following block 560, it is expected that any high spatial frequency content remaining in the blurred image frame may be generally attributed to spatially uncorrelated FPN. In this regard, following block 560, much of the other noise or actual desired scene based information has been removed or excluded from the blurred image frame due to: intentional blurring of the image frame (e.g., by motion or defocusing in blocks 520 through 545), application of row and column FPN terms (block 555), and contrast determination (block 560).

Thus, it can be expected that following block 560, any remaining high spatial frequency content (e.g., exhibited as areas of contrast or differences in the blurred image frame) may be attributed to spatially uncorrelated FPN. Accordingly, in block 565, the blurred image frame is high pass filtered. In one embodiment, this may include applying a high pass filter to extract the high spatial frequency content from the blurred image frame. In another embodiment, this may include applying a low pass filter to the blurred image frame and taking a difference between the low pass filtered image frame and the unfiltered blurred image frame to obtain the high spatial frequency content. In accordance with various embodiments of the present disclosure, a high pass filter may be implemented by calculating a mean difference between a sensor signal (e.g., a pixel value) and its neighbors.

In block 570, a flat field correction process is performed on the high pass filtered blurred image frame to determine updated NUC terms (e.g., if a NUC process has not previously been performed then the updated NUC terms may be new NUC terms in the first iteration of block 570).

Figure 7:
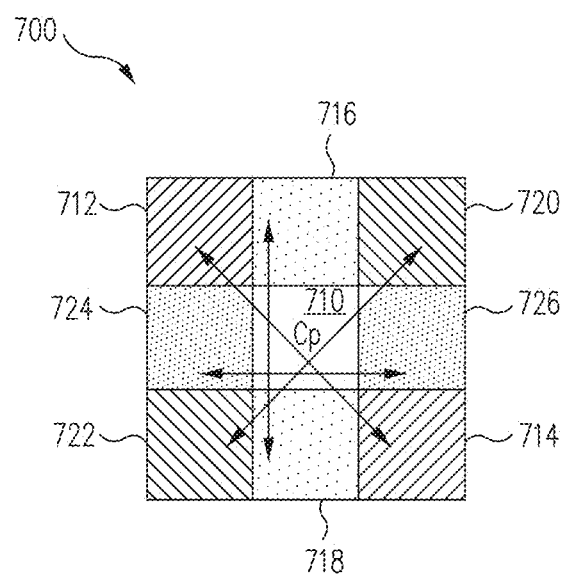
FIG. 7 illustrates a flat field correction technique in accordance with an embodiment of the disclosure.

For example, FIG. 7 illustrates a flat field correction technique 700 in accordance with an embodiment of the disclosure. In FIG. 7, a NUC term may be determined for each pixel 710 of the blurred image frame using the values of its neighboring pixels 712 to 726. For each pixel 710, several gradients may be determined based on the absolute difference between the values of various adjacent pixels. For example, absolute value differences may be determined between: pixels 712 and 714 (a left to right diagonal gradient), pixels 716 and 718 (a top to bottom vertical gradient), pixels 720 and 722 (a right to left diagonal gradient), and pixels 724 and 726 (a left to right horizontal gradient).

These absolute differences may be summed to provide a summed gradient for pixel 710. A weight value may be determined for pixel 710 that is inversely proportional to the summed gradient. This process may be performed for all pixels 710 of the blurred image frame until a weight value is provided for each pixel 710. For areas with low gradients (e.g., areas that are blurry or have low contrast), the weight value will be close to one. Conversely, for areas with high gradients, the weight value will be zero or close to zero. The update to the NUC term as estimated by the high pass filter is multiplied with the weight value.

In one embodiment, the risk of introducing scene information into the NUC terms can be further reduced by applying some amount of temporal damping to the NUC term determination process. For example, a temporal damping factor λ between 0 and 1 may be chosen such that the new NUC term ($NUC_{NEW}$) stored is a weighted average of the old NUC term ($NUC_{OLD}$) and the estimated updated NUC term ($NUC_{UPDATE}$). In one embodiment, this can be expressed as $NUC_{NEW} = \lambda \cdot NUC_{OLD} + (1-\lambda) \cdot (NUC_{OLD} + NUC_{UPDATE})$.

Although the determination of NUC terms has been described with regard to gradients, local contrast values may be used instead where appropriate. Other techniques may also be used such as, for example, standard deviation calculations. Other types flat field correction processes may be performed to determine NUC terms including, for example, various processes identified in U.S. Pat. No. 6,028, 309 issued Feb. 22, 2000, U.S. Pat. No. 6,812,465 issued Nov. 2, 2004, and U.S. patent application Ser. No. 12/114, 865 filed May 5, 2008, which are incorporated herein by reference in their entirety.

Referring again to FIG. 5, block 570 may include additional processing of the NUC terms. For example, in one embodiment, to preserve the scene signal mean, the sum of all NUC terms may be normalized to zero by subtracting the NUC term mean from each NUC term. Also in block 570, to avoid row and column noise from affecting the NUC terms, the mean value of each row and column may be subtracted from the NUC terms for each row and column. As a result, row and column FPN filters using the row and column FPN terms determined in block 550 may be better able to filter out row and column noise in further iterations (e.g., as further shown in FIG. 8) after the NUC terms are applied to captured images (e.g., in block 580 further discussed herein). In this regard, the row and column FPN filters may in general use more data to calculate the per row and per column offset coefficients (e.g., row and column FPN terms) and may thus provide a more robust alternative for reducing spatially correlated FPN than the NUC terms which are based on high pass filtering to capture spatially uncorrelated noise.

In blocks 571-573, additional high pass filtering and further determinations of updated NUC terms may be optionally performed to remove spatially correlated FPN with lower spatial frequency than previously removed by row and column FPN terms. In this regard, some variability in infrared sensors 132 or other components of infrared imaging module 100 may result in spatially correlated FPN noise that cannot be easily modeled as row or column noise. Such spatially correlated FPN may include, for example, window defects on a sensor package or a cluster of infrared sensors 132 that respond differently to irradiance than neighboring infrared sensors 132. In one embodiment, such spatially correlated FPN may be mitigated with an offset correction. If the amount of such spatially correlated FPN is significant, then the noise may also be detectable in the blurred image frame. Since this type of noise may affect a neighborhood of pixels, a high pass filter with a small kernel may not detect the FPN in the neighborhood (e.g., all values used in high pass filter may be taken from the neighborhood of affected pixels and thus may be affected by the same offset error). For example, if the high pass filtering of block 565 is performed with a small kernel (e.g., considering only immediately adjacent pixels that fall within a neighborhood of pixels affected by spatially correlated FPN), then broadly distributed spatially correlated FPN may not be detected.

Figure 11:
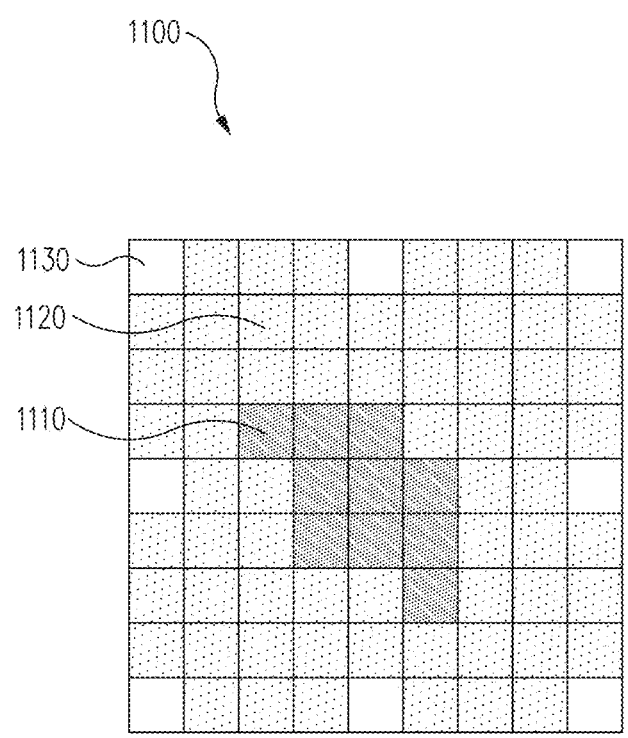
FIG. 11 illustrates spatially correlated fixed pattern noise (FPN) in a neighborhood of pixels in accordance with an embodiment of the disclosure.

For example, FIG. 11 illustrates spatially correlated FPN in a neighborhood of pixels in accordance with an embodiment of the disclosure. As shown in a sample image frame 1100, a neighborhood of pixels 1110 may exhibit spatially correlated FPN that is not precisely correlated to individual rows and columns and is distributed over a neighborhood of several pixels (e.g., a neighborhood of approximately 4 by 4 pixels in this example). Sample image frame 1100 also includes a set of pixels 1120 exhibiting substantially uniform response that are not used in filtering calculations, and a set of pixels 1130 that are used to estimate a low pass value for the neighborhood of pixels 1110. In one embodiment, pixels 1130 may be a number of pixels divisible by two in order to facilitate efficient hardware or software calculations.

Referring again to FIG. 5, in blocks 571-573, additional high pass filtering and further determinations of updated NUC terms may be optionally performed to remove spatially correlated FPN such as exhibited by pixels 1110. In block 571, the updated NUC terms determined in block 570 are applied to the blurred image frame. Thus, at this time, the blurred image frame will have been initially corrected for spatially correlated FPN (e.g., by application of the updated row and column FPN terms in block 555), and also initially corrected for spatially uncorrelated FPN (e.g., by application of the updated NUC terms applied in block 571).

In block 572, a further high pass filter is applied with a larger kernel than was used in block 565, and further updated NUC terms may be determined in block 573. For example, to detect the spatially correlated FPN present in pixels 1110, the high pass filter applied in block 572 may include data from a sufficiently large enough neighborhood of pixels such that differences can be determined between unaffected pixels (e.g., pixels 1120) and affected pixels (e.g., pixels 1110). For example, a low pass filter with a large kernel can be used (e.g., an N by N kernel that is much greater than 3 by 3 pixels) and the results may be subtracted to perform appropriate high pass filtering.

In one embodiment, for computational efficiency, a sparse kernel may be used such that only a small number of neighboring pixels inside an N by N neighborhood are used. For any given high pass filter operation using distant neighbors (e.g., a large kernel), there is a risk of modeling actual (potentially blurred) scene information as spatially correlated FPN. Accordingly, in one embodiment, the temporal damping factor 2 may be set close to 1 for updated NUC terms determined in block 573.

In various embodiments, blocks 571-573 may be repeated (e.g., cascaded) to iteratively perform high pass filtering with increasing kernel sizes to provide further updated NUC terms further correct for spatially correlated FPN of desired neighborhood sizes. In one embodiment, the decision to perform such iterations may be determined by whether spatially correlated FPN has actually been removed by the updated NUC terms of the previous performance of blocks 571-573.

After blocks 571-573 are finished, a decision is made regarding whether to apply the updated NUC terms to captured image frames (block 574). For example, if an average of the absolute value of the NUC terms for the entire image frame is less than a minimum threshold value, or greater than a maximum threshold value, the NUC terms may be deemed spurious or unlikely to provide meaningful correction. Alternatively, thresholding criteria may be applied to individual pixels to determine which pixels receive updated NUC terms. In one embodiment, the threshold values may correspond to differences between the newly calculated NUC terms and previously calculated NUC terms. In another embodiment, the threshold values may be independent of previously calculated NUC terms. Other tests may be applied (e.g., spatial correlation tests) to determine whether the NUC terms should be applied.

If the NUC terms are deemed spurious or unlikely to provide meaningful correction, then the flow diagram returns to block 505. Otherwise, the newly determined NUC terms are stored (block 575) to replace previous NUC terms (e.g., determined by a previously performed iteration of FIG. 5) and applied (block 580) to captured image frames.

Figure 8:
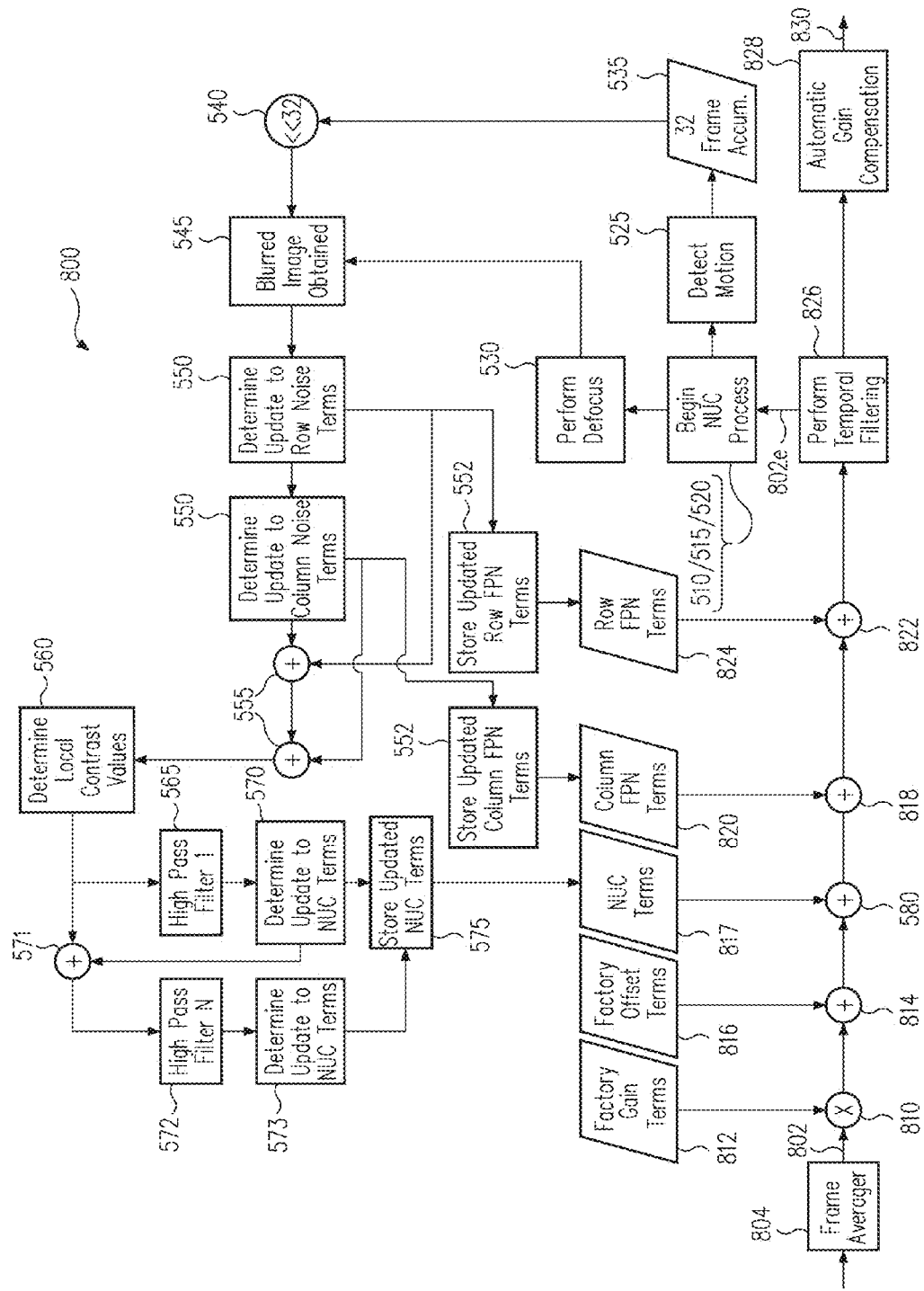
FIG. 8 illustrates various image processing techniques of FIG. 5 and other operations applied in an image processing pipeline in accordance with an embodiment of the disclosure.

FIG. 8 illustrates various image processing techniques of FIG. 5 and other operations applied in an image processing pipeline 800 in accordance with an embodiment of the disclosure. In this regard, pipeline 800 identifies various operations of FIG. 5 in the context of an overall iterative image processing scheme for correcting image frames provided by infrared imaging module 100. In some embodiments, pipeline 800 may be provided by processing module 160 or processor 195 (both also generally referred to as a processor) operating on image frames captured by infrared sensors 132.

Image frames captured by infrared sensors 132 may be provided to a frame averager 804 that integrates multiple image frames to provide image frames 802 with an improved signal to noise ratio. Frame averager 804 may be effectively provided by infrared sensors 132, ROIC 402, and other components of infrared sensor assembly 128 that are implemented to support high image capture rates. For example, in one embodiment, infrared sensor assembly 128 may capture infrared image frames at a frame rate of 240 Hz (e.g., 240 images per second). In this embodiment, such a high frame rate may be implemented, for example, by operating infrared sensor assembly 128 at relatively low voltages (e.g., compatible with mobile telephone voltages) and by using a relatively small array of infrared sensors 132 (e.g., an array of 64 by 64 infrared sensors in one embodiment).

In one embodiment, such infrared image frames may be provided from infrared sensor assembly 128 to processing module 160 at a high frame rate (e.g., 240 Hz or other frame rates). In another embodiment, infrared sensor assembly 128 may integrate over longer time periods, or multiple time periods, to provide integrated (e.g., averaged) infrared image frames to processing module 160 at a lower frame rate (e.g., 30 Hz, 9 Hz, or other frame rates). Further information regarding implementations that may be used to provide high image capture rates may be found in U.S. Provisional Patent Application No. 61/495,879 filed Jun. 10, 2011 which is incorporated herein by reference in its entirety.

Image frames 802 proceed through pipeline 800 where they are adjusted by various terms, temporally filtered, used to determine the various adjustment terms, and gain compensated.

In blocks 810 and 814, factory gain terms 812 and factory offset terms 816 are applied to image frames 802 to compensate for gain and offset differences, respectively, between the various infrared sensors 132 and/or other components of infrared imaging module 100 determined during manufacturing and testing.

In block 580, NUC terms 817 are applied to image frames 802 to correct for FPN as discussed. In one embodiment, if NUC terms 817 have not yet been determined (e.g., before a NUC process has been initiated), then block 580 may not be performed or initialization values may be used for NUC terms 817 that result in no alteration to the image data (e.g., offsets for every pixel would be equal to zero).

In blocks 818 and 822, column FPN terms 820 and row FPN terms 824, respectively, are applied to image frames 802. Column FPN terms 820 and row FPN terms 824 may be determined in accordance with block 550 as discussed. In one embodiment, if the column FPN terms 820 and row FPN terms 824 have not yet been determined (e.g., before a NUC process has been initiated), then blocks 818 and 822 may not be performed or initialization values may be used for the column FPN terms 820 and row FPN terms 824 that result in no alteration to the image data (e.g., offsets for every pixel would be equal to zero).

Figure 9:
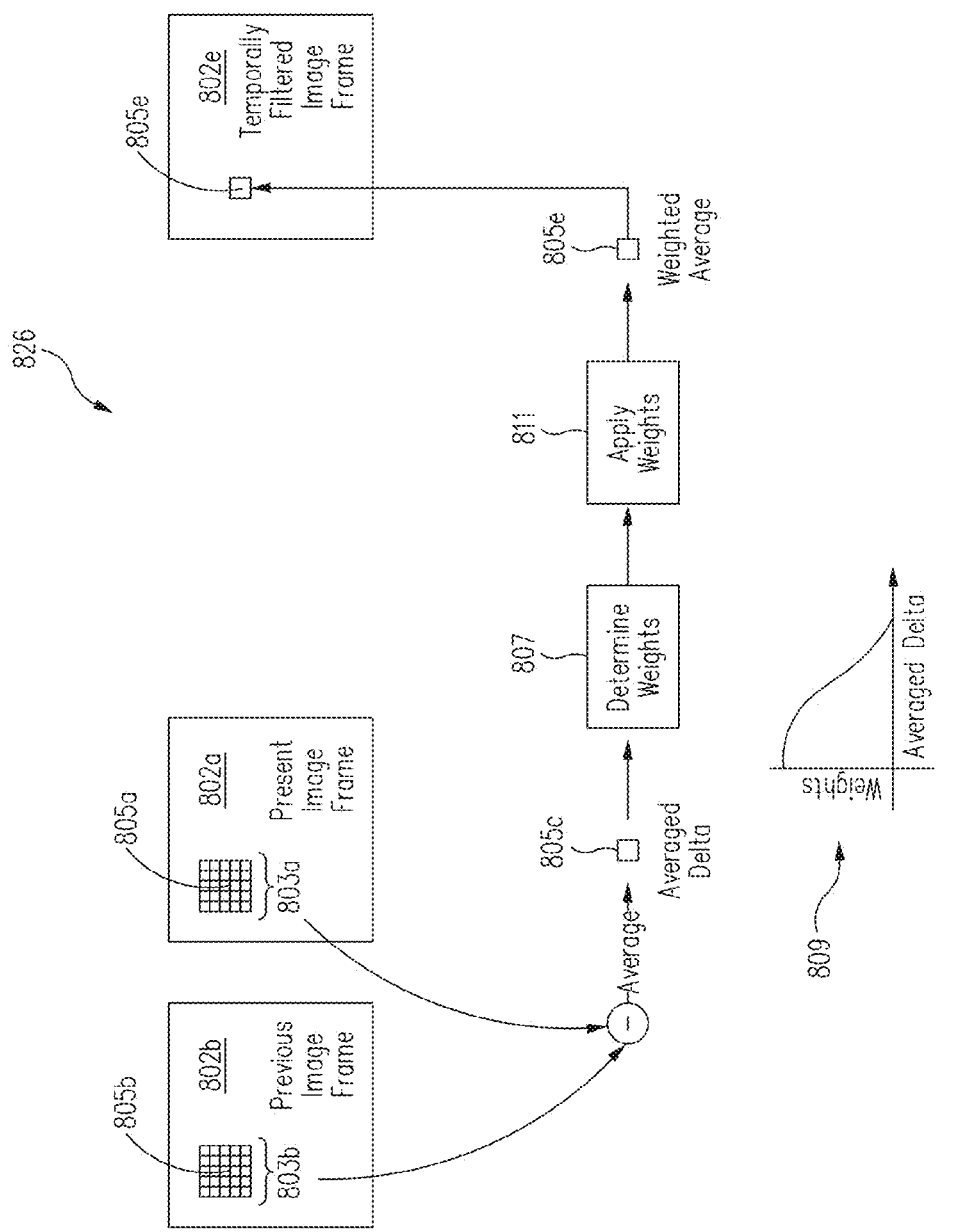
FIG. 9 illustrates a temporal noise reduction process in accordance with an embodiment of the disclosure.

In block 826, temporal filtering is performed on image frames 802 in accordance with a temporal noise reduction (TNR) process. FIG. 9 illustrates a TNR process in accordance with an embodiment of the disclosure. In FIG. 9, a presently received image frame 802a and a previously temporally filtered image frame 802b are processed to determine a new temporally filtered image frame 802e. Image frames 802a and 802b include local neighborhoods of pixels 803a and 803b centered around pixels 805a and 805b, respectively. Neighborhoods 803a and 803b correspond to the same locations within image frames 802a and 802b and are subsets of the total pixels in image frames 802a and 802b. In the illustrated embodiment, neighborhoods 803a and 803b include areas of 5 by 5 pixels. Other neighborhood sizes may be used in other embodiments.

Differences between corresponding pixels of neighborhoods 803a and 803b are determined and averaged to provide an averaged delta value 805c for the location corresponding to pixels 805a and 805b. Averaged delta value 805c may be used to determine weight values in block 807 to be applied to pixels 805a and 805b of image frames 802a and 802b.

In one embodiment, as shown in graph 809, the weight values determined in block 807 may be inversely proportional to averaged delta value 805c such that weight values drop rapidly towards zero when there are large differences between neighborhoods 803a and 803b. In this regard, large differences between neighborhoods 803a and 803b may indicate that changes have occurred within the scene (e.g., due to motion) and pixels 802a and 802b may be appropriately weighted, in one embodiment, to avoid introducing blur across frame-to-frame scene changes. Other associations between weight values and averaged delta value 805c may be used in various embodiments.

The weight values determined in block 807 may be applied to pixels 805a and 805b to determine a value for corresponding pixel 805e of image frame 802e (block 811). In this regard, pixel 805e may have a value that is a weighted average (or other combination) of pixels 805a and 805b, depending on averaged delta value 805c and the weight values determined in block 807.

For example, pixel 805e of temporally filtered image frame 802e may be a weighted sum of pixels 805a and 805b of image frames 802a and 802b. If the average difference between pixels 805a and 805b is due to noise, then it may be expected that the average change between neighborhoods 805a and 805b will be close to zero (e.g., corresponding to the average of uncorrelated changes). Under such circumstances, it may be expected that the sum of the differences between neighborhoods 805a and 805b will be close to zero. In this case, pixel 805a of image frame 802a may both be appropriately weighted so as to contribute to the value of pixel 805e.

However, if the sum of such differences is not zero (e.g., even differing from zero by a small amount in one embodiment), then the changes may be interpreted as being attributed to motion instead of noise. Thus, motion may be detected based on the average change exhibited by neighborhoods 805a and 805b. Under these circumstances, pixel 805a of image frame 802a may be weighted heavily, while pixel 805b of image frame 802b may be weighted lightly.

Other embodiments are also contemplated. For example, although averaged delta value 805c has been described as being determined based on neighborhoods 805a and 805b, in other embodiments averaged delta value 805c may be determined based on any desired criteria (e.g., based on individual pixels or other types of groups of sets of pixels).

In the above embodiments, image frame 802a has been described as a presently received image frame and image frame 802b has been described as a previously temporally filtered image frame. In another embodiment, image frames 802a and 802b may be first and second image frames captured by infrared imaging module 100 that have not been temporally filtered.

Figure 10:
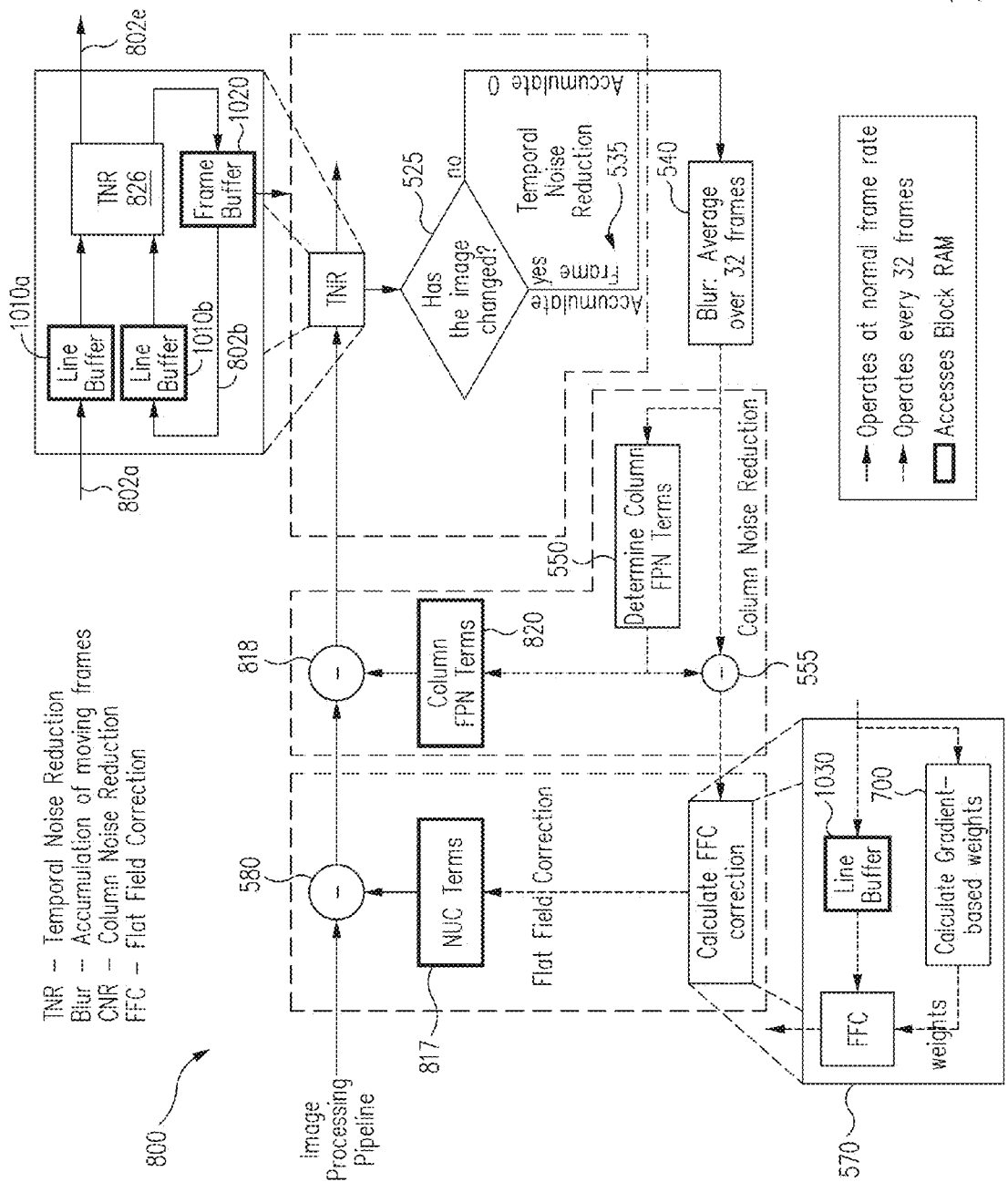
FIG. 10 illustrates particular implementation details of several processes of the image processing pipeline of FIG. 8 in accordance with an embodiment of the disclosure.

FIG. 10 illustrates further implementation details in relation to the TNR process of block 826. As shown in FIG. 10, image frames 802a and 802b may be read into line buffers 1010a and 1010b, respectively, and image frame 802b (e.g., the previous image frame) may be stored in a frame buffer 1020 before being read into line buffer 1010b. In one embodiment, line buffers 1010a-b and frame buffer 1020 may be implemented by a block of random access memory (RAM) provided by any appropriate component of infrared imaging module 100 and/or host device 102.

Referring again to FIG. 8, image frame 802e may be passed to an automatic gain compensation block 828 for further processing to provide a result image frame 830 that may be used by host device 102 as desired.

FIG. 8 further illustrates various operations that may be performed to determine row and column FPN terms and NUC terms as discussed. In one embodiment, these operations may use image frames 802e as shown in FIG. 8. Because image frames 802e have already been temporally filtered, at least some temporal noise may be removed and thus will not inadvertently affect the determination of row and column FPN terms 824 and 820 and NUC terms 817. In another embodiment, non-temporally filtered image frames 802 may be used.

In FIG. 8, blocks 510, 515, and 520 of FIG. 5 are collectively represented together. As discussed, a NUC process may be selectively initiated and performed in response to various NUC process initiating events and based on various criteria or conditions. As also discussed, the NUC process may be performed in accordance with a motion-based approach (blocks 525, 535, and 540) or a defocus-based approach (block 530) to provide a blurred image frame (block 545). FIG. 8 further illustrates various additional blocks 550, 552, 555, 560, 565, 570, 571, 572, 573, and 575 previously discussed with regard to FIG. 5.

As shown in FIG. 8, row and column FPN terms 824 and 820 and NUC terms 817 may be determined and applied in an iterative fashion such that updated terms are determined using image frames 802 to which previous terms have already been applied. As a result, the overall process of FIG. 8 may repeatedly update and apply such terms to continuously reduce the noise in image frames 830 to be used by host device 102.

Referring again to FIG. 10, further implementation details are illustrated for various blocks of FIGS. 5 and 8 in relation to pipeline 800. For example, blocks 525, 535, and 540 are shown as operating at the normal frame rate of image frames 802 received by pipeline 800. In the embodiment shown in FIG. 10, the determination made in block 525 is represented as a decision diamond used to determine whether a given image frame 802 has sufficiently changed such that it may be considered an image frame that will enhance the blur if added to other image frames and is therefore accumulated (block 535 is represented by an arrow in this embodiment) and averaged (block 540).

Also in FIG. 10, the determination of column FPN terms 820 (block 550) is shown as operating at an update rate that in this example is 1/32 of the sensor frame rate (e.g., normal frame rate) due to the averaging performed in block 540. Other update rates may be used in other embodiments. Although only column FPN terms 820 are identified in FIG. 10, row FPN terms 824 may be implemented in a similar fashion at the reduced frame rate.

FIG. 10 also illustrates further implementation details in relation to the NUC determination process of block 570. In this regard, the blurred image frame may be read to a line buffer 1030 (e.g., implemented by a block of RAM provided by any appropriate component of infrared imaging module 100 and/or host device 102). The flat field correction technique 700 of FIG. 7 may be performed on the blurred image frame.

In view of the present disclosure, it will be appreciated that techniques described herein may be used to remove various types of FPN (e.g., including very high amplitude FPN) such as spatially correlated row and column FPN and spatially uncorrelated FPN.

Other embodiments are also contemplated. For example, in one embodiment, the rate at which row and column FPN terms and/or NUC terms are updated can be inversely proportional to the estimated amount of blur in the blurred image frame and/or inversely proportional to the magnitude of local contrast values (e.g., determined in block 560).

In various embodiments, the described techniques may provide advantages over conventional shutter-based noise correction techniques. For example, by using a shutterless process, a shutter (e.g., such as shutter 105) need not be provided, thus permitting reductions in size, weight, cost, and mechanical complexity. Power and maximum voltage supplied to, or generated by, infrared imaging module 100 may also be reduced if a shutter does not need to be mechanically operated. Reliability will be improved by removing the shutter as a potential point of failure. A shutterless process also eliminates potential image interruption caused by the temporary blockage of the imaged scene by a shutter.

Also, by correcting for noise using intentionally blurred image frames captured from a real world scene (not a uniform scene provided by a shutter), noise correction may be performed on image frames that have irradiance levels similar to those of the actual scene desired to be imaged. This can improve the accuracy and effectiveness of noise correction terms determined in accordance with the various described techniques.

As discussed, in various embodiments, infrared imaging module 100 may be configured to operate at low voltage levels. In particular, infrared imaging module 100 may be implemented with circuitry configured to operate at low power and/or in accordance with other parameters that permit infrared imaging module 100 to be conveniently and effectively implemented in various types of host devices 102, such as mobile devices and other devices.

Figure 12:
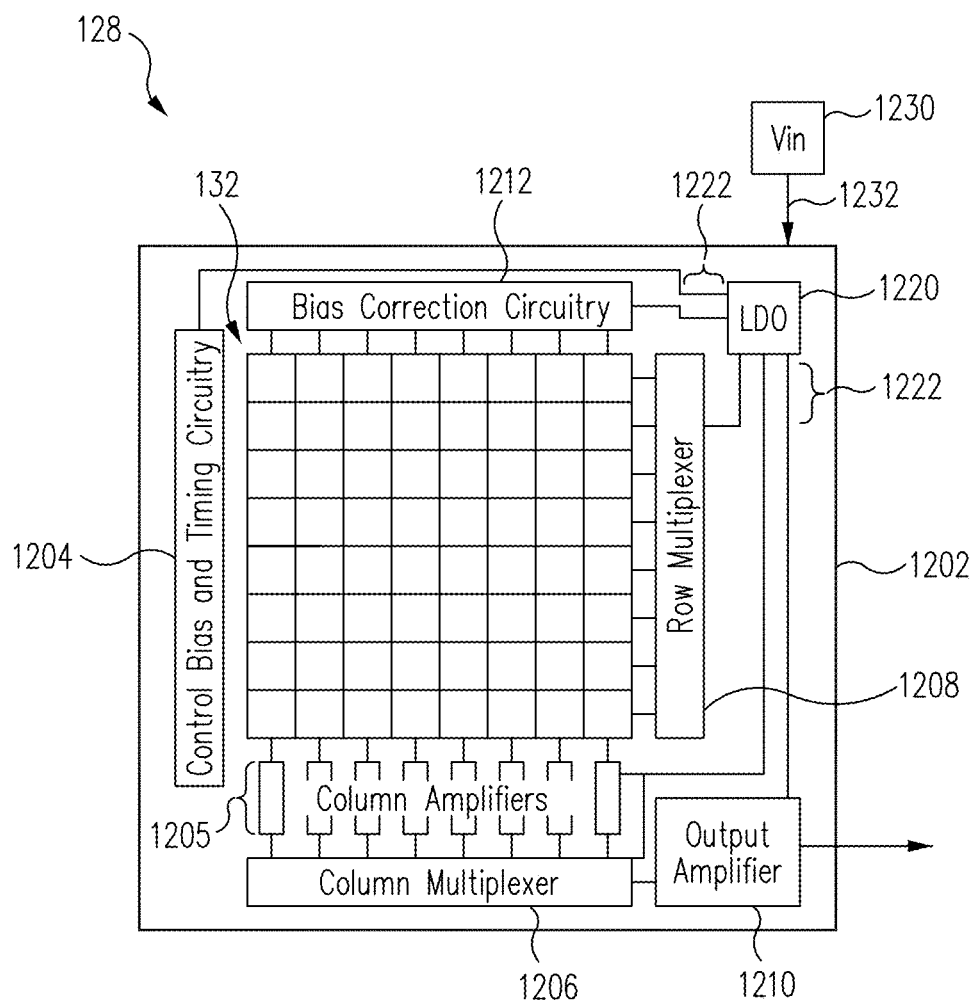
FIG. 12 illustrates a block diagram of another implementation of an infrared sensor assembly including an array of infrared sensors and a low-dropout regulator in accordance with an embodiment of the disclosure.

For example, FIG. 12 illustrates a block diagram of another implementation of infrared sensor assembly 128 including infrared sensors 132 and an LDO 1220 in accordance with an embodiment of the disclosure. As shown, FIG. 12 also illustrates various components 1202, 1204, 1205, 1206, 1208, and 1210 which may implemented in the same or similar manner as corresponding components previously described with regard to FIG. 4. FIG. 12 also illustrates bias correction circuitry 1212 which may be used to adjust one or more bias voltages provided to infrared sensors 132 (e.g., to compensate for temperature changes, self-heating, and/or other factors).

In some embodiments, LDO 1220 may be provided as part of infrared sensor assembly 128 (e.g., on the same chip and/or wafer level package as the ROIC). For example, LDO 1220 may be provided as part of an FPA with infrared sensor assembly 128. As discussed, such implementations may reduce power supply noise introduced to infrared sensor assembly 128 and thus provide an improved PSRR. In addition, by implementing the LDO with the ROIC, less die area may be consumed and fewer discrete die (or chips) are needed.

LDO 1220 receives an input voltage provided by a power source 1230 over a supply line 1232. LDO 1220 provides an output voltage to various components of infrared sensor assembly 128 over supply lines 1222. In this regard, LDO 1220 may provide substantially identical regulated output voltages to various components of infrared sensor assembly 128 in response to a single input voltage received from power source 1230, in accordance with various techniques described in, for example, U.S. patent application Ser. No. 14/101,245 filed Dec. 9, 2013 incorporated herein by reference in its entirety.

For example, in some embodiments, power source 1230 may provide an input voltage in a range of approximately 2.8 volts to approximately 11 volts (e.g., approximately 2.8 volts in one embodiment), and LDO 1220 may provide an output voltage in a range of approximately 1.5 volts to approximately 2.8 volts (e.g., approximately 2.8, 2.5, 2.4, and/or lower voltages in various embodiments). In this regard, LDO 1220 may be used to provide a consistent regulated output voltage, regardless of whether power source 1230 is implemented with a conventional voltage range of approximately 9 volts to approximately 11 volts, or a low voltage such as approximately 2.8 volts. As such, although various voltage ranges are provided for the input and output voltages, it is contemplated that the output voltage of LDO 1220 will remain fixed despite changes in the input voltage.

The implementation of LDO 1220 as part of infrared sensor assembly 128 provides various advantages over conventional power implementations for FPAs. For example, conventional FPAs typically rely on multiple power sources, each of which may be provided separately to the FPA, and separately distributed to the various components of the FPA. By regulating a single power source 1230 by LDO 1220, appropriate voltages may be separately provided (e.g., to reduce possible noise) to all components of infrared sensor assembly 128 with reduced complexity. The use of LDO 1220 also allows infrared sensor assembly 128 to operate in a consistent manner, even if the input voltage from power source 1230 changes (e.g., if the input voltage increases or decreases as a result of charging or discharging a battery or other type of device used for power source 1230).

The various components of infrared sensor assembly 128 shown in FIG. 12 may also be implemented to operate at lower voltages than conventional devices. For example, as discussed, LDO 1220 may be implemented to provide a low voltage (e.g., approximately 2.5 volts). This contrasts with the multiple higher voltages typically used to power conventional FPAs, such as: approximately 3.3 volts to approximately 5 volts used to power digital circuitry; approximately 3.3 volts used to power analog circuitry; and approximately 9 volts to approximately 11 volts used to power loads. Also, in some embodiments, the use of LDO 1220 may reduce or eliminate the need for a separate negative reference voltage to be provided to infrared sensor assembly 128.

Figure 13:
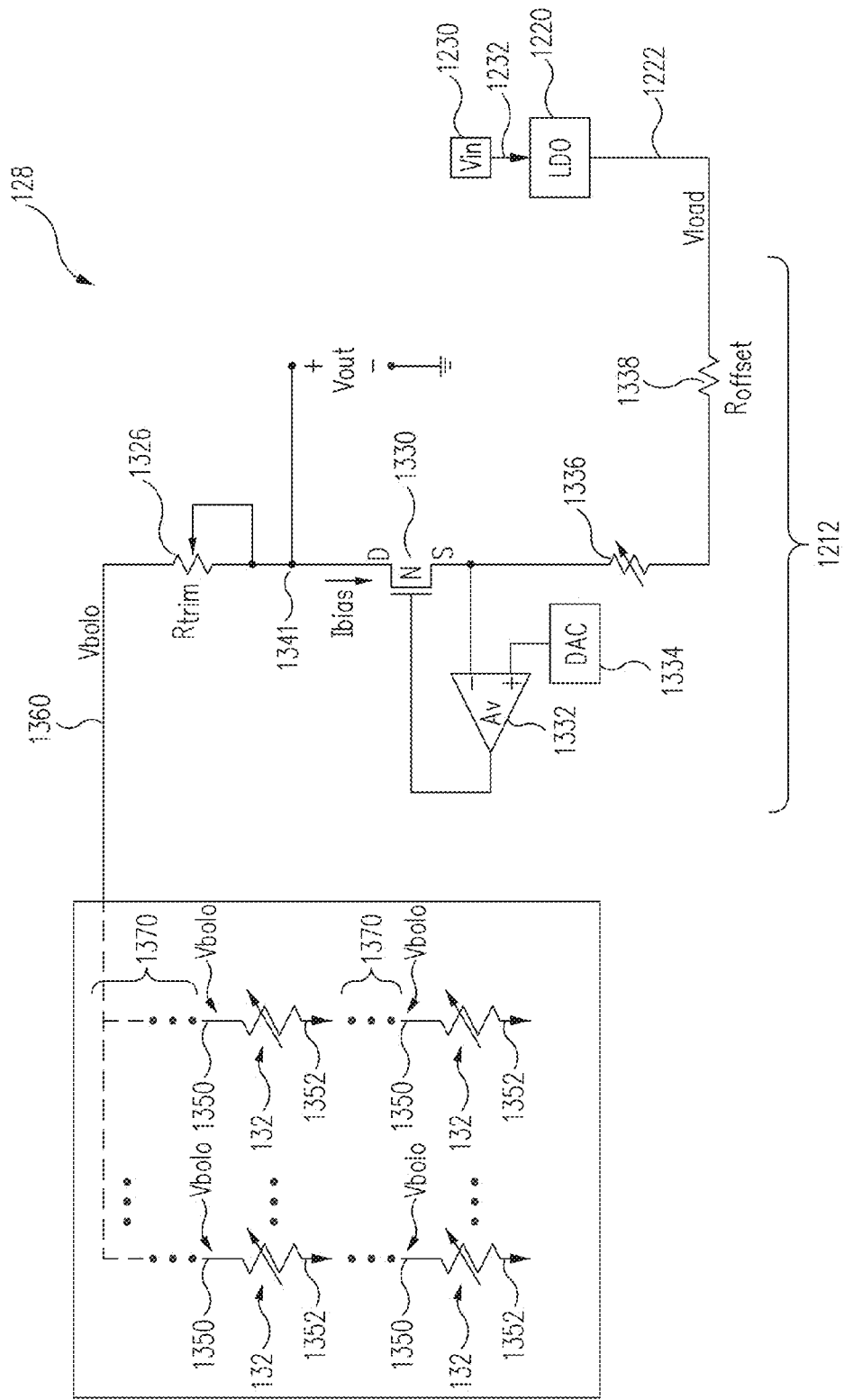
FIG. 13 illustrates a circuit diagram of a portion of the infrared sensor assembly of FIG. 12 in accordance with an embodiment of the disclosure.

Additional aspects of the low voltage operation of infrared sensor assembly 128 may be further understood with reference to FIG. 13. FIG. 13 illustrates a circuit diagram of a portion of infrared sensor assembly 128 of FIG. 12 in accordance with an embodiment of the disclosure. In particular, FIG. 13 illustrates additional components of bias correction circuitry 1212 (e.g., components 1326, 1330, 1332, 1334, 1336, 1338, and 1341) connected to LDO 1220 and infrared sensors 132. For example, bias correction circuitry 1212 may be used to compensate for temperature-dependent changes in bias voltages in accordance with an embodiment of the present disclosure. The operation of such additional components may be further understood with reference to similar components identified in U.S. Pat. No. 7,679,048 issued Mar. 16, 2010 which is hereby incorporated by reference in its entirety. Infrared sensor assembly 128 may also be implemented in accordance with the various components identified in U.S. Pat. No. 6,812,465 issued Nov. 2, 2004 which is hereby incorporated by reference in its entirety.

In various embodiments, some or all of the bias correction circuitry 1212 may be implemented on a global array basis as shown in FIG. 13 (e.g., used for all infrared sensors 132 collectively in an array). In other embodiments, some or all of the bias correction circuitry 1212 may be implemented an individual sensor basis (e.g., entirely or partially duplicated for each infrared sensor 132). In some embodiments, bias correction circuitry 1212 and other components of FIG. 13 may be implemented as part of ROTC 1202.

As shown in FIG. 13, LDO 1220 provides a load voltage Vload to bias correction circuitry 1212 along one of supply lines 1222. As discussed, in some embodiments, Vload may be approximately 2.5 volts which contrasts with larger voltages of approximately 9 volts to approximately 11 volts that may be used as load voltages in conventional infrared imaging devices.

Based on Vload, bias correction circuitry 1212 provides a sensor bias voltage Vbolo at a node 1360. Vbolo may be distributed to one or more infrared sensors 132 through appropriate switching circuitry 1370 (e.g., represented by broken lines in FIG. 13). In some examples, switching circuitry 1370 may be implemented in accordance with appropriate components identified in U.S. Pat. Nos. 6,812,465 and 7,679,048 previously referenced herein.

Each infrared sensor 132 includes a node 1350 which receives Vbolo through switching circuitry 1370, and another node 1352 which may be connected to ground, a substrate, and/or a negative reference voltage. In some embodiments, the voltage at node 1360 may be substantially the same as Vbolo provided at nodes 1350. In other embodiments, the voltage at node 1360 may be adjusted to compensate for possible voltage drops associated with switching circuitry 1370 and/or other factors.

Vbolo may be implemented with lower voltages than are typically used for conventional infrared sensor biasing. In one embodiment, Vbolo may be in a range of approximately 0.2 volts to approximately 0.7 volts. In another embodiment, Vbolo may be in a range of approximately 0.4 volts to approximately 0.6 volts. In another embodiment, Vbolo may be approximately 0.5 volts. In contrast, conventional infrared sensors typically use bias voltages of approximately 1 volt.

The use of a lower bias voltage for infrared sensors 132 in accordance with the present disclosure permits infrared sensor assembly 128 to exhibit significantly reduced power consumption in comparison with conventional infrared imaging devices. In particular, the power consumption of each infrared sensor 132 is reduced by the square of the bias voltage. As a result, a reduction from, for example, 1.0 volt to 0.5 volts provides a significant reduction in power, especially when applied to many infrared sensors 132 in an infrared sensor array. This reduction in power may also result in reduced self-heating of infrared sensor assembly 128.

In accordance with additional embodiments of the present disclosure, various techniques are provided for reducing the effects of noise in image frames provided by infrared imaging devices operating at low voltages. In this regard, when infrared sensor assembly 128 is operated with low voltages as described, noise, self-heating, and/or other phenomena may, if uncorrected, become more pronounced in image frames provided by infrared sensor assembly 128.

For example, referring to FIG. 13, when LDO 1220 maintains Vload at a low voltage in the manner described herein, Vbolo will also be maintained at its corresponding low voltage and the relative size of its output signals may be reduced. As a result, noise, self-heating, and/or other phenomena may have a greater effect on the smaller output signals read out from infrared sensors 132, resulting in variations (e.g., errors) in the output signals. If uncorrected, these variations may be exhibited as noise in the image frames. Moreover, although low voltage operation may reduce the overall amount of certain phenomena (e.g., self-heating), the smaller output signals may permit the remaining error sources (e.g., residual self-heating) to have a disproportionate effect on the output signals during low voltage operation.

To compensate for such phenomena, infrared sensor assembly 128, infrared imaging module 100, and/or host device 102 may be implemented with various array sizes, frame rates, and/or frame averaging techniques. For example, as discussed, a variety of different array sizes are contemplated for infrared sensors 132. In some embodiments, infrared sensors 132 may be implemented with array sizes ranging from 32 by 32 to 160 by 120 infrared sensors 132. Other example array sizes include 80 by 64, 80 by 60, 64 by 64, and 64 by 32. Any desired array size may be used.

Advantageously, when implemented with such relatively small array sizes, infrared sensor assembly 128 may provide image frames at relatively high frame rates without requiring significant changes to ROIC and related circuitry. For example, in some embodiments, frame rates may range from approximately 120 Hz to approximately 480 Hz.

In some embodiments, the array size and the frame rate may be scaled relative to each other (e.g., in an inversely proportional manner or otherwise) such that larger arrays are implemented with lower frame rates, and smaller arrays are implemented with higher frame rates. For example, in one embodiment, an array of 160 by 120 may provide a frame rate of approximately 120 Hz. In another embodiment, an array of 80 by 60 may provide a correspondingly higher frame rate of approximately 240 Hz. Other frame rates are also contemplated.

By scaling the array size and the frame rate relative to each other, the particular readout timing of rows and/or columns of the FPA may remain consistent, regardless of the actual FPA size or frame rate. In one embodiment, the readout timing may be approximately 63 microseconds per row or column.

As previously discussed with regard to FIG. 8, the image frames captured by infrared sensors 132 may be provided to a frame averager 804 that integrates multiple image frames to provide image frames 802 (e.g., processed image frames) with a lower frame rate (e.g., approximately 30 Hz, approximately 60 Hz, or other frame rates) and with an improved signal to noise ratio. In particular, by averaging the high frame rate image frames provided by a relatively small FPA, image noise attributable to low voltage operation may be effectively averaged out and/or substantially reduced in image frames 802. Accordingly, infrared sensor assembly 128 may be operated at relatively low voltages provided by LDO 1220 as discussed without experiencing additional noise and related side effects in the resulting image frames 802 after processing by frame averager 804.

Other embodiments are also contemplated. For example, although a single array of infrared sensors 132 is illustrated, it is contemplated that multiple such arrays may be used together to provide higher resolution image frames (e.g., a scene may be imaged across multiple such arrays). Such arrays may be provided in multiple infrared sensor assemblies 128 and/or provided in the same infrared sensor assembly 128. Each such array may be operated at low voltages as described, and also may be provided with associated ROIC circuitry such that each array may still be operated at a relatively high frame rate. The high frame rate image frames provided by such arrays may be averaged by shared or dedicated frame averagers 804 to reduce and/or eliminate noise associated with low voltage operation. As a result, high resolution infrared images may be obtained while still operating at low voltages.

In various embodiments, infrared sensor assembly 128 may be implemented with appropriate dimensions to permit infrared imaging module 100 to be used with a small form factor socket 104, such as a socket used for mobile devices. For example, in some embodiments, infrared sensor assembly 128 may be implemented with a chip size in a range of approximately 4.0 mm by approximately 4.0 mm to approximately 5.5 mm by approximately 5.5 mm (e.g., approximately 4.0 mm by approximately 5.5 mm in one example). Infrared sensor assembly 128 may be implemented with such sizes or other appropriate sizes to permit use with socket 104 implemented with various sizes such as: 8.5 mm by 8.5 mm, 8.5 mm by 5.9 mm, 6.0 mm by 6.0 mm, 5.5 mm by 5.5 mm, 4.5 mm by 4.5 mm, and/or other socket sizes such as, for example, those identified in Table 1 of U.S. Provisional Patent Application No. 61/495,873 filed Jun. 10, 2011 incorporated herein by reference in its entirety.

As further described with regard to FIGS. 14-23E, various image processing techniques are described which may be applied, for example, to infrared images (e.g., thermal images) to reduce noise within the infrared images (e.g., improve image detail and/or image quality) and/or provide non-uniformity correction.

Although FIGS. 14-23E will be primarily described with regard to a system 2100, the described techniques may be performed by processing module 160 or processor 195 (both also generally referred to as a processor) operating on image frames captured by infrared sensors 132, and vice versa.

In some embodiments, the techniques described with regard to FIGS. 14-22B may be used to perform operations of block 550 (see FIGS. 5 and 8) to determine row and/or column FPN terms. For example, such techniques may be applied to intentionally blurred images provided by block 545 of FIGS. 5 and 8. In some embodiments, the techniques described with regard to FIGS. 23A-E may be used in place of and/or in addition to the operations of blocks 565-573 (see FIGS. 5 and 8) to estimate FPN and/or determine NUC terms.

Referring now to FIGS. 14-22B, a significant portion of noise may be defined as row and column noise. This type of noise may be explained by non-linearities in a Read Out Integrated Circuit (ROIC). This type of noise, if not eliminated, may manifest as vertical and horizontal stripes in the final image and human observers are particularly sensitive to these types of image artifacts. Other systems relying on imagery from infrared sensors, such as, for example, automatic target trackers may also suffer from performance degradation, if row and column noise is present.

Because of non-linear behavior of infrared detectors and read-out integrated circuit (ROIC) assemblies, even when a shutter operation or external black body calibration is performed, there may be residual row and column noise (e.g., the scene being imaged may not have the exact same temperature as the shutter). The amount of row and column noise may increase over time, after offset calibration, increasing asymptotically to some maximum value. In one aspect, this may be referred to as 1/f type noise.

In any given frame, the row and column noise may be viewed as high frequency spatial noise. Conventionally, this type of noise may be reduced using filters in the spatial domain (e.g., local linear or non-linear low pass filters) or the frequency domain (e.g., low pass filters in Fourier or Wavelet space). However, these filters may have negative side effects, such as blurring of the image and potential loss of faint details.

It should be appreciated by those skilled in the art that any reference to a column or a row may include a partial column or a partial row and that the terms "row" and "column" are interchangeable and not limiting. Thus, without departing from the scope of the invention, the term "row" may be used to describe a row or a column, and likewise, the term "column" may be used to describe a row or a column, depending upon the application.

Figure 14:
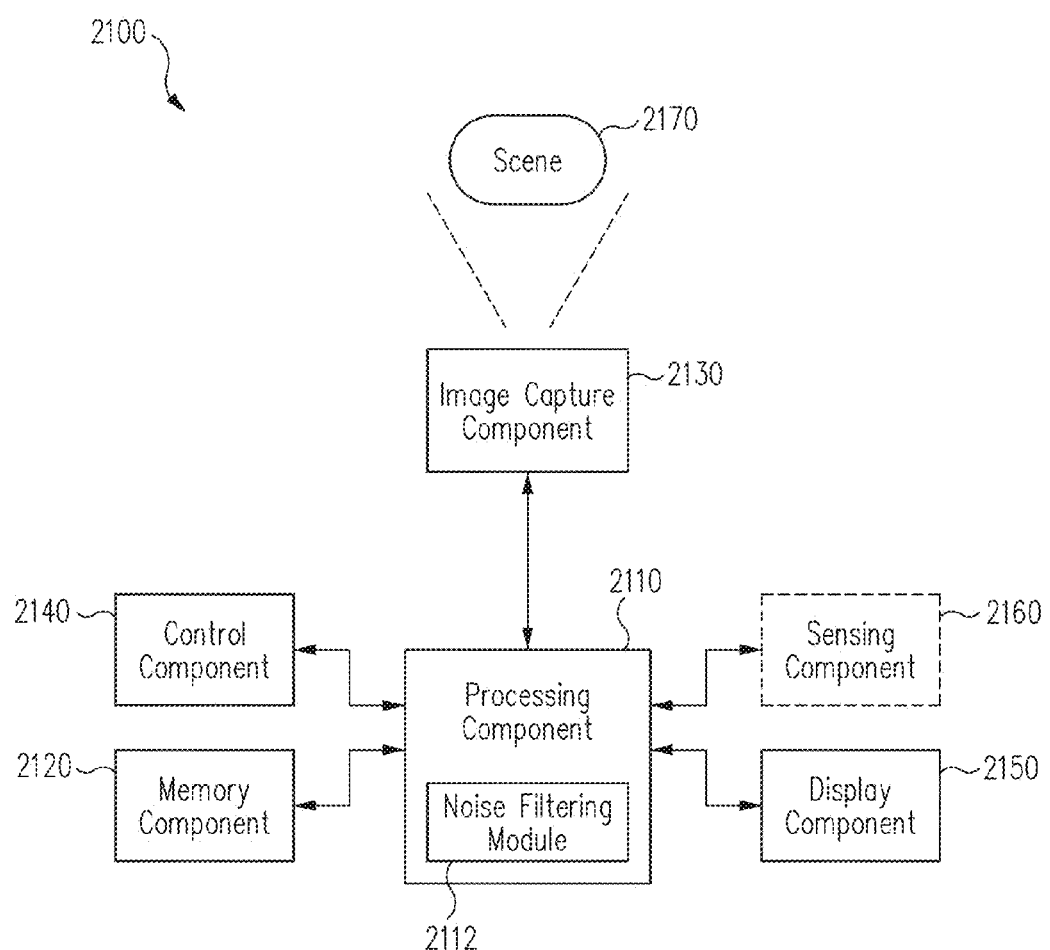
FIG. 14 shows a block diagram of a system for infrared image processing in accordance with an embodiment of the disclosure.

FIG. 14 shows a block diagram of system 2100 (e.g., an infrared camera) for infrared image capturing and processing in accordance with an embodiment. In some embodiments, system 2100 may be implemented by infrared imaging module 100, host device 102, infrared sensor assembly 128, and/or various components described herein (e.g., see FIGS. 1-13). Accordingly, although various techniques are described with regard to system 2100, such techniques may be similarly applied to infrared imaging module 100, host device 102, infrared sensor assembly 128, and/or various components described herein, and vice versa.

The system 2100 comprises, in one implementation, a processing component 2110, a memory component 2120, an image capture component 2130, a control component 2140, and a display component 2150. Optionally, the system 2100 may include a sensing component 2160.

The system 2100 may represent an infrared imaging device, such as an infrared camera, to capture and process images, such as video images of a scene 2170. The system 2100 may represent any type of infrared camera adapted to detect infrared radiation and provide representative data and information (e.g., infrared image data of a scene). For example, the system 2100 may represent an infrared camera that is directed to the near, middle, and/or far infrared spectrums. In another example, the infrared image data may comprise non-uniform data (e.g., real image data that is not from a shutter or black body) of the scene 2170, for processing, as set forth herein. The system 2100 may comprise a portable device and may be incorporated, e.g., into a vehicle (e.g., an automobile or other type of land-based vehicle, an aircraft, or a spacecraft) or a non-mobile installation requiring infrared images to be stored and/or displayed.

In various embodiments, the processing component 2110 comprises a processor, such as one or more of a microprocessor, a single-core processor, a multi-core processor, a microcontroller, a logic device (e.g., a programmable logic device (PLD) configured to perform processing functions), a digital signal processing (DSP) device, etc. The processing component 2110 may be adapted to interface and communicate with components 2120, 2130, 2140, and 2150 to perform method and processing steps and/or operations, as described herein. The processing component 2110 may include a noise filtering module 2112 adapted to implement a noise reduction and/or removal algorithm (e.g., a noise filtering algorithm, such as any of those discussed herein). In one aspect, the processing component 2110 may be adapted to perform various other image processing algorithms including scaling the infrared image data, either as part of or separate from the noise filtering algorithm.

It should be appreciated that noise filtering module 2112 may be integrated in software and/or hardware as part of the processing component 2110, with code (e.g., software or configuration data) for the noise filtering module 2112 stored, e.g., in the memory component 2120. Embodiments of the noise filtering algorithm, as disclosed herein, may be stored by a separate computer-readable medium (e.g., a memory, such as a hard drive, a compact disk, a digital video disk, or a flash memory) to be executed by a computer (e.g., a logic or processor-based system) to perform various methods and operations disclosed herein. In one aspect, the computer-readable medium may be portable and/or located separate from the system 2100, with the stored noise filtering algorithm provided to the system 2100 by coupling the computer-readable medium to the system 2100 and/or by the system 2100 downloading (e.g., via a wired link and/or a wireless link) the noise filtering algorithm from the computer-readable medium.

The memory component 2120 comprises, in one embodiment, one or more memory devices adapted to store data and information, including infrared data and information. The memory device 2120 may comprise one or more various types of memory devices including volatile and non-volatile memory devices, such as RAM (Random Access Memory), ROM (Read-Only Memory), EEPROM (Electrically-Erasable Read-Only Memory), flash memory, etc. The processing component 2110 may be adapted to execute software stored in the memory component 2120 so as to perform method and process steps and/or operations described herein.

The image capture component 2130 comprises, in one embodiment, one or more infrared sensors (e.g., any type of multi-pixel infrared detector, such as a focal plane array) for capturing infrared image data (e.g., still image data and/or video data) representative of an image, such as scene 2170. In one implementation, the infrared sensors of the image capture component 2130 provide for representing (e.g., converting) the captured image data as digital data (e.g., via an analog-to-digital converter included as part of the infrared sensor or separate from the infrared sensor as part of the system 2100). In one aspect, the infrared image data (e.g., infrared video data) may comprise non-uniform data (e.g., real image data) of an image, such as scene 2170. The processing component 2110 may be adapted to process the infrared image data (e.g., to provide processed image data), store the infrared image data in the memory component 2120, and/or retrieve stored infrared image data from the memory component 2120. For example, the processing component 2110 may be adapted to process infrared image data stored in the memory component 2120 to provide processed image data and information (e.g., captured and/or processed infrared image data).

The control component 2140 comprises, in one embodiment, a user input and/or interface device, such as a rotatable knob (e.g., potentiometer), push buttons, slide bar, keyboard, etc., that is adapted to generate a user input control signal. The processing component 2110 may be adapted to sense control input signals from a user via the control component 2140 and respond to any sensed control input signals received therefrom. The processing component 2110 may be adapted to interpret such a control input signal as a value, as generally understood by one skilled in the art.

In one embodiment, the control component 2140 may comprise a control unit (e.g., a wired or wireless handheld control unit) having push buttons adapted to interface with a user and receive user input control values. In one implementation, the push buttons of the control unit may be used to control various functions of the system 2100, such as autofocus, menu enable and selection, field of view, brightness, contrast, noise filtering, high pass filtering, low pass filtering, and/or various other features as understood by one skilled in the art. In another implementation, one or more of the push buttons may be used to provide input values (e.g., one or more noise filter values, adjustment parameters, characteristics, etc.) for a noise filter algorithm. For example, one or more push buttons may be used to adjust noise filtering characteristics of infrared images captured and/or processed by the system 2100.

The display component 2150 comprises, in one embodiment, an image display device (e.g., a liquid crystal display (LCD)) or various other types of generally known video displays or monitors. The processing component 2110 may be adapted to display image data and information on the display component 2150. The processing component 2110 may be adapted to retrieve image data and information from the memory component 2120 and display any retrieved image data and information on the display component 2150. The display component 2150 may comprise display electronics, which may be utilized by the processing component 2110 to display image data and information (e.g., infrared images). The display component 2150 may be adapted to receive image data and information directly from the image capture component 2130 via the processing component 2110, or the image data and information may be transferred from the memory component 2120 via the processing component 2110.

The optional sensing component 2160 comprises, in one embodiment, one or more sensors of various types, depending on the application or implementation requirements, as would be understood by one skilled in the art. The sensors of the optional sensing component 2160 provide data and/or information to at least the processing component 2110. In one aspect, the processing component 2110 may be adapted to communicate with the sensing component 2160 (e.g., by receiving sensor information from the sensing component 2160) and with the image capture component 2130 (e.g., by receiving data and information from the image capture component 2130 and providing and/or receiving command, control, and/or other information to and/or from one or more other components of the system 2100).

In various implementations, the sensing component 2160 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder), and/or whether a tunnel or other type of enclosure has been entered or exited. The sensing component 2160 may represent conventional sensors as generally known by one skilled in the art for monitoring various conditions (e.g., environmental conditions) that may have an effect (e.g., on the image appearance) on the data provided by the image capture component 2130.

In some implementations, the optional sensing component 2160 (e.g., one or more of sensors) may comprise devices that relay information to the processing component 2110 via wired and/or wireless communication. For example, the optional sensing component 2160 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques.

In various embodiments, components of the system 2100 may be combined and/or implemented or not, as desired or depending on the application or requirements, with the system 2100 representing various functional blocks of a related system. In one example, the processing component 2110 may be combined with the memory component 2120, the image capture component 2130, the display component 2150, and/or the optional sensing component 2160. In another example, the processing component 2110 may be combined with the image capture component 2130 with only certain functions of the processing component 2110 performed by circuitry (e.g., a processor, a microprocessor, a logic device, a microcontroller, etc.) within the image capture component 2130. Furthermore, various components of the system 2100 may be remote from each other (e.g., image capture component 2130 may comprise a remote sensor with processing component 2110, etc. representing a computer that may or may not be in communication with the image capture component 2130).

Figure 15A:
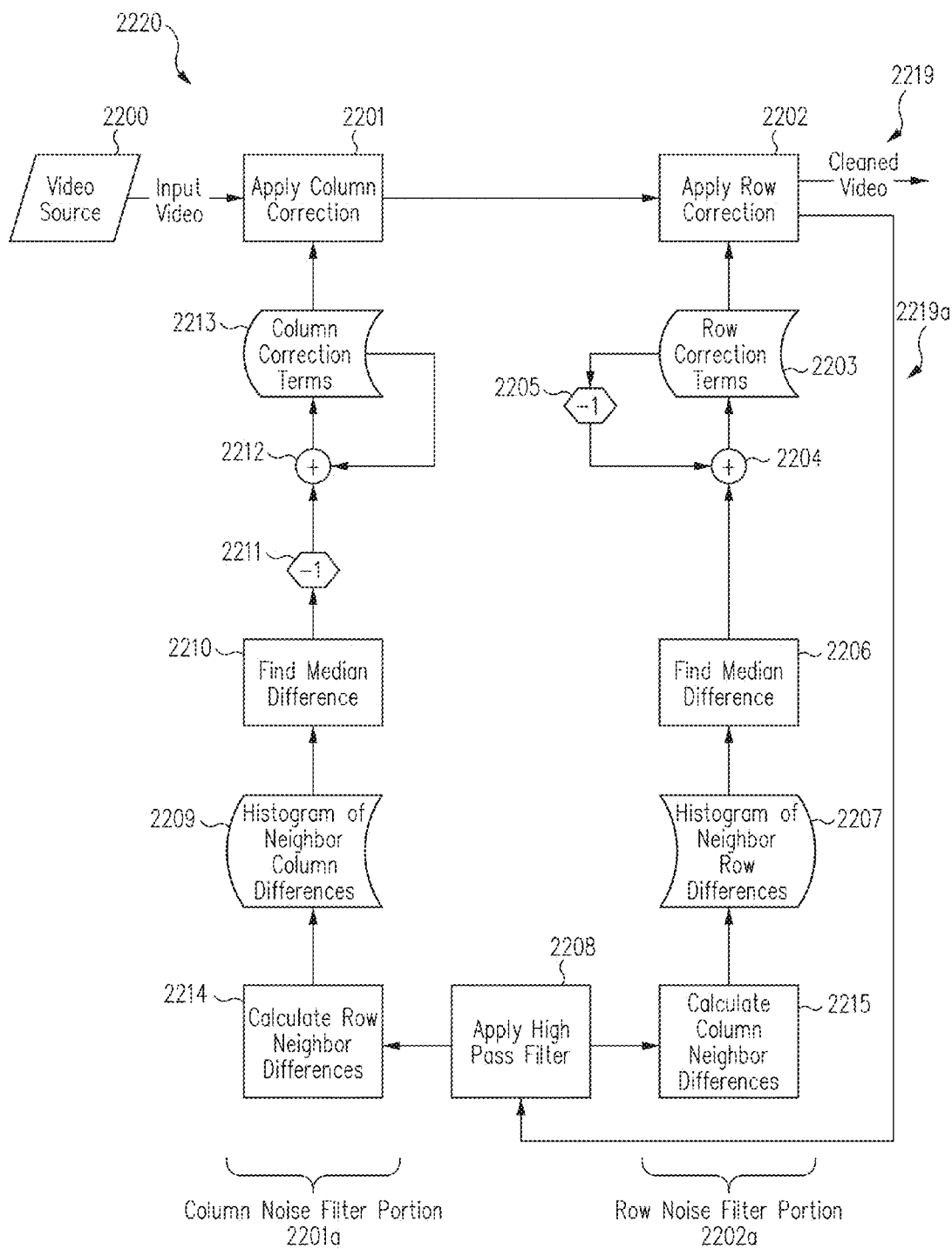
FIGS. 15A-C are flowcharts illustrating methods for noise filtering an infrared image in accordance with embodiments of the disclosure.

In accordance with an embodiment of the disclosure, FIG. 15A shows a method 2220 for noise filtering an infrared image. In one implementation, this method 2220 relates to the reduction and/or removal of temporal, 1/f, and/or fixed spatial noise in infrared imaging devices, such as infrared imaging system 2100 of FIG. 14. The method 2220 is adapted to utilize the row and column based noise components of infrared image data in a noise filtering algorithm. In one aspect, the row and column based noise components may dominate the noise in imagery of infrared sensors (e.g., approximately ⅔ of the total noise may be spatial in a typical micro-bolometer based system).

In one embodiment, the method 2220 of FIG. 15A comprises a high level block diagram of row and column noise filtering algorithms. In one aspect, the row and column noise filter algorithms may be optimized to use minimal hardware resources.

Referring to FIG. 15A, the process flow of the method 2220 implements a recursive mode of operation, wherein the previous correction terms are applied before calculating row and column noise, which may allow for correction of lower spatial frequencies. In one aspect, the recursive approach is useful when row and column noise is spatially correlated. This is sometimes referred to as banding and, in the column noise case, may manifest as several neighboring columns being affected by a similar offset error. When several neighbors used in difference calculations are subject to similar error, the mean difference used to calculate the error may be skewed, and the error may only be partially corrected. By applying partial correction prior to calculating the error in the current frame, correction of the error may be recursively reduced until the error is minimized or eliminated. In the recursive case, if the HPF is not applied (block 2208), then natural gradients as part of the image may, after several iterations, be distorted when merged into the noise model. In one aspect, a natural horizontal gradient may appear as low spatially correlated column noise (e.g., severe banding). In another aspect, the HPF may prevent very low frequency scene information to interfere with the noise estimate and, therefore, limits the negative effects of recursive filtering.

Referring to method 2220 of FIG. 15A, infrared image data (e.g., a raw video source, such as from the image capture component 2130 of FIG. 14) is received as input video data (block 2200). Next, column correction terms are applied to the input video data (block 2201), and row correction terms are applied to the input video data (block 2202). Next, video data (e.g., "cleaned" video data) is provided as output video data (2219) after column and row corrections are applied to the input video data. In one aspect, the term "cleaned" may refer to removing or reducing noise (blocks 2201, 2202) from the input video data via, e.g., one or more embodiments of the noise filter algorithm.

Referring to the processing portion (e.g., recursive processing) of FIG. 15A, a HPF is applied (block 2208) to the output video data 2219 via data signal path 2219a. In one implementation, the high pass filtered data is separately provided to a column noise filter portion 2201a and a row noise filter portion 2202a.

Referring to the column noise filter portion 2201a, the method 2220 may be adapted to process the input video data 2200 and/or output video data 2219 as follows:

1. Apply previous column noise correction terms to a current frame as calculated in a previous frame (block 2201).

2. High pass filter the row of the current frame by subtracting the result of a low pass filter (LPF) operation (block 2208), for example, as discussed in reference to FIGS. 16A-16C.

3. For each pixel, calculate a difference between a center pixel and one or more (e.g., eight) nearest neighbors (block 2214). In one implementation, the nearest neighbors comprise one or more nearest horizontal neighbors. The nearest neighbors may include one or more vertical or other non-horizontal neighbors (e.g., not pure horizontal, i.e., on the same row), without departing from the scope of the invention.

4. If the calculated difference is below a predefined threshold, add the calculated difference to a histogram of differences for the specific column (block 2209).

5. At an end of the current frame, find a median difference by examining a cumulative histogram of differences (block 2210). In one aspect, for added robustness, only differences with some specified minimum number of occurrences may be used.

6. Delay the current correction terms for one frame (block 2211), i.e., they are applied to the next frame.

7. Add median difference (block 2212) to previous column correction terms to provide updated column correction terms (block 2213).

8. Apply updated column noise correction terms in the next frame (block 2201).

Referring to the row noise filter portion 2202a, the method 2220 may be adapted to process the input video data 2200 and/or output video data 2219 as follows:

1. Apply previous row noise correction terms to a current frame as calculated in a previous frame (block 2202).

2. High pass filter the column of the current frame by subtracting the result of a low pass filter (LPF) operation (block 2208), as discussed similarly above for column noise filter portion 2201a.

3. For each pixel, calculate a difference between a center pixel and one or more (e.g., eight) nearest neighbors (block 2215). In one implementation, the nearest neighbors comprise one or more nearest vertical neighbors. The nearest neighbors may include one or more horizontal or other non-vertical neighbors (e.g., not pure vertical, i.e., on the same column), without departing from the scope of the invention.

4. If the calculated difference is below a predefined threshold, add the calculated difference to a histogram of differences for the specific row (block 2207).

5. At an end of the current row (e.g., line), find a median difference by examining a cumulative histogram of differences (block 2206). In one aspect, for added robustness only differences with some specified minimum number of occurrences may be used.

6. Delay the current frame by a time period equivalent to the number of nearest vertical neighbors used, for example eight.

7. Add median difference (block 2204) to row correction terms (block 2203) from previous frame (block 2205).

8. Apply updated row noise correction terms in the current frame (block 2202). In one aspect, this may require a row buffer (e.g., as mentioned in 6).

In one aspect, for all pixels (or at least a large subset of them) in each column, an identical offset term (or set of terms) may be applied for each associated column. This may prevent the filter from blurring spatially local details.

Similarly, in one aspect, for all pixels (or at least a large subset of them) in each row respectively, an identical offset term (or set of terms) may be applied. This may inhibit the filter from blurring spatially local details.

In one example, an estimate of the column offset terms may be calculated using only a subset of the rows (e.g., the first 32 rows). In this case, only a 32 row delay is needed to apply the column correction terms in the current frame. This may improve filter performance in removing high temporal frequency column noise. Alternatively, the filter may be designed with minimum delay, and the correction terms are only applied once a reasonable estimate can be calculated (e.g., using data from the 32 rows). In this case, only rows 33 and beyond may be optimally filtered.

In one aspect, all samples may not be needed, and in such an instance, only every 2nd or 4th row, e.g., may be used for calculating the column noise. In another aspect, the same may apply when calculating row noise, and in such an instance, only data from every 4th column, e.g., may be used. It should be appreciated that various other iterations may be used by one skilled in the art without departing from the scope of the invention.

In one aspect, the filter may operate in recursive mode in which the filtered data is filtered instead of the raw data being filtered. In another aspect, the mean difference between a pixel in one row and pixels in neighboring rows may be approximated in an efficient way if a recursive (IIR) filter is used to calculate an estimated running mean. For example, instead of taking the mean of neighbor differences (e.g., eight neighbor differences), the difference between a pixel and the mean of the neighbors may be calculated.

Figure 15B:
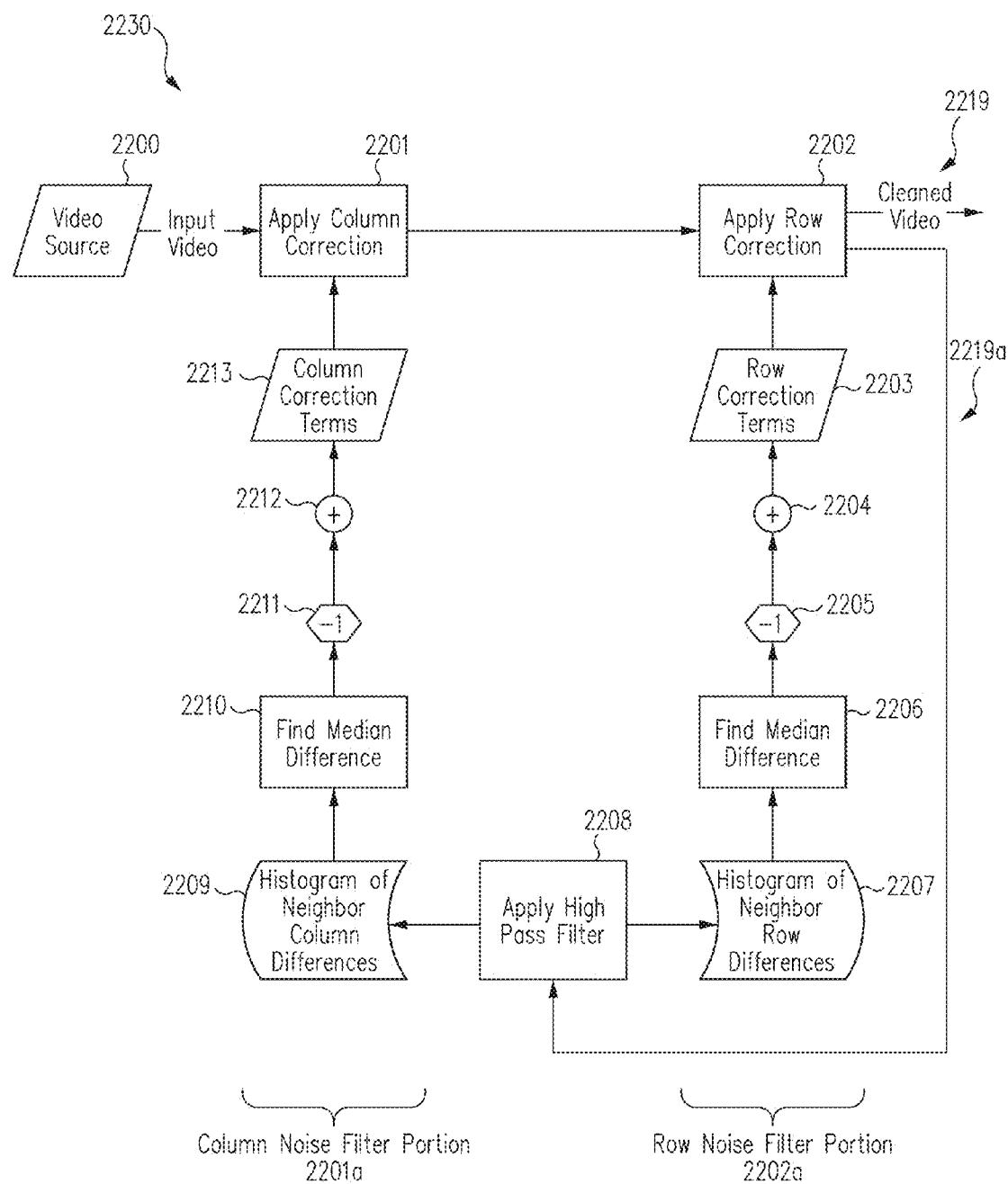

In accordance with an embodiment of the disclosure, FIG. 15B shows an alternative method 2230 for noise filtering infrared image data. In reference to FIGS. 15A and 15B, one or more of the process steps and/or operations of method 2220 of FIG. 15A have changed order or have been altered or combined for the method 2230 of FIG. 15B. For example, the operation of calculating row and column neighbor differences (blocks 2214, 2215) may be removed or combined with other operations, such as generating histograms of row and column neighbor differences (blocks 2207, 2209). In another example, the delay operation (block 2205) may be performed after finding the median difference (block 2206). In various examples, it should be appreciated that similar process steps and/or operations have similar scope, as previously described in FIG. 15A, and therefore, the description will not be repeated.

In still other alternate approaches to methods 2220 and 2230, embodiments may exclude the histograms and rely on mean calculated differences instead of median calculated differences. In one aspect, this may be slightly less robust but may allow for a simpler implementation of the column and row noise filters. For example, the mean of neighboring rows and columns, respectively, may be approximated by a running mean implemented as an infinite impulse response (IIR) filter. In the row noise case, the IIR filter implementation may reduce or even eliminate the need to buffer several rows of data for mean calculations.

In still other alternate approaches to methods 2220 and 2230, new noise estimates may be calculated in each frame of the video data and only applied in the next frame (e.g., after noise estimates). In one aspect, this alternate approach may provide less performance but may be easier to implement. In another aspect, this alternate approach may be referred to as a non-recursive method, as understood by those skilled in the art.

Figure 15C:
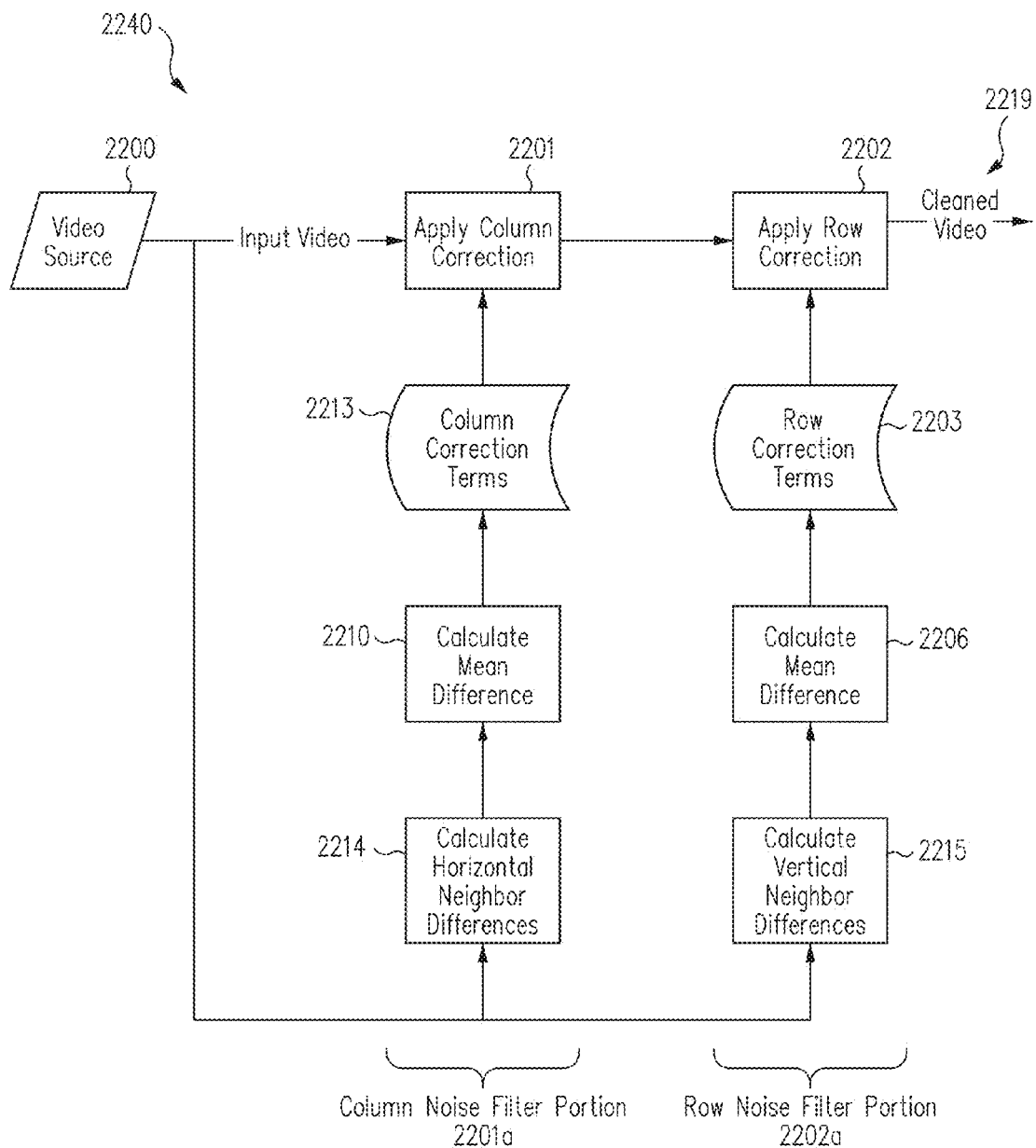

For example, in one embodiment, the method 2240 of FIG. 15C comprises a high level block diagram of row and column noise filtering algorithms. In one aspect, the row and column noise filter algorithms may be optimized to use minimal hardware resources. In reference to FIGS. 15A and 15B, similar process steps and/or operations may have similar scope, and therefore, the descriptions will not be repeated.

Referring to FIG. 15C, the process flow of the method 2240 implements a non-recursive mode of operation. As shown, the method 2240 applies column offset correction term 2201 and row offset correction term 2202 to the uncorrected input video data from video source 2200 to produce, e.g., a corrected or cleaned output video signal 2219. In column noise filter portion 2201a, column offset correction terms 2213 are calculated based on the mean difference 2210 between pixel values in a specific column and one or more pixels belonging to neighboring columns 2214. In row noise filter portion 2202a, row offset correction terms 2203 are calculated based on the mean difference 2206 between pixel values in a specific row and one or more pixels belonging to neighboring rows 2215. In one aspect, the order (e.g., rows first or columns first) in which row or column offset correction terms 2203, 2213 are applied to the input video data from video source 2200 may be considered arbitrary. In another aspect, the row and column correction terms may not be fully known until the end of the video frame, and therefore, if the input video data from the video source 2200 is not delayed, the row and column correction terms 2203, 2213 may not be applied to the input video data from which they were calculated.

In one aspect of the invention, the column and row noise filter algorithm may operate continuously on image data provided by an infrared imaging sensor (e.g., image capture component 2130 of FIG. 14). Unlike conventional methods that may require a uniform scene (e.g., as provided by a shutter or external calibrated black body) to estimate the spatial noise, the column and row noise filter algorithms, as set forth in one or more embodiments, may operate on real-time scene data. In one aspect, an assumption may be made that, for some small neighborhood around location [x, y], neighboring infrared sensor elements should provide similar values since they are imaging parts of the scene in close proximity. If the infrared sensor reading from a particular infrared sensor element differs from a neighbor, then this could be the result of spatial noise. However, in some instances, this may not be true for each and every sensor element in a particular row or column (e.g., due to local gradients that are a natural part of the scene), but on average, a row or column may have values that are close to the values of the neighboring rows and columns.

For one or more embodiments, by first taking out one or more low spatial frequencies (e.g., using a high pass filter (HPF)), the scene contribution may be minimized to leave differences that correlate highly with actual row and column spatial noise. In one aspect, by using an edge preserving filter, such as a Median filter or a Bilateral filter, one or more embodiments may minimize artifacts due to strong edges in the image.

Figure 16A:
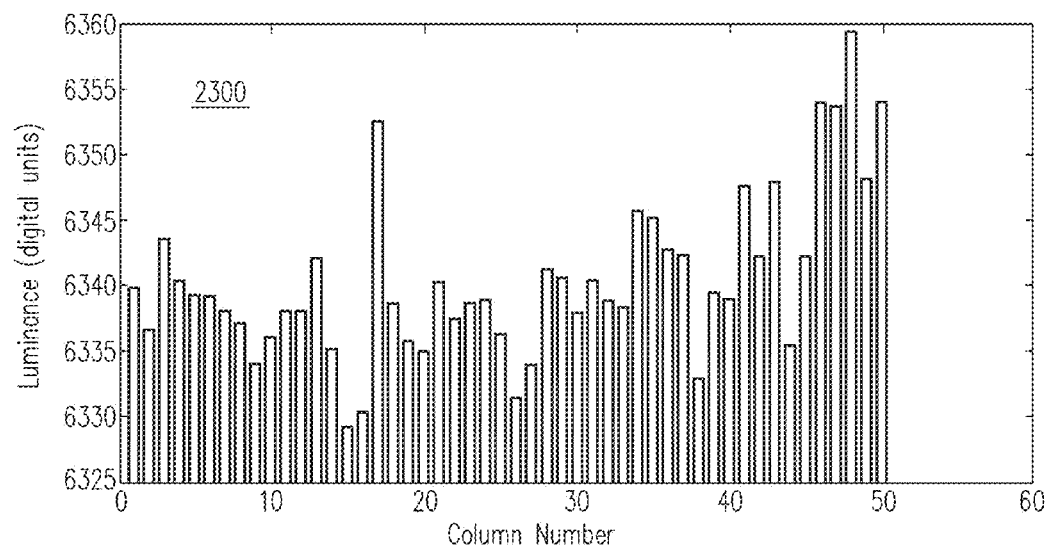
FIGS. 16A-C are graphs illustrating infrared image data and the processing of an infrared image in accordance with embodiments of the disclosure.
Figure 16B:
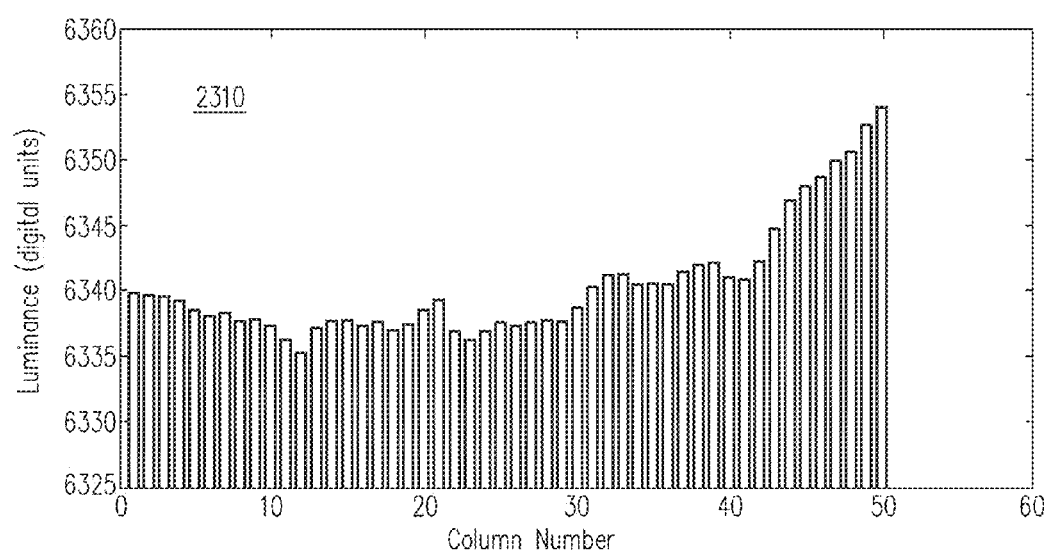
Figure 16C:
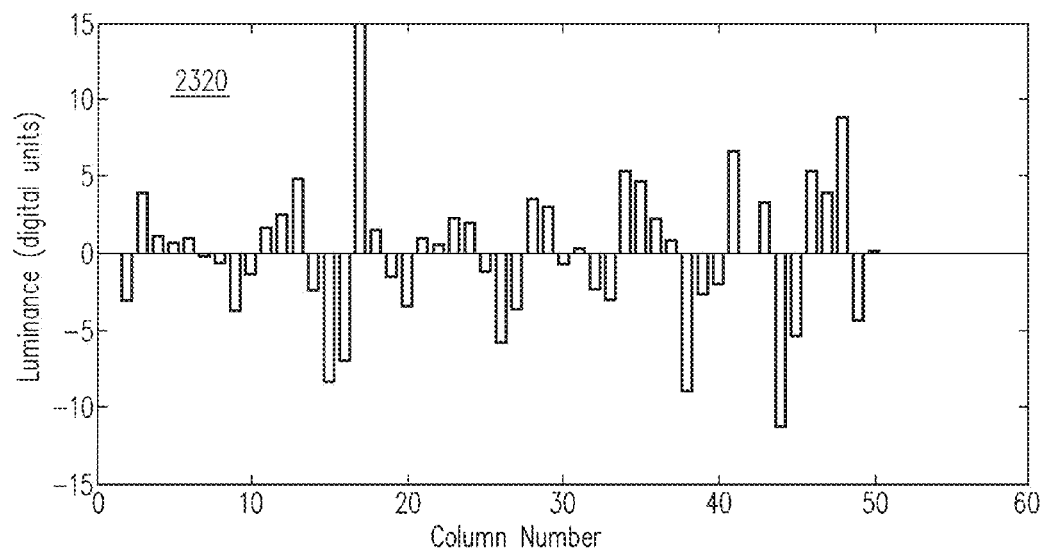

In accordance with one or more embodiments of the disclosure, FIGS. 16A to 16C show a graphical implementation (e.g., digital counts versus data columns) of filtering an infrared image. FIG. 16A shows a graphical illustration (e.g., graph 2300) of typical values, as an example, from a row of sensor elements when imaging a scene. FIG. 16B shows a graphical illustration (e.g., graph 2310) of a result of a low pass filtering (LPF) of the image data values from FIG. 16A. FIG. 16C shows a graphical illustration (e.g., graph 2320) of subtracting the low pass filter (LPF) output in FIG. 16B from the original image data in FIG. 16A, which results in a high pass filter (HPF) profile with low and mid frequency components removed from the scene of the original image data in FIG. 16A. Thus, FIG. 16A-16C illustrate a HPF technique, which may be used for one or more embodiments (e.g., as with methods 2220 and/or 2230).

In one aspect of the invention, a final estimate of column and/or row noise may be referred to as an average or median estimate of all of the measured differences. Because noise characteristics of an infrared sensor are often generally known, then one or more thresholds may be applied to the noise estimates. For example, if a difference of 60 digital counts is measured, but it is known that the noise typically is less than 10 digital counts, then this measurement may be ignored.

Figure 17:
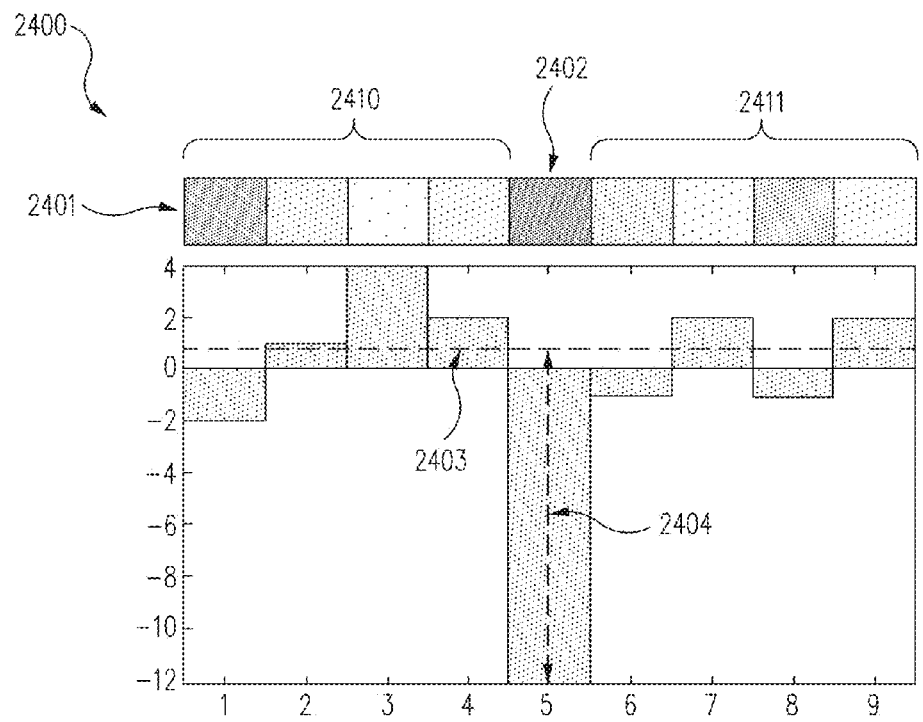
FIG. 17 shows a portion of a row of sensor data for discussing processing techniques in accordance with embodiments of the disclosure.

In accordance with one or more embodiments of the disclosure, FIG. 17 shows a graphical illustration 2400 (e.g., digital counts versus data columns) of a row of sensor data 2401 (e.g., a row of pixel data for a plurality of pixels in a row) with column 5 data 2402 and data for eight nearest neighbors (e.g., nearest pixel neighbors, 4 columns 2410 to the left of column 5 data 2402 and 4 columns 2411 to the right of column 5 data 2402). In one aspect, referring to FIG. 17, the row of sensor data 2401 is part of a row of sensor data for an image or scene captured by a multi-pixel infrared sensor or detector (e.g., image capture component 2130 of FIG. 14). In one aspect, column 5 data 2402 is a column of data to be corrected. For this row of sensor data 2401, the difference between column 5 data 2402 and a mean 2403 of its neighbor columns (2410, 2411) is indicated by an arrow 2404. Therefore, noise estimates may be obtained and accounted for based on neighboring data.

Figure 18B:
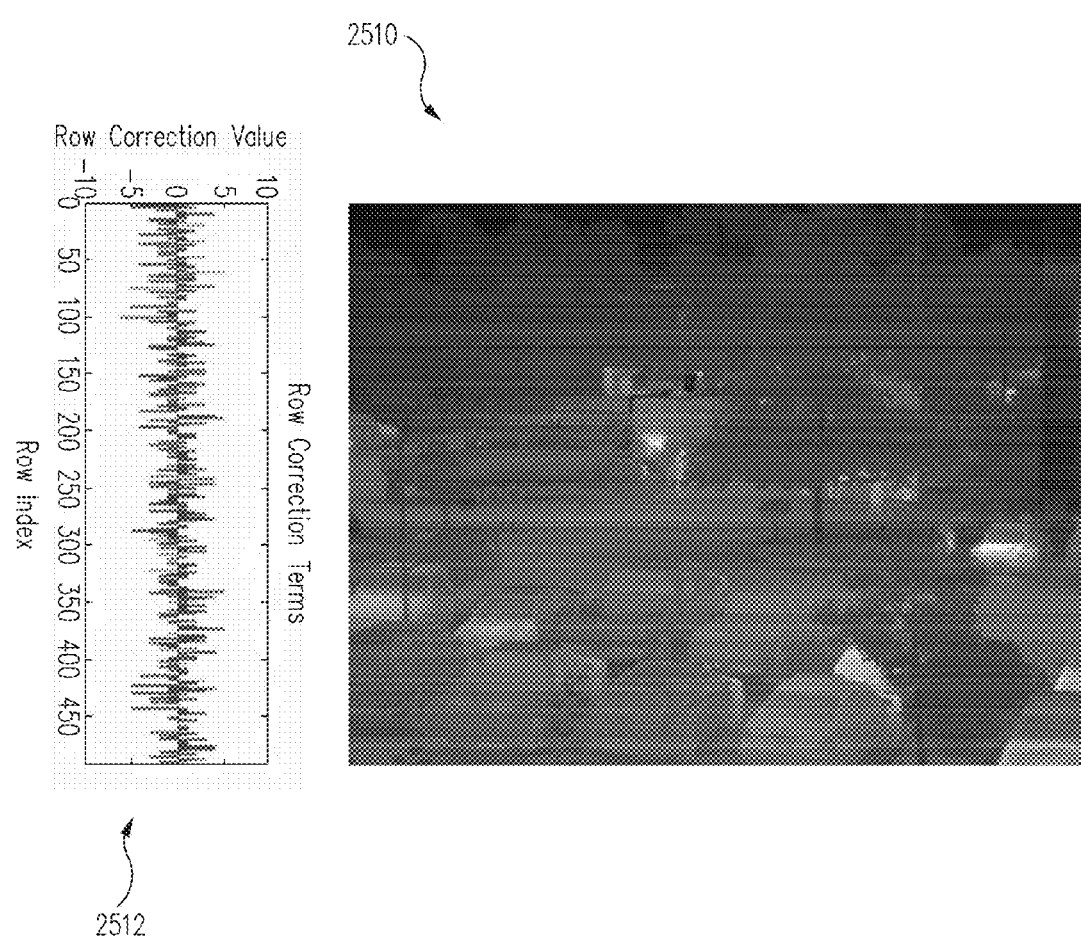
Figure 18C:

In accordance with one or more embodiments of the disclosure, FIGS. 18A to 18C show an exemplary implementation of column and row noise filtering an infrared image (e.g., an image frame from infrared video data). FIG. 18A shows an infrared image 2500 with column noise estimated from a scene with severe row and column noise present and a corresponding graph 2502 of column correction terms. FIG. 18B shows an infrared image 2510, with column noise removed and spatial row noise still present, with row correction terms estimated from the scene in FIG. 18A and a corresponding graph 2512 of row correction terms. FIG. 18C shows an infrared image 2520 of the scene in FIG. 18A as a cleaned infrared image with row and column noise removed (e.g., column and row correction terms of FIGS. 18A-18B applied).

In one embodiment, FIG. 18A shows an infrared video frame (i.e., infrared image 2500) with severe row and column noise. Column noise correction coefficients are calculated as described herein to produce, e.g., 639 correction terms, i.e., one correction term per column. The graph 2502 shows the column correction terms. These offset correction terms are subtracted from the infrared video frame 2500 of FIG. 18A to produce the infrared image 2510 in FIG. 18B. As shown in FIG. 18B, the row noise is still present. Row noise correction coefficients are calculated as described herein to produce, e.g., 639 row terms, i.e., one correction term per row. The graph 2512 shows the row offset correction terms, which are subtracted from the infrared image 2510 in FIG. 18B to produce the cleaned infrared image 2520 in FIG. 18C with significantly reduced or removed row and column noise.

In various embodiments, it should be understood that both row and column filtering is not required. For example, either column noise filtering 2201a or row noise filtering 2202a may be performed in methods 2220, 2230 or 2240.

It should be appreciated that any reference to a column or a row may include a partial column or a partial row and that the terms "row" and "column" are interchangeable and not limiting. For example, without departing from the scope of the invention, the term "row" may be used to describe a row or a column, and likewise, the term "column" may be used to describe a row or a column, depending upon the application.

In various aspects, column and row noise may be estimated by looking at a real scene (e.g., not a shutter or a black body), in accordance with embodiments of the noise filtering algorithms, as disclosed herein. The column and row noise may be estimated by measuring the median or mean difference between sensor readings from elements in a specific row (and/or column) and sensor readings from adjacent rows (and/or columns).

Optionally, a high pass filter may be applied to the image data prior to measuring the differences, which may reduce or at least minimize a risk of distorting gradients that are part of the scene and/or introducing artifacts. In one aspect, only sensor readings that differ by less than a configurable threshold may be used in the mean or median estimation. Optionally, a histogram may be used to effectively estimate the median. Optionally, only histogram bins exceeding a minimum count may be used when finding the median estimate from the histogram. Optionally, a recursive IIR filter may be used to estimate the difference between a pixel and its neighbors, which may reduce or at least minimize the need to store image data for processing, e.g., the row noise portion (e.g., if image data is read out row wise from the sensor). In one implementation, the current mean column value $\overline{C}_{i,j}$ for column i at row j may be estimated using the following recursive filter algorithm.

$$\overline{C}_{i,j} = (1-\alpha) \cdot \overline{C}_{i-1,j} + \alpha \cdot C_{i,j}$$

$$\Delta R_i = \frac{1}{N} \sum_{j=1}^{N} C_{i,j} - \overline{C}_{i-1,j}$$

In this equation a is the damping factor and may be set to for example 0.2 in which case the estimate for the running mean of a specific column i at row j will be a weighted sum of the estimated running mean for column i−1 at row j and the current pixel value at row j and column i. The estimated difference between values of row j and the values of neighboring rows can now be approximated by taking the difference of each value $C_{i,j}$ and the running recursive mean of the neighbors above row i ($\overline{C}_{i-1,j}$). Estimating the mean difference this way is not as accurate as taking the true mean difference since only rows above are used but it requires that only one row of running means are stored as compared to several rows of actual pixel values be stored.

In one embodiment, referring to FIG. 15A, the process flow of method 2220 may implement a recursive mode of operation, wherein the previous column and row correction terms are applied before calculating row and column noise, which allows for correction of lower spatial frequencies when the image is high pass filtered prior to estimating the noise.

Generally, during processing, a recursive filter re-uses at least a portion of the output data as input data. The feedback input of the recursive filter may be referred to as an infinite impulse response (IIR), which may be characterized, e.g., by exponentially growing output data, exponentially decaying output data, or sinusoidal output data. In some implementations, a recursive filter may not have an infinite impulse response. As such, e.g., some implementations of a moving average filter function as recursive filters but with a finite impulse response (FIR).

As further set forth in the description of FIGS. 19A to 22B, additional techniques are contemplated to determine row and/or column correction terms. For example, in some embodiments, such techniques may be used to provide correction terms without overcompensating for the presence of vertical and/or horizontal objects present in scene 2170. Such techniques may be used in any appropriate environment where such objects may be frequently captured including, for example, urban applications, rural applications, vehicle applications, and others. In some embodiments, such techniques may provide correction terms with reduced memory and/or reduced processing overhead in comparison with other approaches used to determine correction terms.

Figure 19A:
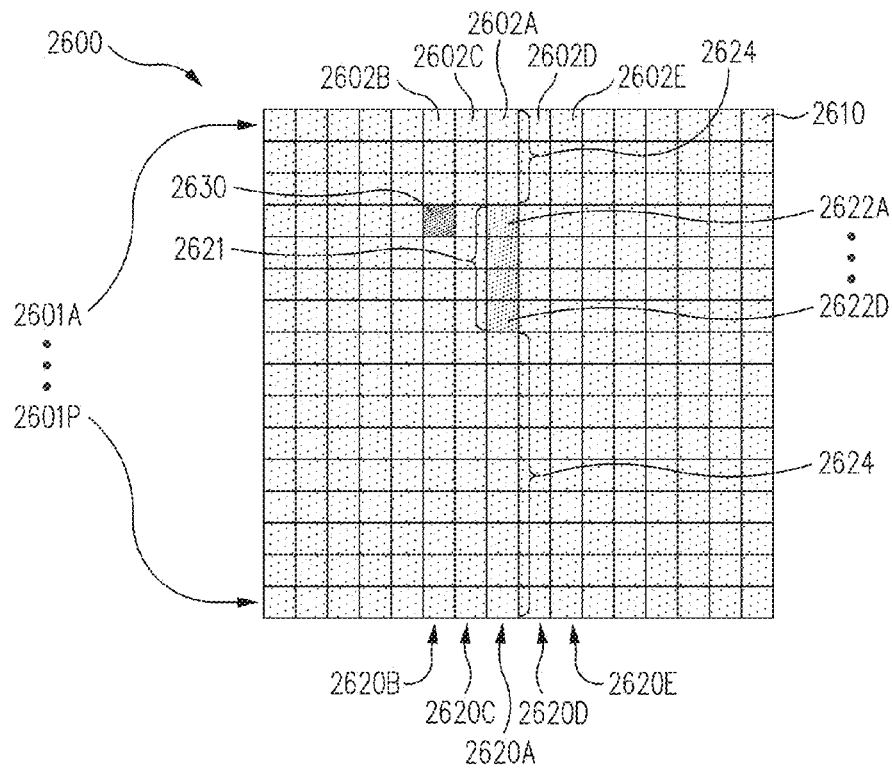
FIG. 19A shows an infrared image of a scene including small vertical structure in accordance with an embodiment of the disclosure.

FIG. 19A shows an infrared image 2600 (e.g., infrared image data) of scene 2170 in accordance with an embodiment of the disclosure. Although infrared image 2600 is depicted as having 16 rows and 16 columns, other image sizes are contemplated for infrared image 2600 and the various other infrared images discussed herein. For example, in one embodiment, infrared image 2600 may have 640 columns and 512 rows.

In FIG. 19A, infrared image 2600 depicts scene 2170 as relatively uniform, with a majority of pixels 2610 of infrared image 2600 having the same or similar intensity (e.g., the same or similar numbers of digital counts). Also in this embodiment, scene 2170 includes an object 2621 which appears in pixels 2622A-D of a column 2620A of infrared image 2600. In this regard, pixels 2622A-D are depicted somewhat darker than other pixels 2610 of infrared image 2600. For purposes of discussion, it will be assumed that darker pixels are associated with higher numbers of digital counts, however lighter pixels may be associated with higher numbers of digital counts in other implementations if desired. As shown, the remaining pixels 2624 of column 2620A have a substantially uniform intensity with pixels 2610.

In some embodiments, object 2621 may be a vertical object such as a building, telephone pole, light pole, power line, cellular tower, tree, human being, and/or other object. If image capture component 2130 is disposed in a vehicle approaching object 2621, then object 2621 may appear relatively fixed in infrared image 2600 while the vehicle is still sufficiently far away from object 2621 (e.g., object 2621 may remain primarily represented by pixels 2622A-D and may not significantly shift position within infrared image 2600). If image capture component 2130 is disposed at a fixed location relative to object 2621, then object 2621 may also appear relatively fixed in infrared image 2600 (e.g., if object 2621 is fixed and/or is positioned sufficiently far away). Other dispositions of image capture component 2130 relative to object 2621 are also contemplated.

Infrared image 2600 also includes another pixel 2630 which may be attributable to, for example, temporal noise, fixed spatial noise, a faulty sensor/circuitry, actual scene information, and/or other sources. As shown in FIG. 19A, pixel 2630 is darker (e.g., has a higher number of digital counts) than all of pixels 2610 and 2622A-D.

Vertical objects such as object 2621 depicted by pixels 2622A-D are often problematic for some column correction techniques. In this regard, objects that remain disposed primarily in one or several columns may result in overcompensation when column correction terms are calculated without regard to the possible presence of small vertical objects appearing in scene 2170. For example, when pixels 2622A-D of column 2620A are compared with those of nearby columns 2620B-E, some column correction techniques may interpret pixels 2622A-D as column noise, rather than actual scene information. Indeed, the significantly darker appearance of pixels 2622A-D relative to pixels 2610 and the relatively small width of object 2621 disposed in column 2620A may skew the calculation of a column correction term to significantly correct the entire column 2620A, although only a small portion of column 2620A actually includes darker scene information. As a result, the column correction term determined for column 2620A may significantly lighten (e.g., brighten or reduce the number of digital counts) column 2620A to compensate for the assumed column noise.

Figure 19B:
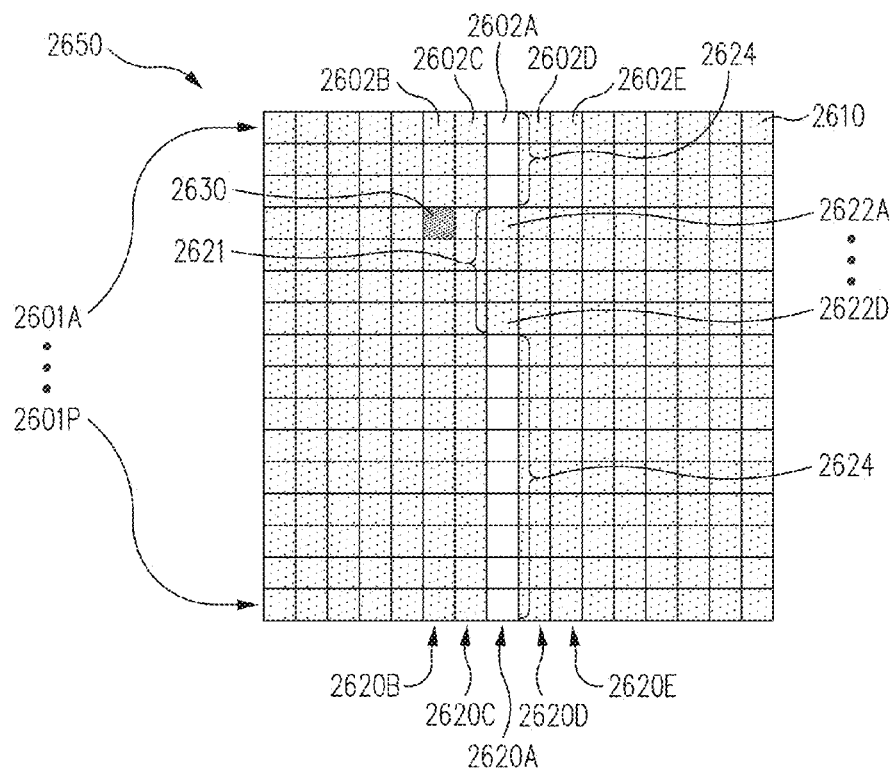
FIG. 19B shows a corrected version of the infrared image of FIG. 19A in accordance with an embodiment of the disclosure.

For example, FIG. 19B shows a corrected version 2650 of infrared image 2600 of FIG. 19A. As shown in FIG. 19B, column 2620A has been significantly brightened. Pixels 2622A-D have been made significantly lighter to be approximately uniform with pixels 2610, and the actual scene information (e.g., the depiction of object 2621) contained in pixels 2622A-D has been mostly lost. In addition, remaining pixels 2624 of column 2620A have been significantly brightened such that they are no longer substantially uniform with pixels 2610. Indeed, the column correction term applied to column 2620A has actually introduced new non-uniformities in pixels 2624 relative to the rest of scene 2170.

Various techniques described herein may be used to determine column correction terms without overcompensating for the appearance of various vertical objects that may be present in scene 2170. For example, in one embodiment, when such techniques are applied to column 2620A of FIG. 19A, the presence of dark pixels 2622A-D may not cause any further changes to the column correction term for column 2620A (e.g., after correction is applied, column 2620A may appear as shown in FIG. 19A rather than as shown in FIG. 19B).

In accordance with various embodiments further described herein, corresponding column correction terms may be determined for each column of an infrared image without overcompensating for the presence of vertical objects present in scene 2170. In this regard, a first pixel of a selected column of an infrared image (e.g., the pixel of the column residing in a particular row) may be compared with a corresponding set of other pixels (e.g., also referred to as neighborhood pixels) that are within a neighborhood associated with the first pixel. In some embodiments, the neighborhood may correspond to pixels in the same row as the first pixel that are within a range of columns. For example, the neighborhood may be defined by an intersection of: the same row as the first pixel; and a predetermined range of columns.

The range of columns may be any desired number of columns on the left side, right side, or both left and right sides of the selected column. In this regard, if the range of columns corresponds to two columns on both sides of the selected column, then four comparisons may be made for the first pixel (e.g., two columns to the left of the selected column, and two columns to the right of the selected column). Although a range of two columns on both sides of the selected column is further described herein, other ranges are also contemplated (e.g., 5 columns, 8 columns, or any desired number of columns).

One or more counters (e.g., registers, memory locations, accumulators, and/or other implementations in processing component 2110, noise filtering module 2112, memory component 2120, and/or other components) are adjusted (e.g., incremented, decremented, or otherwise updated) based on the comparisons. In this regard, for each comparison where the pixel of the selected column has a lesser value than a compared pixel, a counter A may be adjusted. For each comparison where the pixel of the selected column has an equal (e.g., exactly equal or substantially equal) value as a compared pixel, a counter B may be adjusted. For each comparison where the pixel of the selected column has a greater value than a compared pixel, a counter C may be adjusted. Thus, if the range of columns corresponds to two columns on either side of the selected column as identified in the example above, then a total of four adjustments (e.g., counts) may be collectively held by counters A, B, and C.

After the first pixel of the selected column is compared with all pixels in its corresponding neighborhood, the process is repeated for all remaining pixels in the selected column (e.g., one pixel for each row of the infrared image), and counters A, B, and C continue to be adjusted in response to the comparisons performed for the remaining pixels. In this regard, in some embodiments, each pixel of the selected column may be compared with a different corresponding neighborhood of pixels (e.g., pixels residing: in the same row as the pixel of the selected column; and within a range of columns), and counters A, B, and C may be adjusted based on the results of such comparisons.

As a result, after all pixels of the selected column are compared, counters A, B, and C may identify the number of comparisons for which pixels of the selected column were found to be greater, equal, or less than neighborhood pixels. Thus, continuing the example above, if the infrared image has 16 rows, then a total of 64 counts may be distributed across counters A, B, and C for the selected column (e.g., 4 counts per row×16 rows=64 counts). It is contemplated that other numbers of counts may be used. For example, in a large array having 512 rows and using a range of 10 columns, 5120 counts (e.g., 512 rows×10 columns) may be used to determine each column correction term.

Based on the distribution of the counts in counters A, B, and C, the column correction term for the selected column may be selectively incremented, decremented, or remain the same based on one or more calculations performed using values of one or more of counters A, B, and/or C. For example, in some embodiments: the column correction term may be incremented if counter A−counter B−counter C>D; the column correction term may be decremented if counter C−counter A−counter B>D; and the column correction term may remain the same in all other cases. In such embodiments, D may be a value such as a constant value smaller than the total number of comparisons accumulated by counters A, B, and C per column. For example, in one embodiment, D may have a value equal to: (number of rows)/2.

The process may be repeated for all remaining columns of the infrared image in order to determine (e.g., calculate and/or update) a corresponding column correction term for each column of the infrared image. In addition, after column correction terms have been determined for one or more columns, the process may be repeated for one or more columns (e.g., to increment, decrement, or not change one or more column correction terms) after the column corrected terms are applied to the same infrared image and/or another infrared image (e.g., a subsequently captured infrared image).

As discussed, counters A, B, and C identify the number of compared pixels that are less than, equal to, or greater than pixels of the selected column. This contrasts with various other techniques used to determine column correction terms where the actual differences (e.g., calculated difference values) between compared pixels may be used.

Figure 20A:
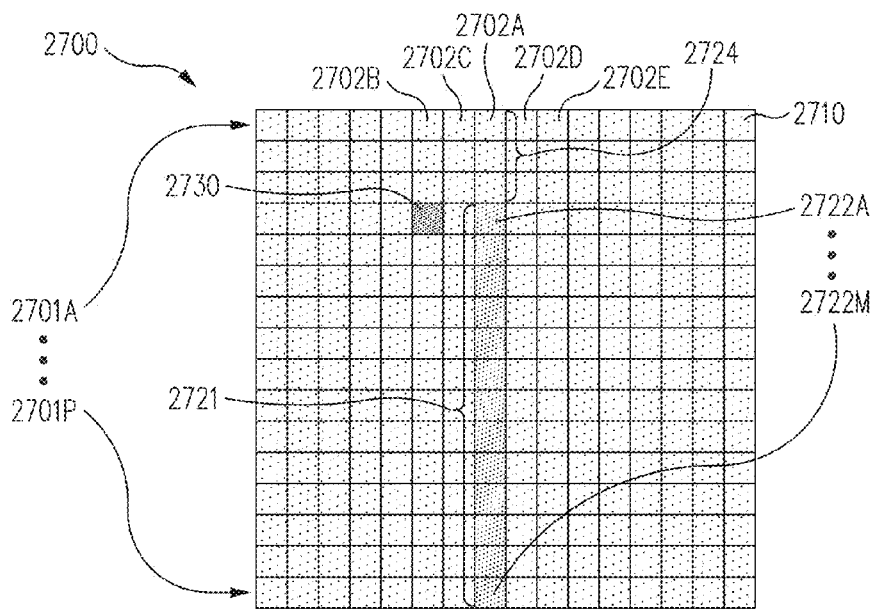
FIG. 20A shows an infrared image of a scene including a large vertical structure in accordance with an embodiment of the disclosure.
Figure 20B:
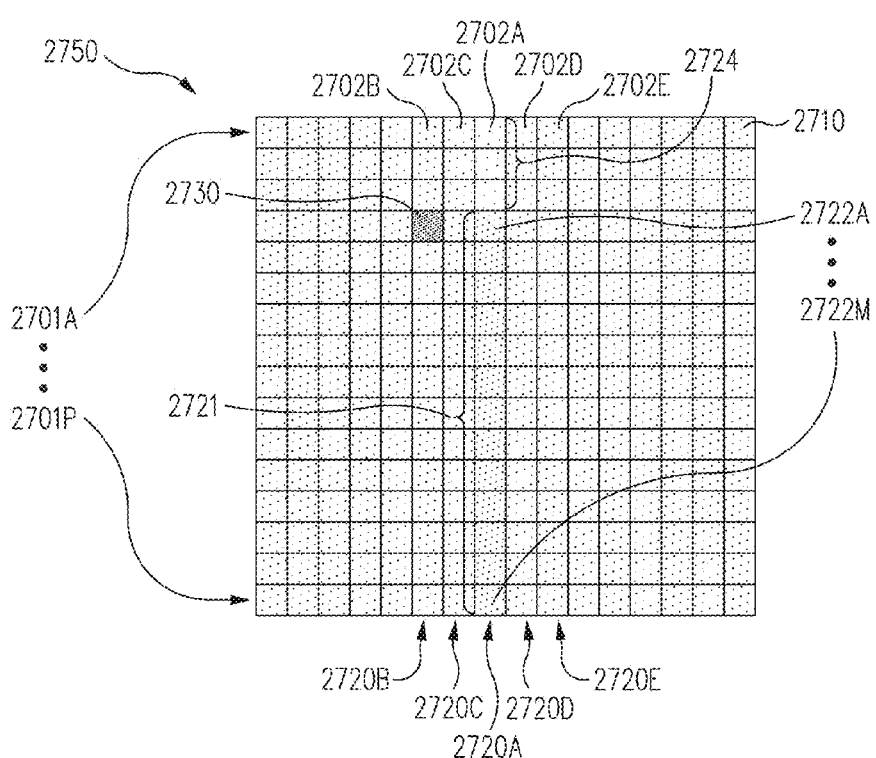
FIG. 20B shows a corrected version of the infrared image of FIG. 20A in accordance with an embodiment of the disclosure.

By determining column correction terms based on less than, equal to, or greater than relationships (e.g., rather than the actual numerical differences between the digital counts of different pixels), the column correction terms may be less skewed by the presence of small vertical objects appearing in infrared images. In this regard, by using this approach, small objects such as object 2621 with high numbers of digital counts may not inadvertently cause column correction terms to be calculated that would overcompensate for such objects (e.g., resulting in an undesirable infrared image 2650 as shown in FIG. 19B). Rather, using this approach, object 2621 may not cause any change to column correction terms (e.g., resulting in an unchanged infrared image 2600 as shown in FIG. 19A). However, larger objects such as object 2721 which may be legitimately identified as column noise may be appropriately reduced through adjustment of column correction terms (e.g., resulting in a corrected infrared image 2750 as shown in FIG. 20B).

In addition, using this approach may reduce the effects of other types of scene information on column correction term values. In this regard, counters A, B, and C identify relative relationships (e.g., less than, equal to, or greater than relationships) between pixels of the selected column and neighborhood pixels. In some embodiments, such relative relationships may correspond, for example, to the sign (e.g., positive, negative, or zero) of the difference between the values of pixels of the selected column and the values of neighborhood pixels. By using relative relationships rather than actual numerical differences, exponential scene changes (e.g., non-linear scene information gradients) may contribute less to column correction term determinations. For example, exponentially higher digital counts in certain pixels may be treated as simply being greater than or less than other pixels for comparison purposes and consequently will not unduly skew the column correction term.

In addition, by identifying relative relationships rather than actual numerical differences in counters A, B, and C, high pass filtering can be reduced in some embodiments. In this regard, where low frequency scene information or noise remains fairly uniform throughout compared neighborhoods of pixels, such low frequency content may not significantly affect the relative relationships between the compared pixels.

Advantageously, counters A, B, and C provide an efficient approach to calculating column correction terms. In this regard, in some embodiments, only three counters A, B, and C are used to store the results of all pixel comparisons performed for a selected column. This contrasts with various other approaches in which many more unique values are stored (e.g., where particular numerical differences, or the number of occurrences of such numerical differences, are stored).

In some embodiments, where the total number of rows of an infrared image is known, further efficiency may be achieved by omitting counter B. In this regard, the total number of counts may be known based on the range of columns used for comparison and the number of rows of the infrared image. In addition, it may be assumed that any comparisons that do not result in counter A or counter C being adjusted will correspond to those comparisons where pixels have equal values. Therefore, the value that would have been held by counter B may be determined from counters A and C (e.g., (number of rows×range)−counter A value−counter B value=counter C value).

In some embodiments, only a single counter may be used. In this regard, a single counter may be selectively adjusted in a first manner (e.g., incremented or decremented) for each comparison where the pixel of the selected column has a greater value than a compared pixel, selectively adjusted in a second manner (e.g., decremented or incremented) for each comparison where the pixel of the selected column has a lesser value than a compared pixel, and not adjusted (e.g., retaining its existing value) for each comparison where the pixel of the selected column has an equal (e.g., exactly equal or substantially equal) value as a compared pixel. Thus, the value of the single counter may indicate relative numbers of compared pixels that are greater than or less than the pixels of the selected column (e.g., after all pixels of the selected column have been compared with corresponding neighborhood pixels).

A column correction term for the selected column may be updated (e.g., incremented, decremented, or remain the same) based on the value of the single counter. For example, in some embodiments, if the single counter exhibits a baseline value (e.g., zero or other number) after comparisons are performed, then the column correction term may remain the same. In some embodiments, if the single counter is greater or less than the baseline value, the column correction term may be selectively incremented or decremented as appropriate to reduce the overall differences between the compared pixels and the pixels of the selected column. In some embodiments, the updating of the column correction term may be conditioned on the single counter having a value that differs from the baseline value by at least a threshold amount to prevent undue skewing of the column correction term based on limited numbers of compared pixels having different values from the pixels of the selected column.

These techniques may also be used to compensate for larger vertical anomalies in infrared images where appropriate. For example, FIG. 20A illustrates an infrared image 2700 of scene 2170 in accordance with an embodiment of the disclosure. Similar to infrared image 2600, infrared image 2700 depicts scene 2170 as relatively uniform, with a majority of pixels 2710 of infrared image 2700 having the same or similar intensity. Also in this embodiment, a column 2720A of infrared image 2700 includes pixels 2722A-M that are somewhat darker than pixels 2710, while the remaining pixels 2724 of column 2720A have a substantially uniform intensity with pixels 2710.

However, in contrast to pixels 2622A-D of FIG. 19A, pixels 2722A-M of FIG. 20A occupy a significant majority of column 2720A. As such, it is more likely that an object 2721 depicted by pixels 2722A-M may actually be an anomaly such as column noise or another undesired source rather than an actual structure or other actual scene information. For example, in some embodiments, it is contemplated that actual scene information that occupies a significant majority of at least one column would also likely occupy a significant horizontal portion of one or more rows. For example, a vertical structure in close proximity to image capture component 2130 may be expected to occupy multiple columns and/or rows of infrared image 2700. Because object 2721 appears as a tall narrow band occupying a significant majority of only one column 2720A, it is more likely that object 2721 is actually column noise.

FIG. 20B shows a corrected version 2750 of infrared image 2700 of FIG. 20A. As shown in FIG. 20B, column 2720A has been brightened, but not as significantly as column 2620A of infrared image 2650. Pixels 2722A-M have been made lighter, but still appear slightly darker than pixels 2710. In another embodiment, column 2720A may be corrected such that pixels 2722A-M may be approximately uniform with pixels 2710. As also shown in FIG. 20B, remaining pixels 2724 of column 2720A have been brightened but not as significantly as pixels 2624 of infrared image 2650. In another embodiment, pixels 2724 may be further brightened or may remain substantially uniform with pixels 2710.

Figure 21:
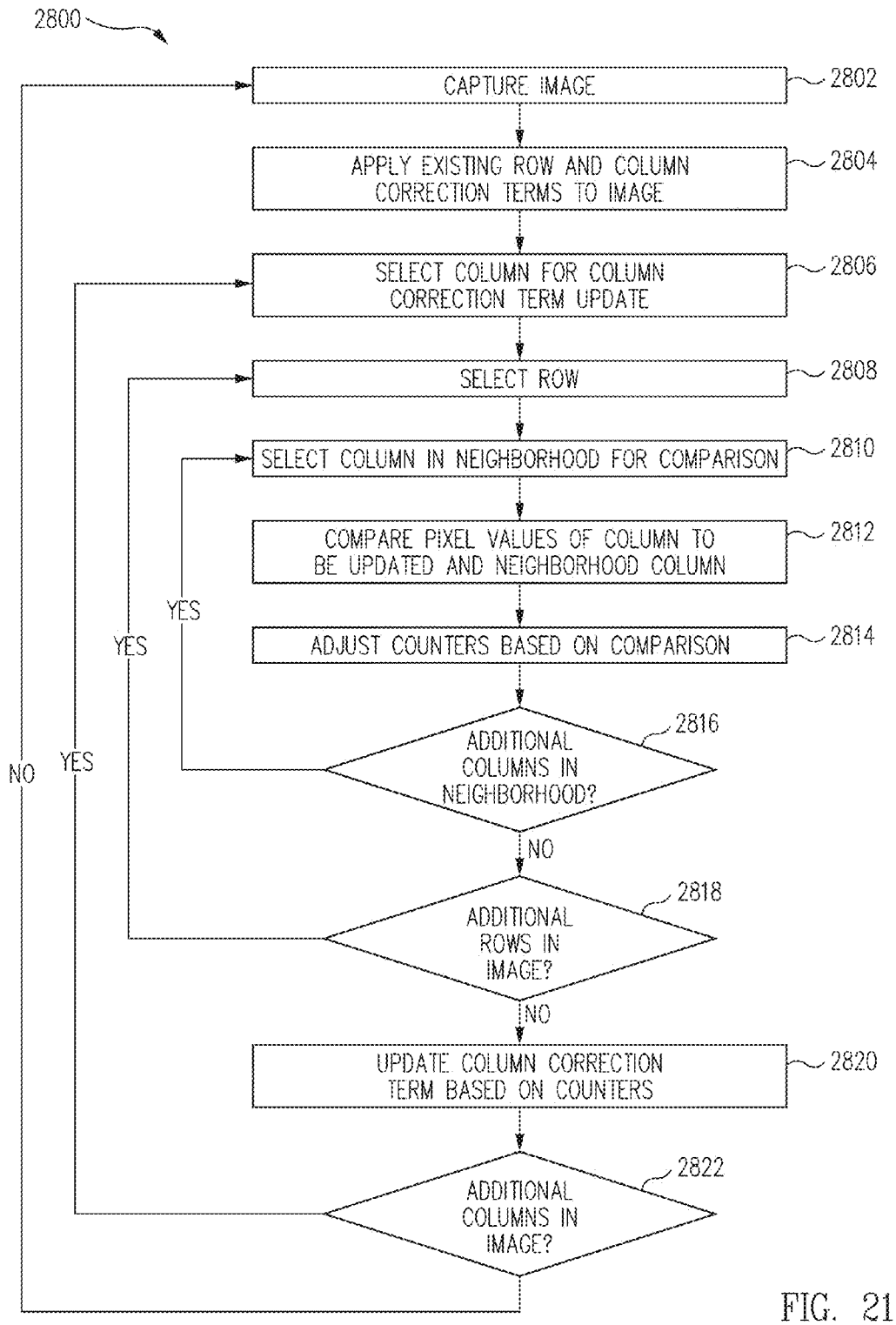
FIG. 21 is a flowchart illustrating another method for noise filtering an infrared image in accordance with an embodiment of the disclosure.
Figure 22A:
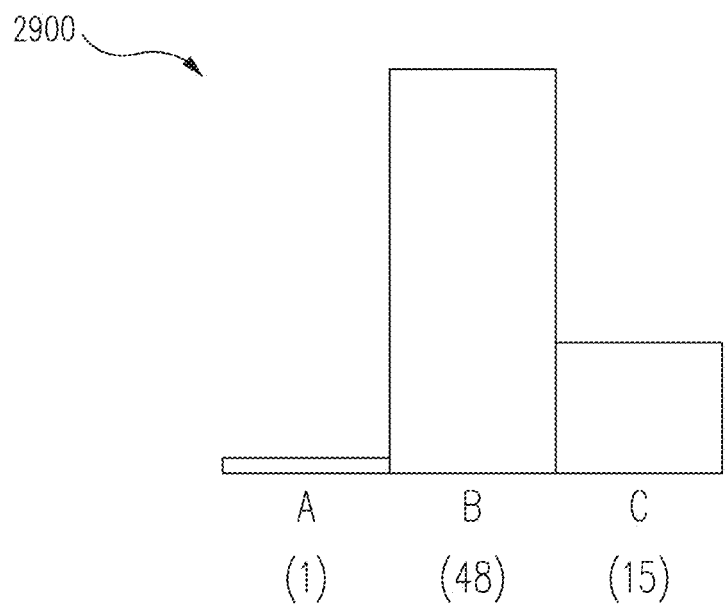
FIG. 22A shows a histogram prepared for the infrared image of FIG. 19A in accordance with an embodiment of the disclosure.
Figure 22B:
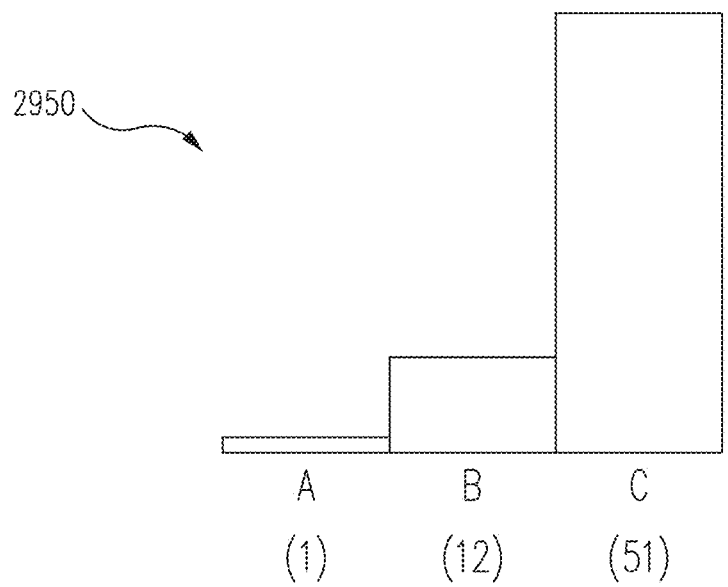
FIG. 22B shows a histogram prepared for the infrared image of FIG. 20A in accordance with an embodiment of the disclosure.

Various aspects of these techniques are further explained with regard to FIGS. 21 and 22A-B. In this regard, FIG. 21 is a flowchart illustrating a method 2800 for noise filtering an infrared image, in accordance with an embodiment of the disclosure. Although particular components of system 2100 are referenced in relation to particular blocks of FIG. 21, the various operations described with regard to FIG. 21 may be performed by any appropriate components, such as image capture component 2130, processing component, 2110, noise filtering module 2112, memory component 2120, control component 2140, and/or others.

In block 2802, image capture component 2130 captures an infrared image (e.g., infrared image 2600 or 2700) of scene 2170. In block 2804, noise filtering module 2112 applies existing row and column correction terms to infrared image 2600/2700. In some embodiments, such existing row and column correction terms may be determined by any of the various techniques described herein, factory calibration operations, and/or other appropriate techniques. In some embodiments, the column correction terms applied in block 2804 may be undetermined (e.g., zero) during a first iteration of block 2804, and may be determined and updated during one or more iterations of FIG. 21.

In block 2806, noise filtering module 2112 selects a column of infrared image 2600/2700. Although column 2620A/2720A will be referenced in the following description, any desired column may be used. For example, in some embodiments, a rightmost or leftmost column of infrared image 2600/2700 may be selected in a first iteration of block 2806. In some embodiments, block 2806 may also include resetting counters A, B, and C to zero or another appropriate default value.

In block 2808, noise filtering module 2112 selects a row of infrared image 2600/2700. For example, a topmost row 2601A/2701A of infrared image 2600/2700 may be selected in a first iteration of block 2808. Other rows may be selected in other embodiments.

In block 2810, noise filtering module 2112 selects another column in a neighborhood for comparison to column 2620A. In this example, the neighborhood has a range of two columns (e.g., columns 2620B-E/2720B-E) on both sides of column 2620A/2720A, corresponding to pixels 2602B-E/2702B-E in row 2601A/2701A on either side of pixel 2602A/2702A. Accordingly, in one embodiment, column 2620B/2720B may be selected in this iteration of block 2810.

In block 2812, noise filtering module 2112 compares pixels 2602B/2702B to pixel 2602A/2702A. In block 2814, counter A is adjusted if pixel 2602A/2702A has a lower value than pixel 2602B/2702B. Counter B is adjusted if pixel 2602A/2702A has an equal value as pixel 2602B/2702B. Counter C is adjusted if pixel 2602A/2702A has a higher value than pixel 2602B/2702B. In this example, pixel 2602A/2702A has an equal value as pixel 2602B/2702B. Accordingly, counter B will be adjusted, and counters A and C will not be adjusted in this iteration of block 2814.

In block 2816, if additional columns in the neighborhood remain to be compared (e.g., columns 2620C-E/2720C-E), then blocks 2810-2816 are repeated to compare the remaining pixels of the neighborhood (e.g., pixels 2602B-E/2702B-E residing in columns 2620C-E/2720C-E and in row 2601A/2701A) to pixel 2602A/2702A. In FIGS. 19A/20A, pixel 2602A/2702A has an equal value as all of pixels 2602B-E/2702B-E. Accordingly, after pixel 2602A/2702A has been compared with all pixels in its neighborhood, counter B will have been adjusted by four counts, and counters A and C will not have been adjusted.

In block 2818, if additional rows remain in infrared images 2600/2700 (e.g., rows 2601B-P/2701B-P), then blocks 2808-2818 are repeated to compare the remaining pixels of column 2620A/2720A with the remaining pixels of columns 2602B-E/2702B-E on a row by row basis as discussed above.

Following block 2818, each of the 16 pixels of column 2620A/2720A will have been compared to 4 pixels (e.g., pixels in columns 2620B-E residing in the same row as each compared pixel of column 2620A/2720A) for a total of 64 comparisons. This results in 64 adjustments collectively shared by counters A, B, and C.

FIG. 22A shows the values of counters A, B, and C represented by a histogram 2900 after all pixels of column 2620A have been compared to the various neighborhoods of pixels included in columns 2620B-E, in accordance with an embodiment of the disclosure. In this case, counters A, B, and C have values of 1, 48, and 15, respectively. Counter A was adjusted only once as a result of pixel 2622A of column 2620A having a lower value than pixel 2630 of column 2620B. Counter C was adjusted 15 times as a result of pixels 2622A-D each having a higher value when compared to their neighborhood pixels of columns 2620B-E (e.g., except for pixel 2630 as noted above). Counter B was adjusted 48 times as a result of the remaining pixels 2624 of column 2620A having equal values as the remaining neighborhood pixels of columns 2620B-E.

FIG. 22B shows the values of counters A, B, and C represented by a histogram 2950 after all pixels of column 2720A have been compared to the various neighborhoods of pixels included in columns 2720B-E, in accordance with an embodiment of the disclosure. In this case, counters A, B, and C have values of 1, 12, and 51, respectively. Similar to FIG. 22A, counter A in FIG. 22B was adjusted only once as a result of a pixel 2722A of column 2720A having a lower value than pixel 2730 of column 2720B. Counter C was adjusted 51 times as a result of pixels 2722A-M each having a higher value when compared to their neighborhood pixels of columns 2720B-E (e.g., except for pixel 2730 as noted above). Counter B was adjusted 12 times as a result of the remaining pixels of column 2720A having equal values as the remaining neighborhood compared pixels of columns 2720B-E.

Referring again to FIG. 21, in block 2820, the column correction term for column 2620A/2720A is updated (e.g., selectively incremented, decremented, or remain the same) based on the values of counters A, B, and C. For example, as discussed above, in some embodiments, the column correction term may be incremented if counter A−counter B−counter C>D; the column correction term may be decremented if counter C−counter A−counter B>D; and the column correction term may remain the same in all other cases.

In the case of infrared image 2600, applying the above calculations to the counter values identified in FIG. 22A results in no change to the column correction term (e.g., 1(counter A)−48(counter B)−15(counter C)=−62 which is not greater than D, where D equals (16 rows)/2; and 15(counter C)−1(counter A)−48(counter B)=−34 which is not greater than D, where D equals (16 rows)/2). Thus, in this case, the values of counters A, B, and C, and the calculations performed thereon indicate that values of pixels 2622A-D are associated with an actual object (e.g., object 2621) of scene 2170. Accordingly, the small vertical structure 2621 represented by pixels 2622A-D will not result in any overcompensation in the column correction term for column 2620A.

In the case of infrared image 2700, applying the above calculations to the counter values identified in FIG. 22B results in a decrement in the column correction term (e.g., 51(counter C)−1(counter A)−12(counter B)=38 which is greater than D, where D equals (16 rows)/2). Thus, in this case, the values of counters A, B, and C, and the calculations performed thereon indicate that the values of pixels 2722A-M are associated with column noise. Accordingly, the large vertical object 2721 represented by pixels 2722A-M will result in a lightening of column 2720A to improve the uniformity of corrected infrared image 2750 shown in FIG. 20B.

At block 2822, if additional columns remain to have their column correction terms updated, then the process returns to block 2806 wherein blocks 2806-2822 are repeated to update the column correction term of another column. After all column correction terms have been updated, the process returns to block 2802 where another infrared image is captured. In this manner, FIG. 21 may be repeated to update column correction terms for each newly captured infrared image.

In some embodiments, each newly captured infrared image may not differ substantially from recent preceding infrared images. This may be due to, for example, a substantially static scene 2170, a slowing changing scene 2170, temporal filtering of infrared images, and/or other reasons. In these cases, the accuracy of column correction terms determined by FIG. 21 may improve as they are selectively incremented, decremented, or remain unchanged in each iteration of FIG. 21. As a result, in some embodiments, many of the column correction terms may eventually reach a substantially steady state in which they remain relatively unchanged after a sufficient number of iterations of FIG. 21, and while the infrared images do not substantially change.

Other embodiments are also contemplated. For example, block 2820 may be repeated multiple times to update one or more column correction terms using the same infrared image for each update. In this regard, after one or more column correction terms are updated in block 2820, the process of FIG. 21 may return to block 2804 to apply the updated column correction terms to the same infrared image used to determine the updated column correction terms. As a result, column correction terms may be iteratively updated using the same infrared image. Such an approach may be used, for example, in offline (non-realtime) processing and/or in real-time implementations with sufficient processing capabilities.

In addition, any of the various techniques described with regard to FIGS. 19A-22B may be combined where appropriate with the other techniques described herein. For example, some or all portions of the various techniques described herein may be combined as desired to perform noise filtering.

Although column correction terms have been primarily discussed with regard to FIGS. 19A-22B, the described techniques may be applied to row-based processing. For example, such techniques may be used to determine and update row correction terms without overcompensating for small horizontal structures appearing in scene 2170, while also appropriately compensating for actual row noise. Such row-based processing may be performed in addition to, or instead of various column-based processing described herein. For example, additional implementations of counters A, B, and/or C may be provided for such row-based processing.

In some embodiments where infrared images are read out on a row-by-row basis, row-corrected infrared images may be may be rapidly provided as row correction terms are updated. Similarly, in some embodiments where infrared images are read out on a column-by-column basis, column-corrected infrared images may be may be rapidly provided as column correction terms are updated.

Referring now to FIGS. 23A-E, as discussed, in some embodiments the techniques described with regard to FIGS. 23A-E may be used in place of and/or in addition to one or more operations of blocks 565-573 (see FIGS. 5 and 8) to estimate FPN and/or determine NUC terms (e.g., flat field correction terms). For example, in some embodiments, such techniques may be used to determine NUC terms to correct for spatially correlated FPN and/or spatially uncorrelated (e.g., random) FPN without requiring high pass filtering.

Figure 23A:
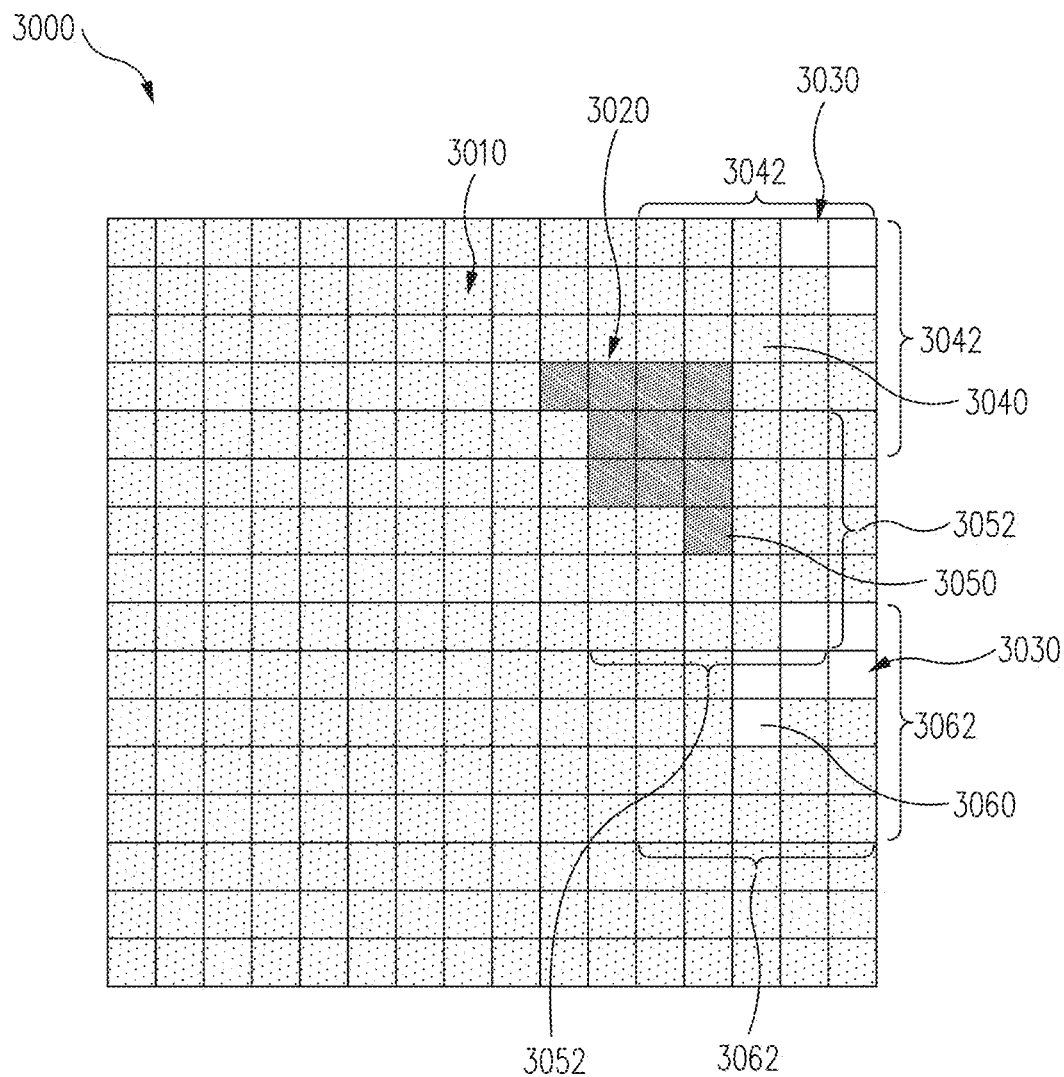
FIG. 23A illustrates an infrared image of a scene, in accordance with an embodiment of the disclosure.

FIG. 23A illustrates an infrared image 3000 (e.g., infrared image data) of scene 2170 in accordance with an embodiment of the disclosure. Although infrared image 3000 is depicted as having 16 rows and 16 columns, other image sizes are contemplated for infrared image 3000 and the various other infrared images discussed herein.

In FIG. 23A, infrared image 3000 depicts scene 2170 as relatively uniform, with a majority of pixels 3010 of infrared image 3000 having the same or similar intensity (e.g., the same or similar numbers of digital counts). Also in this embodiment, infrared image 3000 includes pixels 3020 which are depicted somewhat darker than other pixels 3010 of infrared image 3000, and pixels 3030 which are depicted somewhat lighter. As previously mentioned, for purposes of discussion, it will be assumed that darker pixels are associated with higher numbers of digital counts, however lighter pixels may be associated with higher numbers of digital counts in other implementations if desired.

In some embodiments, infrared image 3000 may be an image frame received at block 560 and/or block 565 of FIGS. 5 and 8 previously described herein. In this regard, infrared image 3000 may be an intentionally blurred image frame provided by block 555 and/or 560 in which much of the high frequency content has already been filtered out due to, for example, temporal filtering, defocusing, motion, accumulated image frames, and/or other techniques as appropriate. As such, in some embodiments, any remaining high spatial frequency content (e.g., exhibited as areas of contrast or differences in the blurred image frame) remaining in infrared image 3000 may be attributed to spatially correlated FPN and/or spatially uncorrelated FPN.

As such, it can be assumed that substantially uniform pixels 3010 generally correspond to blurred scene information, and pixels 3020 and 3030 correspond to FPN. For example, as shown in FIG. 23A, pixels 3020 and 3030 are arranged in several groups, each of which is positioned in a general area of infrared image 3000 that spans multiple rows and columns, but is not correlated to a single row or column.

Various techniques described herein may be used to determine NUC terms without overcompensating for the presence of nearby dark or light pixels. As will be further described herein, when such techniques are used to determine NUC terms for individual pixels (e.g., 3040, 3050, and 3060) of infrared image 3000, appropriate NUC terms may be determined to compensate for FPN where appropriate in some cases without overcompensating for FPN in other cases.

In accordance with various embodiments further described herein, a corresponding NUC term may be determined for each pixel of an infrared image. In this regard, a selected pixel of the infrared image may be compared with a corresponding set of other pixels (e.g., also referred to as neighborhood pixels) that are within a neighborhood associated with the selected pixel. In some embodiments, the neighborhood may correspond to pixels within a selected distance (e.g., within a selected kernel size) of the selected pixel (e.g., an N by N neighborhood of pixels around and/or adjacent to the selected pixel). For example, in some embodiments, a kernel of 5 may be used, but larger and smaller sizes are also contemplated.

As similarly discussed with regard to FIGS. 19A-22B, one or more counters (e.g., registers, memory locations, accumulators, and/or other implementations in processing component 2110, noise filtering module 2112, memory component 2120, and/or other components) are adjusted (e.g., incremented, decremented, or otherwise updated) based on the comparisons. In this regard, for each comparison where the selected pixel has a lesser value than a compared pixel of the neighborhood, a counter E may be adjusted. For each comparison where the selected pixel has an equal (e.g., exactly equal or substantially equal) value as a compared pixel of the neighborhood, a counter F may be adjusted. For each comparison where the selected pixel has a greater value than a compared pixel of the neighborhood, a counter G may be adjusted. Thus, if the neighborhood uses a kernel of 5, then a total of 24 comparisons may be made between the selected pixel and its neighborhood pixels. Accordingly, a total of 24 adjustments (e.g., counts) may be collectively held by counters E, F, and G. In this regard, counters E, F, and G may identify the number of comparisons for which neighborhood pixels were greater, equal, or less than the selected pixel.

After the selected pixel has been compared to all pixels in its neighborhood, a NUC term may be determined (e.g., adjusted) for the pixel based on the values of counters E, F, and G. Based on the distribution of the counts in counters E, F, and G, the NUC term for the selected pixel may be selectively incremented, decremented, or remain the same based on one or more calculations performed using values of one or more of counters E, F, and/or G.

Such adjustment of the NUC term may be performed in accordance with any desired calculation. For example, in some embodiments, if counter F is significantly larger than counters E and G or above a particular threshold value (e.g., indicating that a large number of neighborhood pixels are exactly equal or substantially equal to the selected pixel), then it may be decided that the NUC term should remain the same. In this case, even if several neighborhood pixels exhibit values that are significantly higher or lower than the selected pixel, those neighborhood pixels will not skew the NUC term as might occur in other mean-based or median-based calculations.

As another example, in some embodiments, if counter E or counter G is above a particular threshold value (e.g., indicating that a large number of neighborhood pixels are greater than or less than the selected pixel), then it may be decided that the NUC term should be incremented or decremented as appropriate. In this case, because the NUC term may be incremented or decremented based on the number of neighborhood pixels greater, equal, or less than the selected pixel (e.g., rather than the actual pixel values of such neighborhood pixels), the NUC term may be adjusted in a gradual fashion without introducing rapid changes that may inadvertently overcompensate for pixel value differences.

The process may be repeated by resetting counters E, F, and G, selecting another pixel of infrared image 3000, performing comparisons with its neighborhood pixels, and determining its NUC term based on the new values of counters E, F, and G. These operations can be repeated as desired until a NUC term has been determined for every pixel of infrared image 3000.

In some embodiments, after NUC terms have been determined for all pixels, the process may be repeated to further update the NUC terms using the same infrared image 3000 (e.g., after application of the NUC terms) and/or another infrared image (e.g., a subsequently captured infrared image).

As discussed, counters E, F, and G identify the number of neighborhood pixels that are greater than, equal to, or less than the selected pixel. This contrasts with various other techniques used to determine NUC terms where the actual differences (e.g., calculated difference values) between compared pixels may be used.

Counters E, F, and G identify relative relationships (e.g., less than, equal to, or greater than relationships) between the selected pixel and its neighborhood pixels. In some embodiments, such relative relationships may correspond, for example, to the sign (e.g., positive, negative, or zero) of the difference between the values of the selected pixel and its neighborhood pixels. By determining NUC terms based on relative relationships rather than actual numerical differences, the NUC terms may not be skewed by small numbers of neighborhood pixels having digital counts that widely diverge from the selected pixel.

In addition, using this approach may reduce the effects of other types of scene information on NUC term values. In this regard, because counters E, F, and G identify relative relationships between pixels rather than actual numerical differences, exponential scene changes (e.g., non-linear scene information gradients) may contribute less to NUC term determinations. For example, exponentially higher digital counts in certain pixels may be treated as simply being greater than or less than other pixels for comparison purposes and consequently will not unduly skew the NUC term. Moreover, this approach may be used without unintentionally distorting infrared images exhibiting a nonlinear slope.

Advantageously, counters E, F, and G provide an efficient approach to calculating NUC terms. In this regard, in some embodiments, only three counters E, F, and G are used to store the results of all neighborhood pixel comparisons performed for a selected pixel. This contrasts with various other approaches in which many more unique values are stored (e.g., where particular numerical differences, or the number of occurrences of such numerical differences, are stored), median filters are used (e.g., which may require sorting and the use of high pass or low pass filters including a computationally intensive divide operation to obtain a weighted mean of neighbor pixel values).

In some embodiments, where the size of a neighborhood and/or kernel is known, further efficiency may be achieved by omitting counter E. In this regard, the total number of counts may be known based on the number of pixels known to be in the neighborhood. In addition, it may be assumed that any comparisons that do not result in counter E or counter G being adjusted will correspond to those comparisons where pixels have equal values. Therefore, the value that would have been held by counter F may be determined from counters E and G (e.g., (number of neighborhood pixels)−counter E value−counter G value=counter F value).

In some embodiments, only a single counter may be used. In this regard, a single counter may be selectively adjusted in a first manner (e.g., incremented or decremented) for each comparison where the selected pixel has a greater value than a neighborhood pixel, selectively adjusted in a second manner (e.g., decremented or incremented) for each comparison where the selected pixel has a lesser value than a neighborhood pixel, and not adjusted (e.g., retaining its existing value) for each comparison where the selected pixel has an equal (e.g., exactly equal or substantially equal) value as a neighborhood pixel. Thus, the value of the single counter may indicate relative numbers of compared pixels that are greater than or less than the selected pixel (e.g., after the selected pixel has been compared with all of its corresponding neighborhood pixels).

A NUC term for the selected pixel may be updated (e.g., incremented, decremented, or remain the same) based on the value of the single counter. For example, in some embodiments, if the single counter exhibits a baseline value (e.g., zero or other number) after comparisons are performed, then the NUC term may remain the same. In some embodiments, if the single counter is greater or less than the baseline value, the NUC term may be selectively incremented or decremented as appropriate to reduce the overall differences between the selected pixel and the its corresponding neighborhood pixels. In some embodiments, the updating of the NUC term may be conditioned on the single counter having a value that differs from the baseline value by at least a threshold amount to prevent undue skewing of the NUC term based on limited numbers of neighborhood pixels having different values from the selected pixel.

Figure 23B:
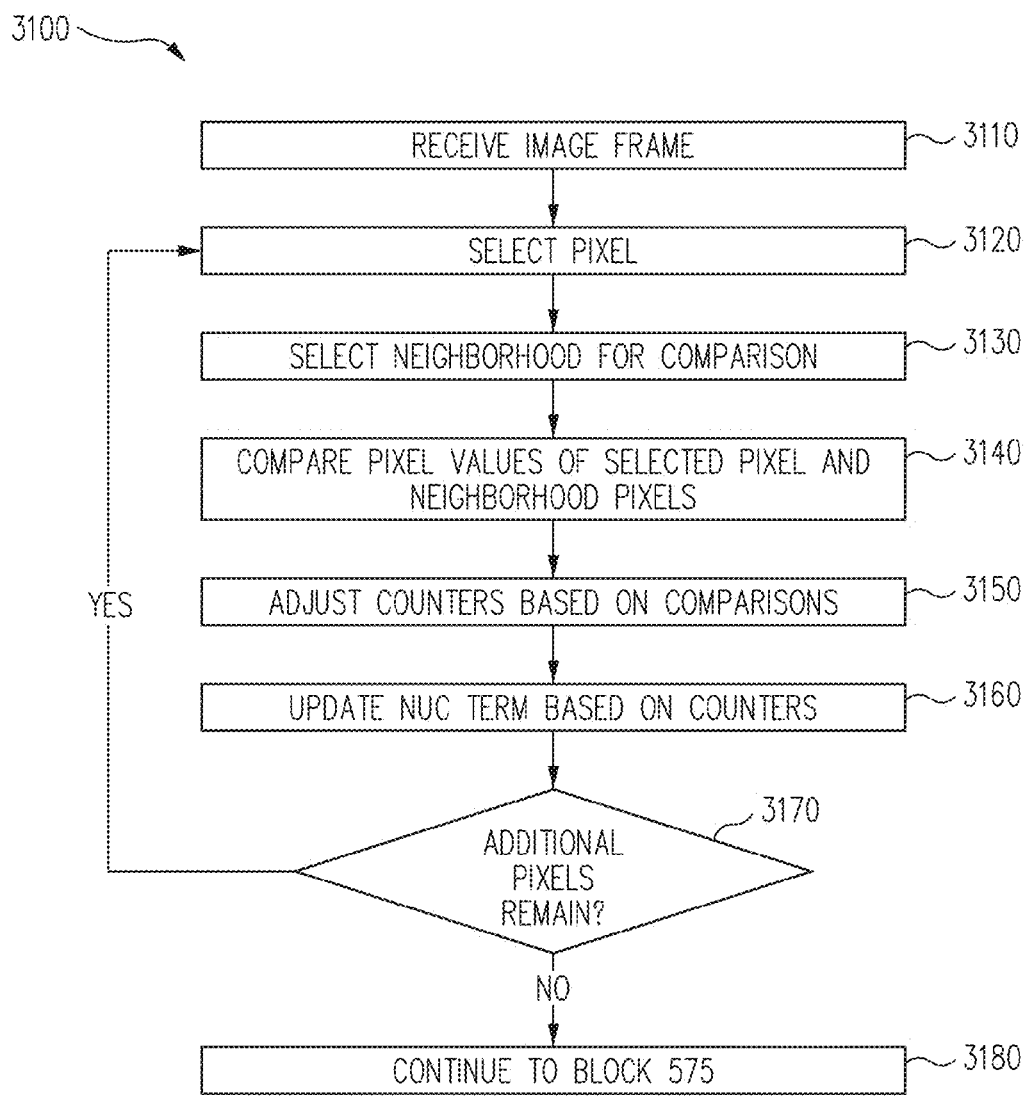
FIG. 23B is a flowchart illustrating still another method for noise filtering an infrared image in accordance with an embodiment of the disclosure.

Various aspects of these techniques are further explained with regard to FIGS. 23B-E. In this regard, FIG. 23B is a flowchart illustrating a method 3100 for noise filtering an infrared image, in accordance with an embodiment of the disclosure. Although particular components of system 2100 are referenced in relation to particular blocks of FIG. 23B, the various operations described with regard to FIG. 23B may be performed by any appropriate components, such as image capture component 2130, processing component, 2110, noise filtering module 2112, memory component 2120, control component 2140, and/or others. In some embodiments, the operations of FIG. 23B may be performed, for example, in place of blocks 565-573 of FIGS. 5 and 8.

In block 3110, an image frame (e.g., infrared image 3000) is received. For example, as discussed, infrared image 3000 may be an intentionally blurred image frame provided by block 555 and/or 560.

In block 3120, noise filtering module 2112 selects a pixel of infrared image 3000 for which a NUC term will be determined. For example, in some embodiments, the selected pixel may be pixel 3040, 3050, or 3060. However, any pixel of infrared image 3000 may be selected. In some embodiments, block 3120 may also include resetting counters E, F, and G to zero or another appropriate default value.

In block 3130, noise filtering module 2112 selects a neighborhood (e.g., a pixel neighborhood) associated with the selected pixel. As discussed, in some embodiments, the neighborhood may correspond to pixels within a selected distance of the selected pixel. In the case of selected pixel 3040, a kernel of 5 corresponds to a neighborhood 3042 (e.g., including 24 neighborhood pixels surrounding selected pixel 3040). In the case of selected pixel 3050, a kernel of 5 corresponds to a neighborhood 3052 (e.g., including 24 neighborhood pixels surrounding selected pixel 3050). In the case of selected pixel 3060, a kernel of 5 corresponds to a neighborhood 3062 (e.g., including 24 neighborhood pixels surrounding selected pixel 3060). As discussed, larger and smaller kernel sizes are also contemplated.

In blocks 3140 and 3150, noise filtering module 2112 compares the selected pixel to its neighborhood pixels and adjusts counters E, F, and G based on the comparisons performed in block 3140. Blocks 3140 and 3150 may be performed in any desired combination such that counters E, F, and G may be updated after each comparison and/or after all comparisons have been performed.

Figure 23C:
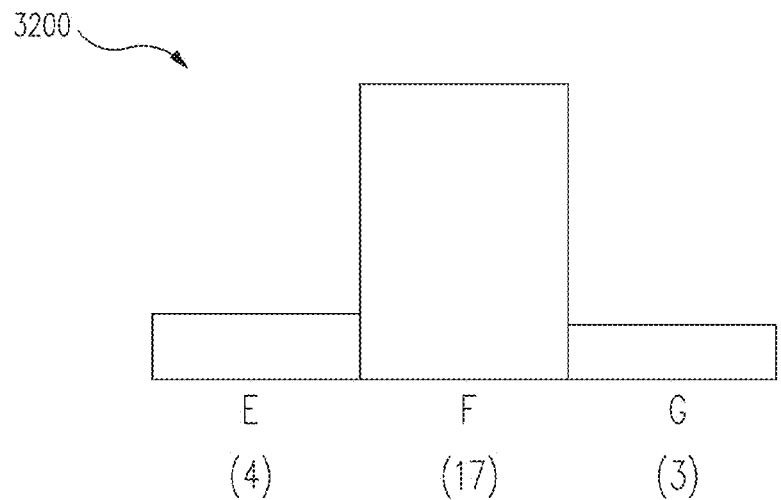
FIGS. 23C-E show histograms prepared for neighborhoods around selected pixels of the infrared image of FIG. 23A in accordance with embodiments of the disclosure.

In the case of selected pixel 3040, FIG. 23C shows the adjusted values of counters E, F, and G represented by a histogram 3200 after selected pixel 3040 has been compared to the pixels of neighborhood 3042. Neighborhood 3042 includes 4 pixels having higher values, 17 pixels having equal values, and 3 pixels having lower values than selected pixel 3040. Accordingly, counters E, F, and G may be adjusted to the values shown in FIG. 23C.

Figure 23D:
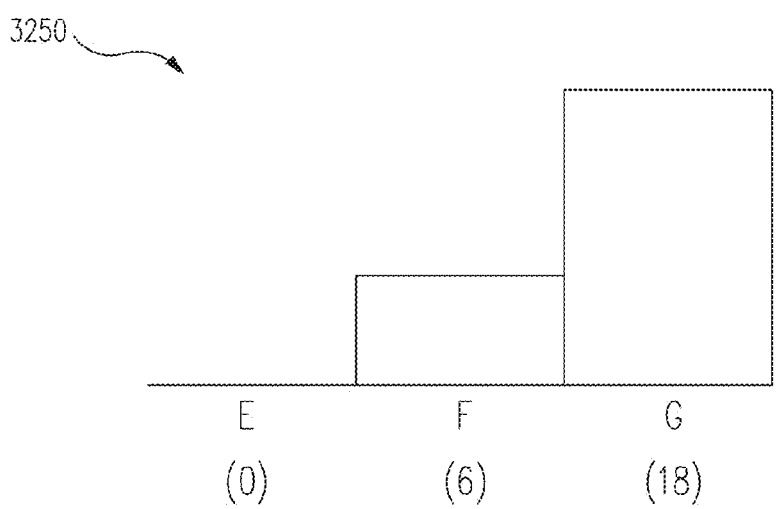

In the case of selected pixel 3050, FIG. 23D shows the adjusted values of counters E, F, and G represented by a histogram 3250 after selected pixel 3050 has been compared to the pixels of neighborhood 3052. Neighborhood 3052 includes 0 pixels having higher values, 6 pixels having equal values, and 18 pixels having lower values than selected pixel 3050. Accordingly, counters E, F, and G may be adjusted to the values shown in FIG. 23D.

Figure 23E:
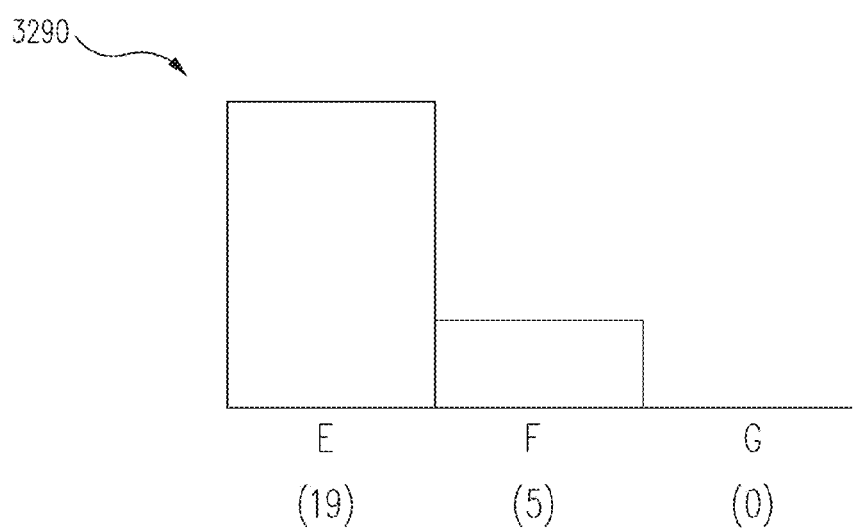

In the case of selected pixel 3060, FIG. 23E shows the adjusted values of counters E, F, and G represented by a histogram 3290 after selected pixel 3060 has been compared to the pixels of neighborhood 3062. Neighborhood 3062 includes 19 pixels having higher values, 5 pixels having equal values, and 0 pixels having lower values than selected pixel 3060. Accordingly, counters E, F, and G may be adjusted to the values shown in FIG. 23E.

In block 3160, the NUC term for the selected pixel is updated (e.g., selectively incremented, decremented, or remain the same) based on the values of counters E, F, and G. Such updating may be performed in accordance with any appropriate calculation using the values of counters E, F, and G.

For example, in the case of selected pixel 3040, counter F in FIG. 23C indicates that most neighborhood pixels (e.g., 17 neighborhood pixels) have values equal to selected pixel 3040, while counters E and G indicate that smaller numbers of neighborhood pixels have values greater than (e.g., 4 neighborhood pixels) or less than (e.g., 3 neighborhood pixels) selected pixel 3040. Moreover, the number of neighborhood pixels having values greater than and less than selected pixel 3040 are similar (e.g., 4 and 3 neighborhood pixels, respectively). Accordingly, in this case, noise filtering module 2112 may choose to keep the NUC term for selected pixel 3040 the same (e.g., unchanged) since a further offset of selected pixel 3040 would likely introduce additional non-uniformity into infrared image 3000.

In the case of selected pixel 3050, counter G in FIG. 23D indicates that most neighborhood pixels (e.g., 18 neighborhood pixels) have values less than selected pixel 3050, while counter F indicates that a smaller number of neighborhood pixels (e.g., 6 neighborhood pixels) have values equal to selected pixel 3050, and counter E indicates that no neighborhood pixels (e.g., 0 neighborhood pixels) have values greater than selected pixel 3050. These counter values suggest that selected pixel 3050 is exhibiting FPN that appears darker than most neighborhood pixels. Accordingly, in this case, noise filtering module 2112 may choose to decrement the NUC term for selected pixel 3050 (e.g., to lighten selected pixel 3050) such that it exhibits more uniformity with the large numbers of neighborhood pixels having lower values.

In the case of selected pixel 3060, counter E in FIG. 23E indicates that most neighborhood pixels (e.g., 19 neighborhood pixels) have values greater than selected pixel 3060, while counter F indicates that a smaller number of neighborhood pixels (e.g., 5 neighborhood pixels) have values equal to selected pixel 3060, and counter G indicates that no neighborhood pixels (e.g., 0 neighborhood pixels) have values less than selected pixel 3060. These counter values suggest that selected pixel 3060 is exhibiting FPN that appears lighter than most neighborhood pixels. Accordingly, in this case, noise filtering module 2112 may choose to increment the NUC term for selected pixel 3060 (e.g., to darken selected pixel 3060) such that it exhibits more uniformity with the large numbers of neighborhood pixels having higher values.

In block 3160, changes to the NUC term for the selected pixel may be made incrementally. For example, in some embodiments, the NUC term may be incremented or decremented by a small amount (e.g., only one or several digital counts in some embodiments) in block 3160. Such incremental changes can prevent large rapid changes in NUC terms that may inadvertently introduce undesirable non-uniformities in infrared image 3000. The process of FIG. 23B may be repeated during each iteration of FIGS. 5 and 8 (e.g., in place of blocks 565 and/or 570). Therefore, if large changes in the NUC term are required, then the NUC term may be repeatedly incremented and/or decremented during each iteration until the NUC value stabilizes (e.g., stays substantially the same during further iterations). In some embodiments, the block 3160 may further include weighting the updated NUC term based on local gradients and/or temporal damping as described herein.

At block 3170, if additional pixels of infrared image 3000 remain to be selected, then the process returns to block 3120 wherein blocks 3120-3170 are repeated to update the NUC term for another selected pixel. In this regard, blocks 3120-3170 may be iterated at least once for each pixel of infrared image 3000 to update the NUC term for each pixel (e.g., each pixel of infrared image 3000 may be selected and its corresponding NUC term may be updated during a corresponding iteration of blocks 3120-3170).

At block 3180, after NUC terms have been updated for all pixels of infrared image 3000, the process continues to block 575 of FIGS. 5 and 8. Operations of one or more of blocks 565-573 may also be performed in addition to the process of FIG. 23B.

The process of FIG. 23B may be repeated for each intentionally blurred image frame provided by block 555 and/or 560. In some embodiments, each new image frame received at block 3110 may not differ substantially from other recently received image frames (e.g., in previous iterations of the process of FIG. 23B). This may be due to, for example, a substantially static scene 2170, a slowing changing scene 2170, temporal filtering of infrared images, and/or other reasons. In these cases, the accuracy of NUC terms determined by FIG. 23B may improve as they are selectively incremented, decremented, or remain unchanged in each iteration of FIG. 23B. As a result, in some embodiments, many of the NUC terms may eventually reach a substantially steady state in which they remain relatively unchanged after a sufficient number of iterations of FIG. 23B, and while the image frames do not substantially change.

Other embodiments are also contemplated. For example, block 3160 may be repeated multiple times to update one or more NUC terms using the same infrared image for each update. In this regard, after a NUC term is updated in block 3160 or after multiple NUC terms are updated in additional iterations of block 3160, the process of FIG. 23B may first apply the one or more updated NUC terms (e.g., also in block 3160) to the same infrared image used to determine the updated NUC terms and return to block 3120 to iteratively update one or more NUC terms using the same infrared image in such embodiments. Such an approach may be used, for example, in offline (non-realtime) processing and/or in realtime implementations with sufficient processing capabilities.

Any of the various techniques described with regard to FIGS. 23A-E may be combined where appropriate with the other techniques described herein. For example, some or all portions of the various techniques described herein may be combined as desired to perform noise filtering.

Imaging systems are used to monitor almost all aspects of public life. Visible spectrum images of common public areas, such as seaways, roads, subways, parks, buildings, and building interiors, can be used in support of a number of general security and safety organizations and applications. Visible spectrum monitoring, however, is generally limited to areas or scenes that are visibly illuminated, such as by the sun or by artificial visible spectrum lighting, for example, and to scenes that are not otherwise obscured by environmental conditions. In accordance with various embodiments of the present disclosure, infrared monitoring can be used to supplement visible spectrum monitoring when the visible spectrum monitoring is not providing sufficient information to monitor a scene according to a particular application need.

Imaging systems including infrared imaging modules, such as those described herein, can be used to extend the useful temporal range of a monitoring system to when a scene is not visibly illuminated, such as in low light conditions, for example, or when visible spectrum details of a scene or objects within a scene are otherwise obscured. In particular, imaging systems including various embodiments of infrared imaging modules 100 described herein have a number of advantages over conventional monitoring systems.

For example, infrared imaging modules 100 may be configured to monitor temperatures and conditions of scenes in relatively high detail and with relatively high accuracy at or near real-time without the scenes necessarily being illuminated sufficiently for simultaneous imaging by visible spectrum imaging modules. This allows imaging systems to provide detailed and recognizable images, including streams of images (e.g., video) of a scene regardless of whether current environmental conditions allow visible spectrum imaging of the scene.

In some embodiments, infrared imaging modules 100 may be configured to produce infrared images that can be combined with visible spectrum images captured at a different time and produce high resolution, high contrast, and/or targeted contrast combined images of a scene, for example, that include highly accurate radiometric data (e.g., infrared information) corresponding to one or more objects in the scene. For example, imaging systems including infrared imaging module 100 can be configured to detect thermal excursions (e.g., abnormal temperatures), multiple types of gases (e.g., carbon monoxide, methane, fuel exhaust fumes, and/or other gasses or gas-like atomized liquids), density/partial density of gasses, and fluid leaks, for example, and can do so without being subject to the types of thermal or other sensor lag present in conventional sensors. Moreover, imaging systems including infrared imaging modules 100 can be configured to record any of the above over time and detect minute changes in detected infrared emissions, temperatures, or related scene conditions.

In additional embodiment, infrared imaging modules 100 may be configured to produce infrared images that can be combined with visible spectrum images captured at substantially the same time and/or at different times and produce high resolution, high contrast, and/or targeted contrast combined images of a scene. In some embodiments, infrared images and visible spectrum images may be combined using triple fusion processing operations, for example, which may include selectable aspects of non-uniformity correction processing, true color processing, and high contrast processing, as described herein. In such embodiments, the selectable aspects of the various processing operations may be determined by user input, threshold values, control parameters, default parameters, and/or other operating parameters of an imaging system. For example, a user may select and/or refine each individual relative contribution of a non-uniformity correction, true color processed images, and/or high contrast processed images, to combined images displayed to the user. The combined images may include aspects of all three processing operations that can be adjusted in real-time programmatically and/or by a user utilizing a suitable user interface.

In some embodiments, various image analytics and processing may be performed according to a specific mode or context associated with an application, a scene, a condition of a scene, an imaging system configuration, a user input, an operating parameter of an imaging system, and/or other logistical concerns. For example, in the overall context of maritime imaging, such modes may include a night docking mode, a man overboard mode, a night cruising mode, a day cruising mode, a hazy conditions mode, a shoreline mode, a night-time display mode, a blending mode, a visible-only mode, an infrared-only mode, and/or other modes, such as any of the modes described and/or provided in U.S. patent application Ser. No. 12/477,828. Types of analytics and processing may include high and low pass filtering, histogram equalization, linear scaling, horizon detection, linear mapping, arithmetic image component combining, and other analytics and processing described in U.S. patent application Ser. No. 12/477,828, and/or U.S. patent application Ser. No. 13/437,645.

Figure 24:
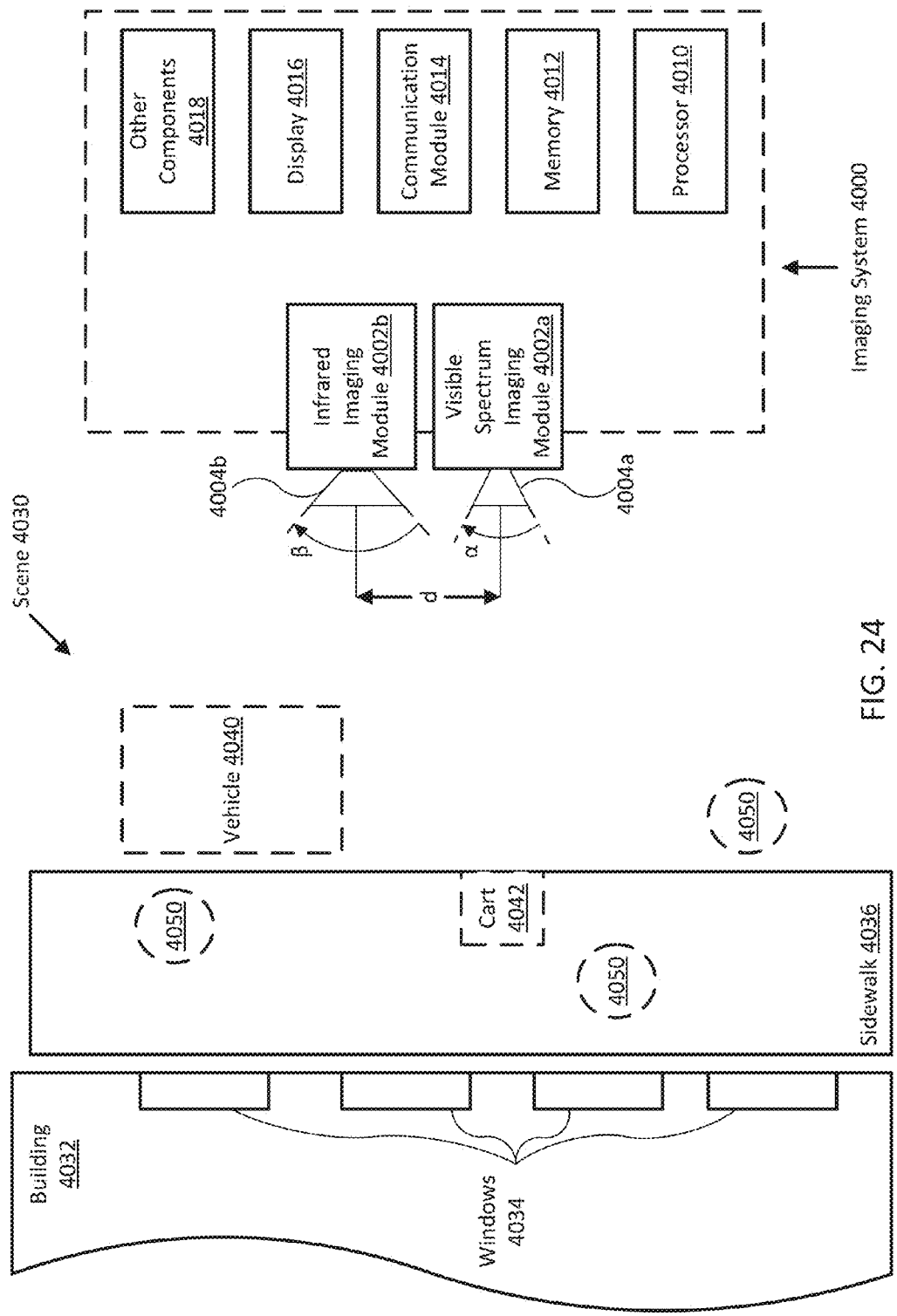
FIG. 24 illustrates a block diagram of an imaging system adapted to image a scene in accordance with an embodiment of the disclosure.

Referring now to FIG. 24, FIG. 24 shows a block diagram of imaging system 4000 adapted to image scene 4030 in accordance with an embodiment of the disclosure. System 4000 may include one or more imaging modules, such as visible spectrum imaging module 4002a and infrared imaging module 4002b, processor 4010, memory 4012, communication module 4014, display 4016, and other components 4018. Where appropriate, elements of system 4000 may be implemented in the same or similar manner as other devices and systems described herein and may be configured to perform various NUC processes and other processes as described herein.

As shown in FIG. 24, scene 4030 (e.g., illustrated as a top plan view) may include various predominately stationary elements, such as building 4032, windows 4034, and sidewalk 4036, and may also include various predominately transitory elements, such as vehicle 4040, cart 4042, and pedestrians 4050. Building 4032, windows 4034, sidewalk 4036, vehicle 4040, cart 4042, and pedestrians 4050 may be imaged by visible spectrum imaging module 4002a, for example, whenever scene 4030 is visibly illuminated by ambient light (e.g., daylight) or by an artificial visible spectrum light source, for example, as long as those elements of scene 4030 are not otherwise obscured by smoke, fog, or other environmental conditions. Building 4032, windows 4034, sidewalk 4036, vehicle 4040, cart 4042, and pedestrians 4050 may be imaged by infrared imaging module 4002b to provide real-time imaging and/or low-light imaging of scene 4030 when scene 4030 is not visibly illuminated (e.g., by visible spectrum light), for example.

In some embodiments, imaging system 4000 can be configured to combine visible spectrum images from visible spectrum imaging module 4002a captured at a first time (e.g., when scene 4030 is visibly illuminated), for example, with infrared images from infrared imaging module 4002b captured at a second time (e.g., when scene 4030 is not visibly illuminated), for instance, in order to generate combined images including radiometric data and/or other infrared characteristics corresponding to scene 4030 but with significantly more object detail and/or contrast than typically provided by the infrared or visible spectrum images alone. In other embodiments, the combined images can include radiometric data corresponding to one or more objects within scene 4030, for example, and visible spectrum characteristics, such as a visible spectrum color of the objects (e.g., for predominantly stationary objects), for example. In some embodiments, both the infrared images and the combined images can be substantially real time images or video of scene 4030. In other embodiments, combined images of scene 4030 can be generated substantially later in time than when corresponding infrared and/or visible spectrum images have been captured, for example, using stored infrared and/or visible spectrum images and/or video. In still further embodiments, combined images may include visible spectrum images of scene 4030 captured before or after corresponding infrared images have been captured.

In each embodiment, visible spectrum images including predominately stationary elements of scene 4030, such as building 4032, windows 4034, and sidewalk 4036, can be processed to provide visible spectrum characteristics that, when combined with infrared images, allow easier recognition and/or interpretation of the combined images. In some embodiments, the easier recognition and/or interpretation extends to both the predominately stationary elements and one or more transitory elements (e.g., vehicle 4040, cart 4042, and pedestrians 4050) in scene 4030.

For example, a visible spectrum image of building 4032, windows 4034, and sidewalk 4036 captured by visible spectrum imaging module 4002a at a first time while scene 4030 is visibly illuminated can be combined with a relatively low resolution and/or real time infrared image captured by infrared imaging module 4002b at a second time (e.g., while objects within scene 4030 are obscured in the visible spectrum or not visibly illuminated) to generate a combined image with sufficient radiometric data, detail, and contrast to allow a user viewing the combined image (e.g., on display 4016) to more easily detect and/or recognize each of vehicle 4040, cart 4042, and pedestrians 4050.

In further embodiments, such a combined image may allow a user or a monitoring system to more easily detect and/or recognize pedestrian 4050 situated behind vehicle 4040 with respect to infrared imaging module 4002b. For example, visible spectrum characteristics derived from a prior visible spectrum image of scene 4030 may be used to add sufficient contrast and detail to a combined image including a radiometric component (e.g., radiometric data) of a real time infrared image so that a user and/or monitoring system can detect and recognize at least one of a spatial distinction, a temperature difference, and a gas-type difference, between one or more of an exhalation of pedestrian 4050, an exhaust fume from vehicle 4040, and an ambient temperature of building 4032, windows 4034, or sidewalk 4036.

Visible spectrum imaging module 4002a may be implemented as any type of visible spectrum camera or imaging device capable of imaging at least a portion of scene 4030 in the visible spectrum. In some embodiments, visible spectrum imaging module 4002a may be a small form factor visible spectrum camera or imaging device, and visible spectrum imaging module 4002a may be implemented similarly to various embodiments of an infrared imaging module disclosed herein, but with one or more sensors adapted to capture radiation in the visible spectrum. For example, in some embodiments, imaging module 4002a may be implemented with a charge-coupled device (CCD) sensor, an electron multiplying CCD (EMCCD) sensor, a complementary metal-oxide-semiconductor (CMOS) sensor, a scientific CMOS (sCMOS) sensor, or other sensors.

Visible spectrum imaging module 4002a may include an FPA of visible spectrum sensors, for example, and may be configured to capture, process, and/or manage visible spectrum images of scene 4030. Visible spectrum imaging module 4002a may be configured to store and/or transmit captured visible spectrum images according to a variety of different color spaces/formats, such as YCbCr, RGB, and YUV, for example, and individual visible spectrum images may be color corrected and/or calibrated according to their designated color space and/or particular characteristics of visible spectrum imaging module 4002a.

Figure 35:
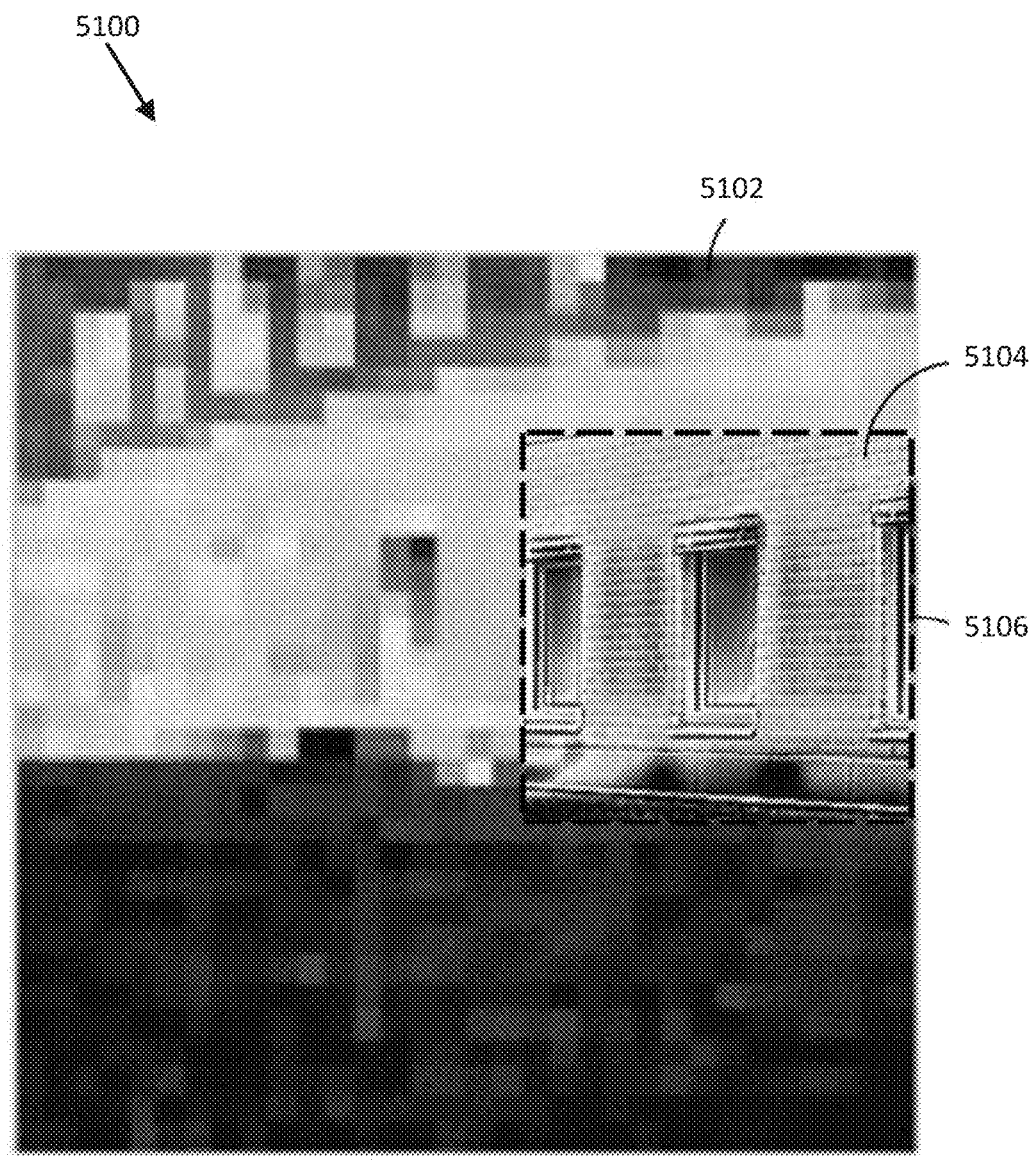
FIG. 35 illustrates a combined image generated in accordance with an embodiment of the disclosure.

In some embodiments, infrared imaging module 4002b may be a small form factor infrared camera or imaging device implemented in accordance with various embodiments disclosed herein. For example, infrared imaging module 4002b may include an FPA implemented in accordance with various embodiments disclosed herein or otherwise where appropriate. Infrared imaging module 4002b may be configured to capture, process, and/or manage infrared images, including thermal images, of at least portions of scene 4030. For example, FIG. 29 illustrates an unprocessed infrared image 4500 captured by an infrared imaging module in accordance with an embodiment of the disclosure. FIG. 35 illustrates a picture-in-picture combined image 5100 including a low resolution infrared image 5102 of a scene captured by an infrared imaging module in accordance with another embodiment of the disclosure.

Infrared imaging module 4002b may be configured to store and/or transmit captured infrared images according to a variety of different color spaces/formats, such as YCbCr, RGB, and YUV, for example, where radiometric data may be encoded into one or more components of a specified color space/format. In some embodiments, a common color space may be used for storing and/or transmitting infrared images and visible spectrum images.

Imaging modules 4002a-b may be mounted so that at least a portion of scene 4030 is within a shared field of view (FOV) of imaging modules 4002a-b. In various embodiments, imaging modules 4002a-b may include respective optical elements 4004a-b (e.g., visible spectrum and/or infrared transmissive lenses, prisms, reflective mirrors, fiber optics) that guide visible spectrum and/or infrared radiation from scene 4030 to sensors (e.g., FPAs) of imaging modules 4002a-b. Such optical elements may be used when mounting an imaging module at a particular FOV-defined location is otherwise difficult or impossible. For example, a flexible fiber-optic cable may be used to route visible spectrum and/or infrared radiation from within a sealed building compartment, such as a bank vault or an air-handling vent, to an imaging module mounted outside the sealed building compartment. Such optical elements may also be used to suitably define or alter an FOV of an imaging module. A switchable FOV (e.g., selectable by a corresponding imaging module and or processor 4010) may optionally be provided to provide alternating far-away and close-up views of a portion scene 4030, for example, or to provide focused and de-focused views of scene 4030.

In some embodiments, one or more of visible spectrum imaging module 4002a and/or infrared imaging module 4002b may be configured to be panned, tilted, and/or zoomed to view the surrounding environment in any desired direction (e.g., any desired portion of scene 4030 and/or other portions of the environment). For example, in some embodiments, of visible spectrum imaging module 4002a and/or infrared imaging module 4002b may be pan-tilt-zoom (PTZ) cameras that may be remotely controlled, for example, from appropriate components of imaging system 4000.

In some embodiments, it is contemplated that at least one of imaging modules 4002a/4002b may capture an image of a relatively large portion of scene 4030, and at least another one of imaging modules 4002a/4002b may subsequently capture another image of a smaller subset of the scene 4030 (e.g., to provide an image of an area of interest of scene 4030). For example, it is contemplated that a visible spectrum or infrared image of a large portion of scene 4030 may be captured, and that an infrared or visible spectrum image of a subset of scene 4030 may be subsequently captured and overlaid, blended, and/or otherwise combined with the previous image to permit a user to selectively view visible spectrum and/or infrared image portions of the subset of scene 4030 as may be desired.

As illustrated by the embodiment of system 4000 shown in FIG. 24, imaging modules 4002a-b may be implemented such that an optical axis of visible spectrum imaging module 4002a is parallel to and a distance "d" from an optical axis of infrared imaging module 4002b. Furthermore, the imaging modules 4002a and 4002b may have differing FOVs, designated in FIG. 24 by respective angles $\alpha$ and $\beta$, which may be different angles (e.g., as illustrated in FIG. 24) or substantially the same. In such embodiments, one or more of imaging modules 4002a-b and/or processor 4010 may be configured to correct for differing FOVs and/or parallax resulting from non-zero "d" and/or ($\alpha$-$\beta$) when generating combined images, as described herein.

In some embodiments, system 4000 may include multiple imaging modules (e.g., two or more) of both types, where the group of imaging modules may have a variety of non-parallel optical axes and differing FOVs of scene 4030. In such embodiments, one or more of the constituent imaging modules and/or processor 4010 may be configured to correct for all or some subset of non-aligned optics when generating combined images including visible spectrum characteristics of scene 4030 derived from captured visible spectrum images and infrared characteristics of scene 4030 derived from captured infrared images (e.g., a radiometric component of the infrared images).

In other embodiments, the imaging modules may be implemented to share a single selectable set of optical elements (e.g., with selectable visible spectrum and infrared optical elements, depending on a type of image being captured), for example, so that the imaging modules have the same field of view and the same optical axis. In such embodiments, FOV and/or parallax corrections may not be performed.

Infrared images captured, stored and/or transmitted by imaging module 4002b may be stored, transmitted and/or processed by one or more of imaging module 4002b and processor 4010 in a variety of color spaces, for example, such as YCbCr, RGB, YUV, and other known or proprietary color spaces. In some embodiments, radiometric data corresponding to a measurement of infrared emissions impinging upon an infrared sensor or FPA of infrared sensors may be encoded into one or more components of an infrared image. For example, where a designated color space for an infrared image is YCbCr, radiometric data captured by infrared imaging module 4002b may be encoded into a luminosity component (e.g., Y) of the infrared image. In a related embodiment, a corresponding chrominance component (e.g., Cr and Cb) of the infrared image may be eliminated, truncated, and/or unused, for example, or may be set to a particular known value, such as grey or a combination of one or more primary colors.

In other embodiments, radiometric data may be encoded into a chrominance component (e.g., Cr and Cb) of a corresponding infrared image while a luminance component (e.g., Y) is set to a particular known value, such as a mid-level value. For example, a range of radiometric data may be encoded into a range of a single primary color, for instance, or may be encoded into a range of a combination of primary colors. In one embodiment, encoding radiometric data into one or more primary colors may include applying a pseudo-color palette to the radiometric component of an infrared image.

In further embodiments, radiometric data may be encoded into both luminance and chrominance components of an infrared image (e.g., Y and Cr and Cb). For example, infrared imaging module 4002b may be adapted to sense infrared radiation across a particular band of infrared frequencies. A luminance component may include radiometric data corresponding to intensity of infrared radiation, and a chrominance component may include radiometric data corresponding to what frequency of infrared radiation is being sensed (e.g., according to a pseudo-color palette). In such an embodiment, a radiometric component of the resulting infrared image may include both luminance and chrominance components of the infrared image.

In still further embodiments, infrared images captured by infrared imaging module 4002b may be stored according to a module-specific color space, for example, and be stored as raw radiometric data (e.g., uncompressed) for each pixel of infrared imaging module 4002b. In some embodiments, a radiometric component of the resulting infrared image may include the raw radiometric data, and one or more of imaging modules 4002a-b and/or processor 4010 may be configured process the raw radiometric data to generate combined images including infrared characteristics of scene 4030.

Infrared images captured, processed, and otherwise managed by infrared imaging module 4002b may be radiometrically normalized infrared images (e.g., thermal images). Pixels that make up a captured image may contain calibrated thermal data (e.g., absolute temperatures). As discussed above in connection with infrared imaging module 100 of FIG. 1, infrared imaging module 4002b and/or associated components may be calibrated using appropriate techniques so that images captured by the infrared imaging module are properly calibrated infrared images. In some embodiments, appropriate calibration processes may be performed periodically by infrared imaging module 4002b and/or processor 4010 so that the infrared imaging module and its captured infrared images maintain accurate calibration. In other embodiments, infrared imaging module 4002b and/or processor 4010 may be configured to perform other processes to emphasize a desired range or interval of radiometric data, for example, and allocate a dynamic range of one or more components of a resulting infrared image according to the desired range of radiometric data. Thus, a radiometric component of an infrared image may include calibrated radiometric data, un-calibrated radiometric data, and/or adjusted radiometric data.

Processor 4010 may be implemented as any appropriate processing device described herein. In some embodiments, processor 4010 may be part of or implemented with other conventional processors and control electronics of a monitoring system monitoring scene 4030. For example, a monitoring system for scene 4030 may include one or more processors or control electronics for controlling alarms, processing image or video data, and/or notifying various users, any of which may be used to implement all or part of processor 4010. In other embodiments, processor 4010 may interface and communicate with such other control electronics and processors as well as any monitoring system components associated with such processors. In some embodiments, processor 4010 may be configured to control, monitor, and or communicate with lights, animated signs, or sirens in or near scene 4030, for example, and in some embodiments, do so according to a schedule set by a user, a technician, or by default at a factory. Such schedule may determine whether a particular notification or type of notification is provided to a user, for example, or to determine when one or more monitoring system components are enabled.

Processor 4010 may be configured to interface and communicate with other components of system 4000 to perform methods and processes described herein, including to provide control signals to one or more components of a monitoring system monitoring scene 4030. Processor 4010 may be configured to receive visible spectrum and infrared (e.g., thermal) images of at least a portion of scene 4030 captured by imaging modules 4002a-b at first and second times (e.g., while visibly illuminated and while not visibly illuminated), perform image processing operations as further described herein, and generate combined images from the captured images to, for example, provide high resolution, high contrast, or targeted contrast combined images of portions of and/or objects in scene 4030. Processor 4010 may also be configured to compile, analyze, or otherwise process visible spectrum images, infrared images, and context data (e.g., time, date, environmental conditions) to generate monitoring information about scene 4030, such as monitoring information about detected objects in scene 4030.

For example, processor 4010 may determine, from combined images including radiometric data from calibrated infrared images provided by infrared imaging module 4002b, aggregate temperature of an object or portion of an object in scene 4030. Processor 4010 may generate monitoring information that includes, for example, a temperature reading based on the determined temperature. Processor 4010 may further determine whether the temperature of an object is within a typical operating temperature range, and generate monitoring information that includes a notification or alarm indicating the temperature is outside a typical range.

In another example, processor 4010 may perform various image processing operations and image analytics on visible spectrum, infrared, and/or combined images of an object in scene 4030 to obtain temperature distribution and variance profiles of the object. Processor 4010 may correlate and/or match the obtained profiles to those of abnormal conditions to detect, for example, an overflowing manhole cover, an abundance of methane or other gas build-up near an object in scene 4030, a leaking fire hydrant, a running vehicle (e.g., exhaust fumes), or other conditions of scene 4030.

In yet another example, processor 4010 may perform various image processing operations and image analytics on visible spectrum, infrared, and/or combined images of scene 4030 to detect transitory objects entering scene 4030. Based on the detection, processor 4010 may generate monitoring information that includes an alarm or other visual or audible notifications that indicate arrival of a transitory object.

In some embodiments, processor 4010 may be configured to convert visible spectrum, infrared, and/or combined images of portions of power system 4030 into user-viewable images (e.g., thermograms) using appropriate methods and algorithms. For example, thermographic data contained in infrared and/or combined images may be converted into gray-scaled or color-scaled pixels to construct images that can be viewed on a display. Such conversion may include adjusting a dynamic range of one or more components of the combined images to match a dynamic range of display 4016, for example, to emphasize a particular radiometric interval, and/or to increase a perceived contrast of user-viewable images. User-viewable images may optionally include a legend or scale that indicates the approximate temperature of a corresponding pixel color and/or intensity. Such user-viewable images, if presented on a display (e.g., display 4016), may be used to confirm or better understand conditions of scene 4030 detected by system 4000. Monitoring information generated by processor 4010 may include such user-viewable images.

Memory 4012 may include one or more memory devices (e.g., memory components) to store data and information, including visible spectrum, infrared, and/or combined images, context data, and monitoring information. The memory devices may include various types of memory for image and other information storage including volatile and non-volatile memory devices, such as RAM (Random Access Memory), ROM (Read-Only Memory), EEPROM (Electrically-Erasable Read-Only Memory), flash memory, a disk drive, and other types of memory described herein. In one embodiment, images, context data, and monitoring information stored in the memory devices may be retrieved (e.g., by a user) for purposes of reviewing and further diagnosing a detected condition of scene 4030 or refining a method of generating combined images from captured visible spectrum and infrared images. In another embodiment, memory 4012 may include a portable memory device that can be removed from system 4000 and used to convey stored data to other systems, including monitoring systems, for further processing and inspection. In some embodiments, processor 4010 may be configured to execute software instructions stored on memory 4012 and/or machine readable medium 193 to perform various methods, processes, or operations in the manner described herein.

Display 4016 may be configured to present, indicate, or otherwise convey combined images and/or monitoring information generated by processor 4010. In one embodiment, display 4016 may be implemented with various lighted icons, symbols, indicators, and/or gauges which may be similar to conventional indicators, gauges, and warning lights of a conventional monitoring system. The lighted icons, symbols, and/or indicators may indicate one or more notifications or alarms associated with the combined images and/or monitoring information. The lighted icons, symbols, or indicators may also be complemented with an alphanumeric display panel (e.g., a segmented LED panel) to display letters and numbers representing other monitoring information, such as a temperature reading, a description or classification of detected conditions, etc.

In other embodiments, display 4016 may be implemented with an electronic display screen, such as a liquid crystal display (LCD), a cathode ray tube (CRT), or various other types of generally known video displays and monitors, including touch-sensitive displays. Display 4016 may be suitable for presenting user-viewable visible spectrum, infrared, and/or combined images retrieved and/or generated by processor 4010 from images captured by imaging modules 4002a-b. It is contemplated that conventional monitoring system display screens may be utilized as display 4016.

Communication module 4014 may be configured to facilitate communication and interfacing between various components of system 4000. For example, elements such as imaging modules 4002a-b, display 4016, and/or other components 4018 may transmit and receive data to and from processor 4010 through communication module 4014, which may manage wired and/or wireless connections (e.g., through proprietary RF links, proprietary infrared links, and/or standard wireless communication protocols such as IEEE 802.11 WiFi standards and Bluetooth™) between the various components. Such wireless connections may allow imaging modules 4002a-b to be mounted where it would not be convenient to provide wired connections, for example.

Communication module 4014 may be further configured to allow components of system 4000 to communicate and interface with other components of a monitoring system monitoring scene 4030. For example, processor 4010 may communicate, via communication module 4014, with a motion detector, smoke detector, and other existing sensors and electronic components. In this regard, communication module 4014 may support various interfaces, protocols, and standards for networking, such as the controller area network (CAN) bus, the local interconnect network (LIN) bus, the media oriented systems transport (MOST) network, or the ISO 11738 (or ISO bus) standard. Furthermore, communication module 4014 may be configured to send control signals generated by processor 4010 using these interfaces and protocols.

In some embodiments, system 4000 may include a number of communication modules 4014 adapted for various applications of system 4000 with respect to various types of scenes. In other embodiments, communication module 4014 may be integrated into or implemented as part of various other components of system 4000. For example, imaging modules 4002a-b, processor 4010, and display 4016 may each comprise a subcomponent that may be configured to perform the operations of communication module 4014, and may communicate with one another via wired and/or wireless connections without a separate communication module 4014.

Other components 4018 may include, in some embodiments, other sensors such as a temperature sensor (e.g., a thermocouple, an infrared thermometer), a moisture sensor, an electrical sensor (e.g., a volt/current/resistance meter), a pressure sensor (e.g., a barometer), and/or a visible spectrum light meter. Data from sensors such as a temperature, moisture, pressure, or light sensor may be utilized by processor 4010 to detect and potentially compensate for environmental conditions (e.g., fog, smoke, or other low-light condition), and thereby obtain more accurate or more easily interpretable combined images and derived conditions of scene 4030.

Other components 4018 may also include any other device as may be beneficial for various applications of system 4000. In some embodiments, other components 4018 may include a chime, a speaker with associated circuitry for generating a tone, or other devices that may be used to sound an audible alarm or notification based on combined images generated by processor 4010. In further embodiments, other components 4018 may include a user interface to accept user input of, for example, a desired method of generating combined images, a target contrast or corresponding radiometric interval and/or dynamic range, a notification setting of system 4000, external sensor data, or context information.

In various embodiments, one or more components of system 4000 may be combined and/or implemented or not, depending on application requirements. For example, processor 4010 may be combined with any of imaging modules 4002a-b, memory 4012, display 4016, and/or communication module 4014. In another example, processor 4010 may be combined with any of imaging modules 4002a-b with only certain operations of processor 4010 performed by circuitry (e.g., a processor, logic device, microprocessor, microcontroller, etc.) within any of the infrared imaging modules.

Thus, one or more components of system 4000 may be mounted in view of scene 4030 to provide real-time and/or enhanced infrared monitoring of scene 4030 in low light situations. For example, system 4000 may be used to detect transitory objects, liquid leaks, gas build up, and abnormal temperatures in scene 4030.

Figure 25:
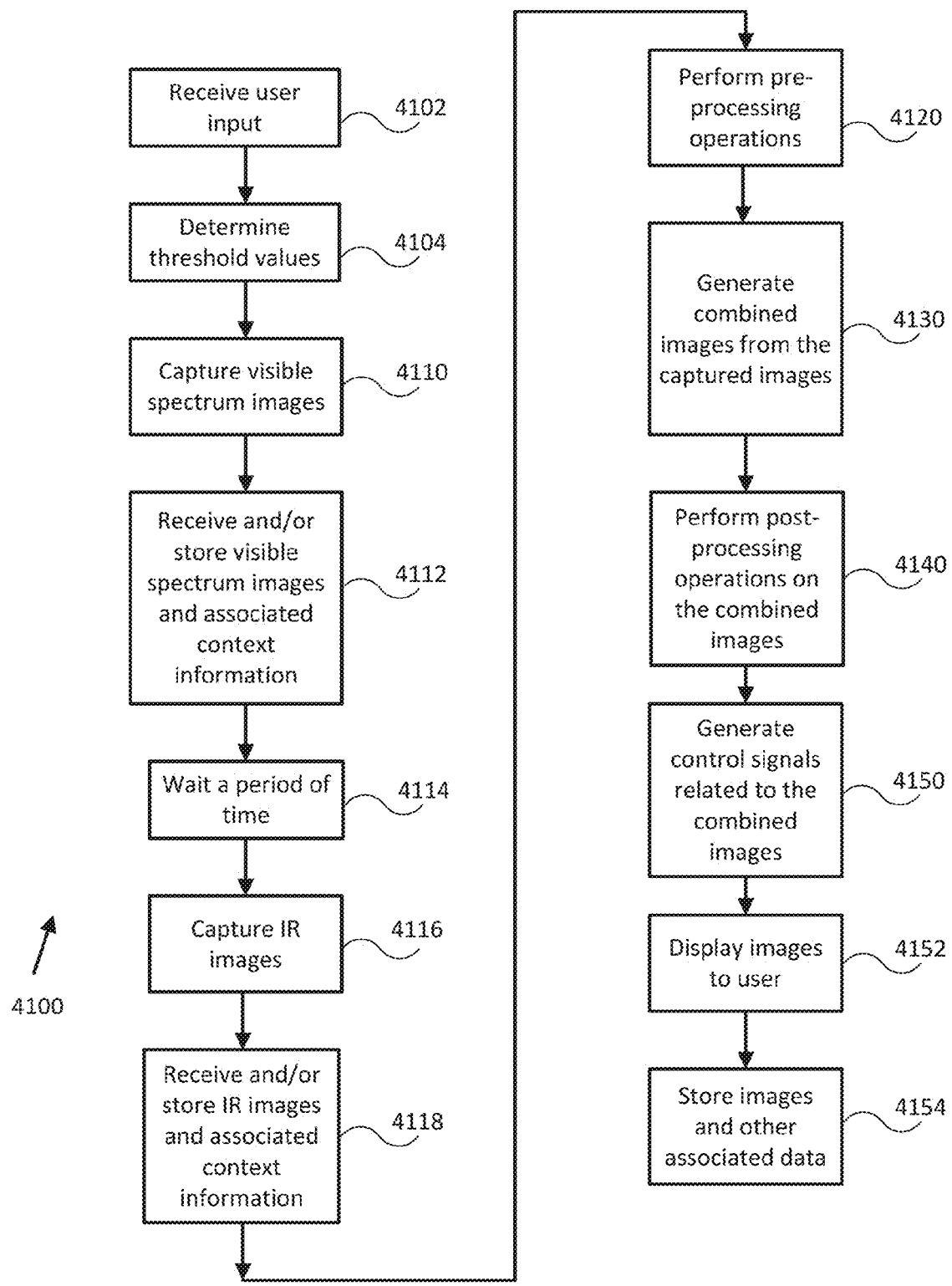
FIG. 25 illustrates a flow diagram of various operations to enhance infrared imaging of a scene in accordance with an embodiment of the disclosure.

Turning to FIG. 25, FIG. 25 illustrates a flowchart of a process 4100 to enhance infrared imaging of a scene in accordance with an embodiment of the disclosure. For example, one or more portions of process 4100 may be performed by processor 4010 and/or each of imaging modules 4002a-b of system 4000 and utilizing any of optical elements 4004a-b, memory 4012, communication module 4014, display 4016, or other components 4018, where each of imaging modules 4002a-b and/or optical elements 40104a-b may be mounted in view of at least a portion of scene 4030. In some embodiments, some elements of system 4000 may be mounted in a distributed manner (e.g., be placed in different areas inside or outside of scene 4030) and be coupled wirelessly to each other using one or more communication modules 4014. In further embodiments, imaging modules 4002a-b may be situated out of view of scene 4030 but may receive views of scene 4030 through optical elements 40104a-b.

It should be appreciated that system 4000 and scene 4030 are identified only for purposes of giving examples and that any other suitable system may include one or more components mounted in view of any other type of scene and perform all or part of process 4100. It should also be appreciated that any step, sub-step, sub-process, or block of process 4100 may be performed in an order or arrangement different from the embodiment illustrated by FIG. 25. For example, although process 4100 describes visible spectrum images being captured before infrared images are captured, in other embodiments, visible spectrum images may be captured after infrared images are captured.

In some embodiments, any portion of process 4100 may be implemented in a loop so as to continuously operate on a series of infrared and/or visible spectrum images, such as a video of scene 4030. In other embodiments, process 4100 may be implemented in a partial feedback loop including display of intermediary processing (e.g., after or while receiving infrared and/or visible spectrum images, performing preprocessing operations, generating combined images, performing post processing operations, or performing other processing of process 4100) to a user, for example, and/or including receiving user input, such as user input directed to any intermediary processing step.

At block 4102, system 4000 may receive (e.g., accept) user input. For example, display 4016 and/or other components 4018 may include a user input device, such as a touch-sensitive screen, keyboard, mouse, dial, or joystick. Processor 4010 of system 4000 may be configured to prompt for user input, using display 4016 or an audible tone, for example, and receive the user input from a user input device (e.g., one or more of other components 4018) to determine a method of generating combined images, to select a radiometric interval, to input context and/or sensor data, to select a color or pseudo-color palette for one or more image types, to select or refine a blending parameter, to select or refine a control parameter, to select or refine threshold values, or to determine other operating parameters of system 4000, as described herein. For example, system 4000 may prompt a user to select a blending or a high contrast mode for generating combined images of scene 4030, and upon receiving user input, system 4000 may proceed with a selected mode.

System 4000 may be configured to receive user input at any point during process 4100. For example, embodiments of block 4102 may be placed before, after, or within any block of process 4100. In some embodiments, system 4000 may be configured to receive user input to select or refine a blending parameter, a control parameter, and/or other operating parameter, for example, while system 4000 is performing an embodiment of block 4130 (e.g., generating combined images) that includes a feedback loop. In such embodiments, the feedback loop may include displaying combined images to a user (e.g., using display 4016) while receiving user input selecting, refining, or adjusting a blending parameter and/or a method of generating combined images, for example. The user input may be used to generate new and/or adjusted combined images that are then displayed to a user for evaluation, for example (e.g., an embodiment of block 4152). In further embodiments, a feedback loop may include receiving additional user input to exit the feedback loop and continue with process 4100, for example, or to re-enter process 4100 at any other step, sub-step, sub-process, or block of process 4100.

In other embodiments, user input may be used to control a pan, tilt, or zoom feature of one or more of imaging modules 4002a-b. For example, a feedback loop may include displaying to a user a first image of scene 4030 captured by one of imaging modules 4002a-b according to a first perspective, receiving user input to pan, tilt, and/or zoom the other imaging module to a similar and/or further zoomed-in second perspective to highlight a portion-of-interest of scene 4030, and then displaying a second image captured by the other imaging module and/or a combined image including aspects of the first and second perspectives, to the user. In some embodiments, the combined image may be an overlay and/or a blending of the second image with the first image, generated according to processing operations described herein.

FIG. 35 illustrates a combined image 5100 that can be generated according to such a feedback loop. For example, infrared image 5102 may be captured according to a first perspective by infrared imaging module 4002b and displayed to a user. System 4000 may then receive user input to pan, tilt, and/or zoom visible spectrum imaging module 4002a to a second perspective (e.g., illustrated by portion 5104) and capture a visible spectrum image according to the second perspective. System 4000 may then display combined image 5100 including aspects of the first perspective (e.g., infrared image 5102) and aspects of the second perspective (e.g., the visible spectrum image corresponding to high spatial frequency content 5106, and/or high spatial frequency content 5106) to the user. Thus, embodiments of system 4000 allow a user and/or monitoring system to image/monitor different perspectives of scene 4030 at the same time or at different times and then adjust one or more perspectives of the imaging modules to image/monitor portions-of-interest of scene 1430.

At block 4104, system 4000 may determine one or more threshold values for use in process 4100. For example, processor 4010 and/or imaging modules 4002a-b may be configured to determine threshold values from user input received in block 4102. In one embodiment, processor 4010 may be configured to determine threshold values from images and/or image data captured by one or more modules of system 4000. In various embodiments, processor 4010 may be configured to use such threshold values to set, adjust, or refine one or more control parameters, blending parameters, or other operating parameters as described herein. For example, threshold values may be associated with one or more processing operations, such as blocks 4120-4140 of FIG. 25, blocks 4232-4238 of FIG. 26, and blocks 4320-4326 of FIG. 27, for example.

In one embodiment, threshold values may relate to a method for generating combined images, as described more fully below. Such threshold values may be used to determine a method for generating combined images, a blending parameter for generating blended image data, a limit or gain associated with de-noising an image, one or more control parameters for determining relative contributions to a combined image, or to determine other aspects of generating combined images as described herein. In some embodiments, threshold values may be used to determine aspects of processing steps on a pixel-by-pixel basis, for example, or for regions of visible spectrum, infrared, and/or combined images. In one embodiment, threshold values may be used to select default parameters (e.g., blending parameters, control parameters, and other operating parameters) for use with one or more processing operations described herein.

In similar fashion to block 4102, system 4000 may be configured to determine threshold values at any point during process 4100. For example, embodiments of block 4104 may be placed before, after, or within any block of process 4100, including embodiments with an included feedback loop. In such embodiments, the feedback loop may include displaying combined images to a user (e.g., using display 4016) while determining threshold values associated with selecting, refining, or adjusting a blending parameter, a control parameter, a method of generating combined images, and/or other operating parameters, for example. The determined threshold values may be used to generate new and/or adjusted combined images that are then displayed to a user for evaluation, for example (e.g., an embodiment of block 4152).

At block 4110, system 4000 may capture one or more visible spectrum images. For example, processor 4010 and/or visible spectrum imaging module 4002a may be configured to capture a visible spectrum image of scene 4030 at a first time, such as while scene 4030 is visibly illuminated. In one embodiment, processor 4010, visible spectrum imaging module 4002a, and/or other components 4018 may be configured to detect context data, such as time of day and/or lighting or environmental conditions, and determine an appropriate first time by determining that there is sufficient ambient light and environmental clarity to capture a visible spectrum image with enough detail and/or contrast to discern objects or to generate a combined image with sufficient detail and/or contrast for a particular application of system 4000, such as intrusion monitoring or fire safety monitoring. In other embodiments, processor 4010 and/or visible spectrum imaging module 4002a may be configured to capture visible spectrum images according to user input and/or a schedule. Visible spectrum imaging module 4002a may be configured to capture visible images in a variety of color spaces/formats, including a raw or uncompressed format.

At block 4112, system 4000 may receive and/or store visible spectrum images and associated context information. For example, processor 4010 and/or visible spectrum imaging module 4002a may be configured to receive visible spectrum images of scene 4030 from a sensor portion of visible spectrum imaging module 4002a, to receive context data from other components 4018, and then to store the visible spectrum images with the context data in a memory portion of visible spectrum imaging module 4002a and/or memory 4012.

Context data may include various properties and ambient conditions associated with an image of scene 4030, such as a timestamp, an ambient temperature, an ambient barometric pressure, a detection of motion in scene 4030, an orientation of one or more of imaging modules 4002a-b, a configuration of one or more of optical elements 4004a-b, the time elapsed since imaging has begun, and/or the identification of objects within scene 4030 and their coordinates in one or more of the visible spectrum or infrared images.

Context data may guide how an image may be processed, analyzed, and/or used. For example, context data may reveal that an image has been taken while an ambient light level is high. Such information may indicate that a captured visible spectrum image may need additional exposure correction pre-processing. In this and various other ways, context data may be utilized (e.g., by processor 4010) to determine an appropriate application of an associated image. Context data may also supply input parameters for performing image analytics and processing as further described in detail below. In different embodiments, context data may be collected, processed, or otherwise managed at a processor (e.g., processor 4010) directly without being stored at a separate memory.

Visible spectrum images may be stored in a variety of color spaces/formats that may or may not be the color space/format of the received visible spectrum images. For example, processor 4010 may be configured to receive visible spectrum images from visible spectrum imaging module 4002a in an RGB color space, then convert and save the visible spectrum images in a YCbCr color space. In other embodiments, processor 4010 and/or visible spectrum imaging module 4002a may be configured to perform other image processing on received visible spectrum images prior to storing the images, such as scaling, gain correction, color space matching, and other preprocessing operations described herein with respect to block 4120.

At block 4114, system 4000 may optionally be configured to wait a period of time. For example, processor 4010 may be configured to wait until scene 4030 is not visibly illuminated (e.g., in the visible spectrum), or until scene 4030 is obscured in the visible spectrum by environmental conditions, for instance, before proceeding with process 4100. In other embodiments, processor 4010 may be configured to wait a scheduled time period or until a scheduled time before proceeding with process 4100. The time and/or time period may be adjustable depending on ambient light levels and/or environmental conditions, for example. In some embodiments, the period of time may be a substantial period of time, such as twelve hours, days, weeks, or other time period that is relatively long compared to a typical time for motion of objects (e.g., vehicles, pedestrians) within scene 4030.

At block 4116, system 4000 may capture one or more infrared images. For example, processor 4010 and/or infrared imaging module 4002b may be configured to capture an infrared image of scene 4030 at a second time, such as while scene 4030 is not visibly illuminated, or after a particular time period enforced in block 4114. Examples of unprocessed infrared images captured by an infrared imaging module are provided in FIGS. 17 and 21.

In some embodiments, the second time may be substantially different from the first time referenced in block 4110, relative to the time typically needed for a transient object to enter and leave scene 4030, for example. Processor 4010 and/or infrared imaging module 4002b may be configured to detect context data, such as time, date, and lighting conditions, and determine an appropriate second time by determining that ambient light levels are too low to capture a visible spectrum image with sufficient detail and/or contrast to discern objects in scene 4030 according to a particular application of system 4000. In some embodiments, processor 4010 and/or infrared imaging module 4002b may be configured to determine an appropriate second time by analyzing one or more visible spectrum and/or infrared images captured by imaging modules 4002a-b. In other embodiments, processor 4010 and/or infrared imaging module 4002b may be configured to capture infrared images according to user input and/or a schedule. Infrared imaging module 4002b may be configured to capture infrared images in a variety of color spaces/formats, including a raw or uncompressed format. Such images may include radiometric data encoded into a radiometric component of the infrared images.

At block 4118, system 4000 may receive and/or store infrared images and associated context information. For example, processor 4010 and/or infrared imaging module 4002b may be configured to receive infrared images of scene 4030 from a sensor portion of infrared imaging module 4002a, to receive context data from other components 4018, and then to store the infrared images with the context data in a memory portion of infrared imaging module 4002b and/or memory 4012. Context data may include various properties and ambient conditions associated with an image, for example, and may guide how an image may be processed, analyzed, and/or used.

Infrared images may be stored in a variety of color spaces/formats that may or may not be the color space/format of the received infrared images. For example, processor 4010 may be configured to receive infrared images from infrared imaging module 4002b in a raw radiometric data format, then convert and save the infrared images in a YCbCr color space. In some embodiments, radiometric data may be encoded entirely into a luminance (e.g., Y) component, a chrominance (e.g., Cr and Cb) component, or both the luminance and chrominance components of the infrared images, for example. In other embodiments, processor 4010 and/or infrared imaging module 4002b may be configured to perform other image processing on received infrared images prior to storing the images, such as scaling, gain correction, color space matching, and other preprocessing operations described herein with respect to block 4120.

At block 4120, system 4000 may perform a variety of preprocessing operations. For example, one or more of imaging modules 4002a-b and/or processor 4010 may be configured to perform one or more preprocessing operations on visible spectrum and/or infrared images of scene 4030 captured by imaging modules 4002a-b.

Preprocessing operations may include a variety of numerical, bit, and/or combinatorial operations performed on all or a portion of an image, such as on a component of an image, for example, or a selection of pixels of an image, or on a selection or series of images. In one embodiment, processing operations may include operations for correcting for differing FOVs and/or parallax resulting from imaging modules 4002a-b having different FOVs or non-co-linear optical axes. Such corrections may include image cropping, image morphing (e.g., mapping of pixel data to new positions in an image), spatial filtering, and resampling, for example. In another embodiment, a resolution of the visible spectrum and/or infrared images may be scaled to approximate or match a resolution of a corresponding image (e.g., visible spectrum to infrared, or infrared to visible spectrum), a portion of an image (e.g., for a picture-in-picture (PIP) effect), a resolution of display 4016, or a resolution specified by a user, monitoring system, or particular image processing step. Resolution scaling may include resampling (e.g., up-sampling or down-sampling) an image, for example, or may include spatial filtering and/or cropping an image.

In another embodiment, preprocessing operations may include temporal and/or spatial noise reduction operations, which may be performed on visible spectrum and/or infrared images, and which may include using a series of images, for example, provided by one or both of imaging modules 4002a-b. FIG. 30 illustrates an infrared image 4600 comprising the infrared image 4500 of FIG. 29 after low pass filtering to reduce noise in accordance with an embodiment of the disclosure. In a further embodiment, a NUC process may be performed on the captured and stored images to remove noise therein, for example, by using various NUC techniques disclosed herein. In one embodiment, context data associated with infrared images may be analyzed to select blurred infrared images (e.g., motion-based and/or focus-based blurred thermal images) to be used by a NUC process described herein. In another embodiment, other calibration processes for infrared images may be performed, such as profiling, training, baseline parameter construction, and other statistical analysis on one or more images provided by one or both of imaging modules 4002a-b. Calibration parameters resulting from such processes may be applied to images to correct, calibrate, or otherwise adjust radiometric data in infrared images, for example, or to correct color or intensity data of one or more visible spectrum images.

In further embodiments, preprocessing operations may include operations in which more general image characteristics may be normalized and/or corrected. In one embodiment, an image may be analyzed to determine a distribution of intensities for one or more components of the image, such as a distribution of red intensities in an RGB color space image, or a distribution of luminance intensities in a YUV or YCbCr color space image. An overall gain and/or offset may be determined for the image based on such a distribution, for example, and used to adjust the distribution so that it matches an expected (e.g., corrected) or desired (e.g., targeted) distribution. In other embodiments, an overall gain and/or offset may be determined so that a particular interval of the distribution utilizes more of the dynamic range of the particular component or components of the image.

In some embodiments, a dynamic range of a first image (e.g., a dynamic range of a radiometric component of an infrared image) may be normalized to the dynamic range of a second image (e.g., a dynamic range of a luminance component of a visible spectrum image). In other embodiments, a dynamic range of a particular image may be adjusted according to a histogram equalization method, a linear scaling method, or a combination of the two, for example, to distribute the dynamic range according to information contained in a particular image or selection of images.

In further embodiments, adjustments and/or normalizations of dynamic ranges or other aspects of images may be performed while retaining a calibration of a radiometric component of an infrared image. For example, a dynamic range of a non-radiometric component of an infrared image may be adjusted without adjusting the dynamic range of the radiometric component of infrared image. In other embodiments, the radiometric component of an infrared image may be adjusted to emphasize a particular thermal interval, for example, and the adjustment may be stored with the infrared image so that accurate temperature correspondence (e.g., a pseudo-color and/or intensity correspondence) may be presented to a user along with a user-viewable image corresponding to the thermal image and/or a combined image including infrared characteristics derived from the infrared image.

In other embodiments, preprocessing operations may include converting visible spectrum and/or infrared images to a different or common color space. For example, visible spectrum images and/or infrared images may be converted from an RGB color space, for example, to a common YCbCr color space. In other embodiments, images in a raw or uncompressed format may be converted to a common RGB or YCbCr color space. In some embodiments, a pseudo-color palette, such as a pseudo-color palette chosen by a user in block 4102, may be applied as part of the preprocessing operations performed in block 4120. As with the dynamic range adjustments, application of color palettes may be performed while retaining a calibration of a radiometric component of an infrared image, for example, or a color space calibration of a visible spectrum image.

In another embodiment, preprocessing operations may include decomposing images into various components. For example, an infrared image in a color space/format including a raw or uncompressed radiometric component may be converted into an infrared image in a YCbCr color space. The raw radiometric component may be encoded into a luminance (e.g., Y) component of the converted infrared image, for example, or into a chrominance (e.g., Cr and/or Cb) component of the converted infrared image, or into the luminance and chrominance components of the converted infrared image. In some embodiments, unused components may be discarded, for example, or set to a known value (e.g., black, white, grey, or a particular primary color). Visible spectrum images may also be converted and decomposed into constituent components, for example, in a similar fashion. The decomposed images may be stored in place of the original images, for example, and may include context data indicating all color space conversions and decompositions so as to potentially retain a radiometric and/or color space calibration of the original images.

More generally, preprocessed images may be stored in place of original images, for example, and may include context data indicating all applied preprocessing operations so as to potentially retain a radiometric and/or color space calibration of the original images.

At block 4130, system 4000 may generate one or more combined images from the captured and/or preprocessed images. For example, one or more of imaging modules 4002*a-b* and/or processor 4010 may be configured to generate combined images of scene 4030 from visible spectrum and infrared images captured by imaging modules 4002*a-b*. In one embodiment, the visible spectrum images may be captured prior to the infrared images. In an alternative embodiment, the infrared images may be captured prior to the visible spectrum images. Such combined images may serve to provide enhanced imagery as compared to imagery provided by the visible spectrum or infrared images alone.

Figure 26:
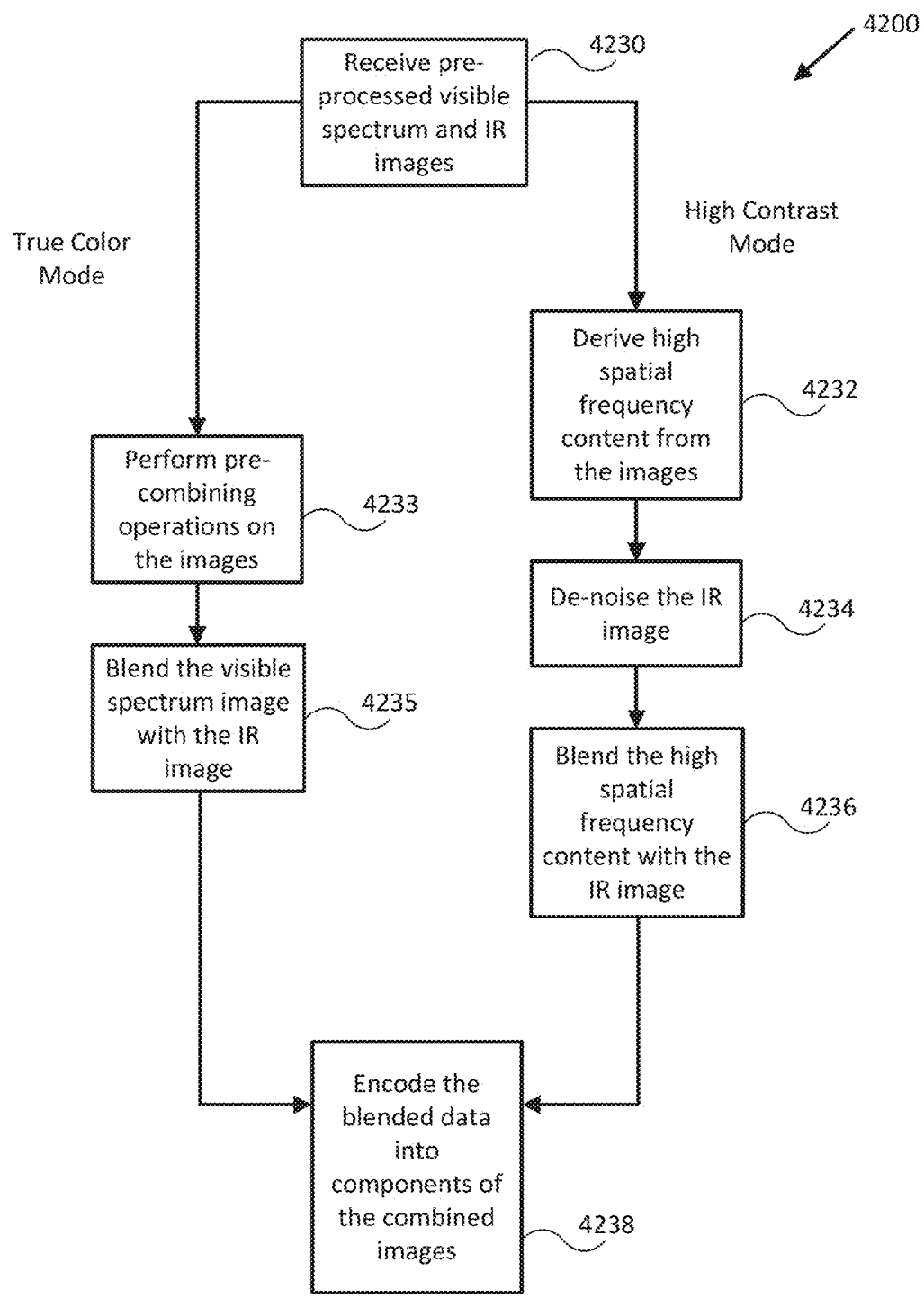
FIG. 26 illustrates a flow diagram of various operations to enhance infrared imaging of a scene in accordance with an embodiment of the disclosure.

In one embodiment, processor 4010 may be configured to generate combined images according to a true color mode, such as that described with respect to blocks 4233, 4235, and 4238 of process 4200 illustrated by the flowchart of FIG. 26. For example, a combined image may include a radiometric component of an infrared image of scene 4030 blended with a corresponding component of a visible spectrum image according to a blending parameter. In such embodiments, the remaining portions of the combined image may be derived from corresponding portions of the visible spectrum and/or infrared images of scene 4030.

In another embodiment, processor 4010 may be configured to generate combined images according to a high contrast mode, such as that described with respect to blocks 4233, 4234, 4236, and 4238 of process 4200 illustrated by the flowchart of FIG. 26. For example, a combined image may include a radiometric component of an infrared image and a blended component including infrared characteristics of scene 4030 blended with high spatial frequency content, derived from visible spectrum and/or infrared images, according to a blending parameter.

More generally, processor 4010 may be configured to generate combined images that increase or refine the information conveyed by either the visible spectrum or infrared images viewed by themselves. Combined images may be stored in memory 4012, for example, for subsequent post-processing and/or presentation to a user or a monitoring system, for instance, or may be used to generate control signals for one or more other components 4018.

At block 4140, system 4000 may perform a variety of post-processing operations on combined images. For example, one or more of imaging modules 4002*a-b* and/or processor 4010 may be configured to perform one or more post-processing operations on combined images generated from visible spectrum and infrared characteristics of scene 4030, for example, derived from images captured by imaging modules 4002*a-b*.

Similar to the preprocessing operations described with respect to block 4120, post-processing operations may include a variety of numerical, bit, and/or combinatorial operations performed on all or a portion of an image, such as on a component of an image, for example, or a selection of pixels of an image, or on a selection or series of images. For example, any of the dynamic range adjustment operations described above with respect to preprocessing operations performed on captured images may also be performed on one or more combined images. In one embodiment, a particular color-palette, such as a night or day-time palette, or a pseudo-color palette, may be applied to a combined image. For example, a particular color-palette may be designated by a user in block 4102, or may be determined by context or other data, such as a current time of day, a type of combined image, or a dynamic range of a combined image.

In other embodiments, post-processing operations may include adding high resolution noise to combined images in order to decrease an impression of smudges or other artifacts potentially present in the combined images. In one embodiment, the added noise may include high resolution temporal noise (e.g., "white" signal noise). In further embodiments, post-processing operations may include one or more noise reduction operations to reduce or eliminate noise or other non-physical artifacts introduced into the combined images by image processing, for example, such as aliasing, banding, dynamic range excursion, and numerical calculation-related bit-noise.

In some embodiments, post-processing operations may include color-weighted (e.g., chrominance-weighted) adjustments to luminance values of an image in order to ensure that areas with extensive color data are emphasized over areas without extensive color data. For example, where a radiometric component of an infrared image is encoded into a chrominance component of a combined image, in block 4130, for example, a luminance component of the combined image may be adjusted to increase the luminance of areas of the combined image with a high level of radiometric data. A high level of radiometric data may correspond to a high temperature or temperature gradient, for example, or an area of an image with a broad distribution of different intensity infrared emissions (e.g., as opposed to an area with a narrow or unitary distribution of intensity infrared emissions). Other normalized weighting schemes may be used to shift a luminance component of a combined image for pixels with significant color content. In alternative embodiments, luminance-weighted adjustments to chrominance values of an image may be made in a similar manner.

More generally, post-processing operations may include using one or more components of a combined image to adjust other components of a combined image in order to provide automated image enhancement. In some embodiments, post-processing operations may include adjusting a dynamic range, a resolution, a color space/format, or another aspect of combined images to match or approximate a corresponding aspect of a display, for example, or a corresponding aspect expected by a monitoring system or selected by a user.

Post-processed combined images may be stored in place of original combined images, for example, and may include context data indicating all applied post-processing operations so as to potentially retain a radiometric and/or color space calibration of the original combined images.

At block 4150, system 4000 may generate control signals related to the combined images. For example, processor 4010 may be configured to generate control signals adapted to energize and/or operate any of an alarm, a siren, a messaging system, a security light, or one or more of other components 4018, according to conditions detected from the enhanced imagery provided by the combined images. Such control signals may be generated when a combined image contains a detected object or condition, such as one or more of pedestrians 4050 and/or vehicle 4040 entering or idling in scene 4030, for example. In other embodiments, processor 4010 may be configured to generate control signals notifying a monitoring system of detected objects or conditions in scene 4030.

At block 4152, system 4000 may display images to a user. For example, processor 4010 may be configured to convert visible spectrum, infrared, and/or combined images (e.g., from block 4130 and/or 4140) into user-viewable combined images and present the user-viewable combined images to a user utilizing display 4016. In other embodiments, processor 4010 may also be configured to transmit combined images, including user-viewable combined images, to a monitoring system (e.g., using communication module 4014) for further processing, notification, control signal generation, and/or display to remote users. As noted above, embodiments of process 4100 may include additional embodiments of block 4152, for example. In some embodiments, one or more embodiments of block 4152 may be implemented as part of one or more feedback loops, for example, which may include embodiments of blocks 4102 and/or 4104.

At block 4154, system 4000 may store images and other associated data. For example, processor 4010 may be configured to store one or more of the visible spectrum, infrared, or combined images, including associated context data and other data indicating pre-and-post-processing operations, to memory 4012, for example, or to an external or portable memory device.

Turning now to FIG. 26, FIG. 26 illustrates a flowchart of a process 4200 to enhance infrared imaging of a scene in accordance with an embodiment of the disclosure. For example, one or more portions of process 4200 may be performed by processor 4010 and/or each of imaging modules 4002a-b of system 4000 and utilizing any of memory 4012, communication module 4014, display 4016, or other components 4018. In some embodiments, process 4200 may be implemented as an embodiment of block 4130 in process 4100 of FIG. 25, for example, to generate combined images from captured infrared and/or visible spectrum images received in blocks 4112 and/or 4118 in process 4100.

It should be appreciated that system 4000 and scene 4030 are identified only for purposes of giving examples and that any other suitable system including images of any other type of scene may perform all or part of process 4200. It should also be appreciated that any step, sub-step, sub-process, or block of process 4200 may be performed in an order different from the embodiment illustrated by FIG. 26, and, furthermore, may be performed before, after, or within one or more blocks in process 4100 of FIG. 25, including blocks other than block 4130. For example, although process 4200 describes distinct blending and high-contrast modes, in other embodiments, captured images may be combined using any portion, order, or combination of the blending and/or high-contrast mode processing operations.

At block 4230, system 4000 may receive preprocessed visible spectrum and infrared images. For example, processor 4010 of system 4000 may be configured to receive one or more visible spectrum images from visible spectrum imaging module 4002a and one or more infrared images from infrared imaging module 4002b. In one embodiment, visible spectrum and/or infrared images may be preprocessed according to block 4120 of FIG. 25. Once the visible spectrum and infrared images are received by processor 4010, processor 4010 may be configured to determine a mode for generating combined images. Such mode may be selected by a user in block 4102 of FIG. 25, for example, or may be determined according to context data or an alternating mode, for instance, where the mode of operation alternates between configured modes upon a selected schedule or a particular monitoring system expectation.

In the embodiment illustrated by FIG. 26, processor 4010 may determine a true color mode, including one or more of blocks 4233 and 4235, or a high contrast mode, including one or more of blocks 4232, 4234, and 4236. In other embodiments, process 4200 may include other selectable modes including processes different from those depicted in FIG. 26, for example, or may include only a single mode, such as a mode including one or more adjustable blending parameters. In embodiments with multiple possible modes, once a mode is determined, process 4200 may proceed with the selected mode.

At block 4233, system 4000 may perform various pre-combining operations on one or more of the visible spectrum and infrared images. For example, if a true color mode is determined in block 4230, processor 4010 may be configured to perform pre-combining operations on one or more visible spectrum and/or infrared images received in block 4230. In one embodiment, pre-combining operations may include any of the pre-processing operations described with respect to block 4120 of FIG. 25. For example, the color spaces of the received images may be converted and/or decomposed into common constituent components.

In other embodiments, pre-combining operations may include applying a high pass filter, applying a low pass filter, a non-linear low pass filer (e.g., a median filter), adjusting dynamic range (e.g., through a combination of histogram equalization and/or linear scaling), scaling dynamic range (e.g., by applying a gain and/or an offset), and adding image data derived from these operations to each other to form processed images. For example, a pre-combining operation may include extracting details and background portions from a radiometric component of an infrared image using a high pass spatial filter, performing histogram equalization and scaling on the dynamic range of the background portion, scaling the dynamic range of the details portion, adding the adjusted background and details portions to form a processed infrared image, and then linearly mapping the dynamic range of the processed infrared image to the dynamic range of display 4016. In one embodiment, the radiometric component of the infrared image may be a luminance component of the infrared image. In other embodiments, such pre-combining operations may be performed on one or more components of visible spectrum images.

As with other image processing operations, pre-combining operations may be applied in a manner so as to retain a radiometric and/or color space calibration of the original received images. Resulting processed images may be stored temporarily (e.g., in memory 4012) and/or may be further processed according to block 4235.

At block 4235, system 4000 may blend one or more visible spectrum images with one or more infrared images. For example, processor 4010 may be configured to blend one or more visible spectrum images of scene 4030 with one or more infrared images of scene 4030, where the one or more visible spectrum and/or infrared images may be processed versions (e.g., according to block 4233) of images originally received in block 4230.

In one embodiment, blending may include adding a radiometric component of an infrared image to a corresponding component of a visible spectrum image, according to a blending parameter. For example, a radiometric component of an infrared image may be a luminance component (e.g., Y) of the infrared image. In such an embodiment, blending the infrared image with a visible spectrum image may include proportionally adding the luminance components of the images according to a blending parameter and the following first blending equation:

$$Y_{CI} = \zeta * Y_{VSI} + (1-\zeta) * Y_{IRI}$$

where $Y_{CI}$ is the luminance component of the combined image, $Y_{VSI}$ is the luminance of the visible spectrum image, $Y_{IRI}$ is the luminance component of the infrared image, and $\zeta$ varies from 0 to 1. In this embodiment, the resulting luminance component of the combined image is the blended image data.

In other embodiments, where a radiometric component of an infrared image may not be a luminance component of the infrared image, blending an infrared image with a visible spectrum image may include adding chrominance components of the images according to the first blending equation (e.g., by replacing the luminance components with corresponding chrominance components of the images), and the resulting chrominance component of the combined image is blended image data. More generally, blending may include adding (e.g., proportionally) a component of an infrared image, which may be a radiometric component of the infrared image, to a corresponding component of a visible spectrum image. Once blended image data is derived from the components of the visible spectrum and infrared images, the blended image data may be encoded into a corresponding component of the combined image, as further described with respect to block 4238. In some embodiments, encoding blended image data into a component of a combined image may include additional image processing steps, for example, such as dynamic range adjustment, normalization, gain and offset operations, and color space conversions, for instance.

In embodiments where radiometric data is encoded into more than one color space/format component of an infrared image, the individual color space/format components of the infrared and visible spectrum images may be added individually, for example, or the individual color space components may be arithmetically combined prior to adding the combined color space/format components.

In further embodiments, different arithmetic combinations may be used to blend visible spectrum and infrared images. For example, blending an infrared image with a visible spectrum image may include adding the luminance components of the images according to a blending parameter $\zeta$ and the following second blending equation:

$$Y_{CI} = \zeta * Y_{VSI} + Y_{IRI}$$

where $Y_{CI}$, $Y_{VSI}$, and $Y_{IRI}$ are defined as above with respect to the first blending equation, and $\zeta$ varies from 0 to values greater than a dynamic range of an associated image component (e.g., luminance, chrominance, radiometric, or other image component). As with the first blending equation, the second blending equation may be used to blend other components of an infrared image with corresponding components of a visible spectrum image. In other embodiments, the first and second blending equations may be rewritten to include per-pixel color-weighting or luminance-weighting adjustments of the blending parameter, for example, similar to the component-weighted adjustments described with respect to block 4140 of FIG. 25, in order to emphasize an area with a high level of radiometric data.

In some embodiments, image components other than those corresponding to a radiometric component of an infrared image may be truncated, set to a known value, or discarded. In other embodiments, the combined image components other than those encoded with blended image data may be encoded with corresponding components of either the visible spectrum or the infrared images. For example, in one embodiment, a combined image may include a chrominance component of a visible spectrum image encoded into a chrominance component of the combined image and blended image data encoded into a luminance component of the combined image, where the blended image data comprises a radiometric component of an infrared image blended with a luminance component of the visible spectrum image. In alternative embodiments, a combined image may include a chrominance component of the infrared image encoded into a chrominance component of the combined image.

A blending parameter value may be selected by a user (e.g., in block 4102 of FIG. 25), or may be determined by processor 4010 according to context or other data, for example, or according to an image enhancement level expected by a coupled monitoring system. In some embodiments, the blending parameter may be adjusted or refined using a knob, joystick, or keyboard coupled to processor 4010, for example, while a combined image is being displayed by display 4016. From the first and second blending equations, in some embodiments, a blending parameter may be selected such that blended image data includes only infrared characteristics, or, alternatively, only visible spectrum characteristics.

In addition to or as an alternative to the processing described above, processing according to a true color mode may include one or more processing steps, ordering of processing steps, arithmetic combinations, and/or adjustments to blending parameters as disclosed in U.S. patent application Ser. No. 12/477,828. For example, blending parameter $\zeta$ may be adapted to affect the proportions of two luminance components of an infrared image and a visible spectrum image. In one aspect, $\zeta$ may be normalized with a value in the range of 0 (zero) to 1, wherein a value of 1 produces a blended image (e.g., blended image data, and/or a combined image) that is similar to the visible spectrum image. On the other hand, if $\zeta$ is set to 0, the blended image may have a luminance similar to the luminance of the infrared image. However, in the latter instance, the chrominance (Cr and Cb) from the visible image may be retained. Each other value of $\zeta$ may be adapted to produce a blended image where the luminance part (Y) includes information from both the visible spectrum and infrared images. For example, $\zeta$ may be multiplied to the luminance part (Y) of the visible spectrum image and added to the value obtained by multiplying the value of 1-$\zeta$ to the luminance part (Y) of the infrared image. This added value for the blended luminance parts (Y) may be used to provide the blended image (e.g., the blended image data, and/or the combined image).

In one embodiment, a blending algorithm may be referred to as true color infrared imagery. For example, in daytime imaging, a blended image may comprise a visible spectrum color image, which includes a luminance element and a chrominance element, with its luminance value replaced by the luminance value from an infrared image. The use of the luminance data from the infrared image causes the intensity of the true visible spectrum color image to brighten or dim based on the temperature of the object. As such, the blending algorithm provides IR imaging for daytime or visible light images.

After one or more visible spectrum images are blended with one or more infrared images, processing may proceed to block 4238, where blended data may be encoded into components of the combined images in order to form the combined images.

At block 4232, system 4000 may derive high spatial frequency content from one or more of the visible spectrum and infrared images. For example, if a high contrast mode is determined in block 4230, processor 4010 may be configured to derive high spatial frequency content from one or more of the visible spectrum and infrared images received in block 4230.

In one embodiment, high spatial frequency content may be derived from an image by performing a high pass filter (e.g., a spatial filter) operation on the image, where the result of the high pass filter operation is the high spatial frequency content. FIG. 31 illustrates an image 4700 comprising high spatial frequency content derived from a visible spectrum image using high pass filtering in accordance with an embodiment of the disclosure. In an alternative embodiment, high spatial frequency content may be derived from an image by performing a low pass filter operation on the image, and then subtracting the result from the original image to get the remaining content, which is the high spatial frequency content. In another embodiment, high spatial frequency content may be derived from a selection of images through difference imaging, for example, where one image is subtracted from a second image that is perturbed from the first image in some fashion, and the result of the subtraction is the high spatial frequency content. For example, one or both of optical elements 4004*a-b* may be configured to introduce vibration, focus/de-focus, and/or movement artifacts into a series of images captured by one or both of imaging modules 4002*a-b*. High spatial frequency content may be derived from subtractions of adjacent or semi-adjacent images in the series.

In some embodiments, high spatial frequency content may be derived from only the visible spectrum images or the infrared images. In other embodiments, high spatial frequency content may be derived from only a single visible spectrum or infrared image. In further embodiments, high spatial frequency content may be derived from one or more components of visible spectrum and/or infrared images, such as a luminance component of a visible spectrum image, for example, or a radiometric component of an infrared image. Resulting high spatial frequency content may be stored temporarily (e.g., in memory 4012) and/or may be further processed according to block 4236.

At block 4234, system 4000 may de-noise one or more infrared images. For example, processor 4010 may be configured to de-noise, smooth, or blur one or more infrared images of scene 4030 using a variety of image processing operations. In one embodiment, removing high spatial frequency noise from infrared images allows processed infrared images to be combined with high spatial frequency content derived according to block 4232 with significantly less risk of introducing double edges (e.g., edge noise) to objects depicted in combined images of scene 4030.

In one embodiment, removing noise from infrared images may include performing a low pass filter (e.g., a spatial and/or temporal filter) operation on the image, where the result of the low pass filter operation is a de-noised or processed infrared image. FIG. 30 illustrates processed image 4600 resulting from low pass filtering infrared image 4500 of FIG. 29 to reduce noise in accordance with an embodiment of the disclosure. In a further embodiment, removing noise from one or more infrared images may include down-sampling the infrared images and then up-sampling the images back to the original resolution.

In another embodiment, processed infrared images may be derived by actively blurring infrared images of scene 4030. For example, optical elements 4004*b* may be configured to slightly de-focus one or more infrared images captured by infrared imaging module 4002*b*. The resulting intentionally blurred infrared images may be sufficiently de-noised or blurred so as to reduce or eliminate a risk of introducing double edges into combined images of scene 4030, as further described below. In other embodiments, blurring or smoothing image processing operations may be performed by processor 4010 on infrared images received at block 4230 as an alternative or supplement to using optical elements 4004*b* to actively blur infrared images of scene 4030. Resulting processed infrared images may be stored temporarily (e.g., in memory 4012) and/or may be further processed according to block 4236.

At block 4236, system 4000 may blend high spatial frequency content with one or more infrared images. For example, processor 4010 may be configured to blend high spatial frequency content derived in block 4232 with one or more infrared images of scene 4030, such as the processed infrared images provided in block 4234.

In one embodiment, high spatial frequency content may be blended with infrared images by superimposing the high spatial frequency content onto the infrared images, where the high spatial frequency content replaces or overwrites those portions of the infrared images corresponding to where the high spatial frequency content exists. For example, the high spatial frequency content may include edges of objects depicted in images of scene 4030, but may not exist within the interior of such objects. In such embodiments, blended image data may simply include the high spatial frequency content, which may subsequently be encoded into one or more components of combined images, as described in block 4238. FIG. 32 illustrates a combined image 4800 comprising a combination of the low pass filtered infrared image 4600 of FIG. 30 with the high pass filtered visible spectrum image 4700 of FIG. 31 generated in accordance with an embodiment of the disclosure.

For example, a radiometric component of an infrared image may be a chrominance component of the infrared image, and the high spatial frequency content may be derived from the luminance and/or chrominance components of a visible spectrum image. In this embodiment, a combined image may include the radiometric component (e.g., the chrominance component of the infrared image) encoded into a chrominance component of the combined image and the high spatial frequency content directly encoded (e.g., as blended image data but with no infrared image contribution) into a luminance component of the combined image. By doing so, a radiometric calibration of the radiometric component of the infrared image may be retained. In similar embodiments, blended image data may include the high spatial frequency content added to a luminance component of the infrared images, and the resulting blended data encoded into a luminance component of resulting combined images.

In other embodiments, high spatial frequency content may be derived from one or more particular components of one or a series of visible spectrum and/or infrared images, and the high spatial frequency content may be encoded into corresponding one or more components of combined images. For example, the high spatial frequency content may be derived from a luminance component of a visible spectrum image, and the high spatial frequency content, which in this embodiment is all luminance image data, may be encoded into a luminance component of a combined image.

In another embodiment, high spatial frequency content may be blended with infrared images using a blending parameter and an arithmetic equation, such as the first and second blending equations, above. For example, in one embodiment, the high spatial frequency content may be derived from a luminance component of a visible spectrum image. In such an embodiment, the high spatial frequency content may be blended with a corresponding luminance component of an infrared image according to a blending parameter and the second blending equation to produce blended image data. The blended image data may be encoded into a luminance component of a combined image, for example, and the chrominance component of the infrared image may be encoded into the chrominance component of the combined image. In embodiments where the radiometric component of the infrared image is its chrominance component, the combined image may retain a radiometric calibration of the infrared image. In other embodiments, portions of the radiometric component may be blended with the high spatial frequency content and then encoded into a combined image.

More generally, the high spatial frequency content may be derived from one or more components of a visible spectrum image and/or an infrared image. In such an embodiment, the high spatial frequency content may be blended with one or more components of the infrared image to produce blended image data (e.g., using a blending parameter and a blending equation), and a resulting combined image may include the blended image data encoded into corresponding one or more components of the combined image. In some embodiments, the one or more components of the blended data do not have to correspond to the eventual one or more components of the combined image (e.g., a color space/format conversion may be performed as part of an encoding process).

A blending parameter value may be selected by a user (e.g., in block 4102 of FIG. 25), or may be automatically determined by processor 4010 according to context or other data, for example, or according to an image enhancement level expected by a coupled monitoring system. In some embodiments, the blending parameter may be adjusted or refined using a knob coupled to processor 4010, for example, while a combined image is being displayed by display 4016. In some embodiments, a blending parameter may be selected such that blended image data includes only infrared characteristics, or, alternatively, only visible spectrum characteristics. A blending parameter may also be limited in range, for example, so as not to produce blended data that is out-of-bounds with respect to a dynamic range of a particular color space/format or a display.

In addition to or as an alternative to the processing described above, processing according to a high contrast mode may include one or more processing steps, ordering of processing steps, arithmetic combinations, and/or adjustments to blending parameters as disclosed in U.S. patent application Ser. No. 13/437,645. For example, the following equations may be used to determine the components Y, Cr and Cb for the combined image with the Y component from the high pass filtered visible spectrum image and the Cr and Cb components from the infrared image.

$hp\_y\_vis = \text{highpass}(y\_vis)$ $(y\_ir, cr\_ir, cb\_ir) = \text{colored}(\text{lowpass}(ir\_signal\_linear))$ which in another notation could be written as:

$hp_{y_{vis}} = \text{highpass}(y_{vis})$ $(y_{ir}, cr_{ir}, cb_{ir}) = \text{colored}(\text{lowpass}(ir_{signal\ linear}))$ In the above equations, highpass(y_vis) may be high spatial frequency content derived from high pass filtering a luminance component of a visible spectrum image. Colored (lowpass(ir_signal_linear)) may be the resulting luminance and chrominance components of the infrared image after the infrared image is low pass filtered. In some embodiments, the infrared image may include a luminance component that is selected to be 0.5 times a maximum luminance (e.g., of a display and/or a processing step). In related embodiments, the radiometric component of the infrared image may be the chrominance component of the infrared image. In some embodiments, the y_ir component of the infrared image may be dropped and the components of the combined image may be (hp_y_vis, cr_ir, cb_ir), using the notation above.

In another embodiment, the following equations may be used to determine the components Y, Cr and Cb for a combined image with the Y component from the high pass filtered visible spectrum image and the Cr and Cb components from the infrared image.

$comb\_y = y\_ir + \text{alpha} \times hp\_y\_vis$ $comb\_cr = cr\_ir$ $comb\_cb = cb\_ir$ which in another notation could be written as:

$comb_y = y_{ir} + \text{alpha} \times hp_{y_{vis}}$ $comb_{cr} = cr_{ir}$ $comb_{cb} = cb_{ir}$ The variation of alpha thus gives the user an opportunity to decide how much contrast is needed in the combined image. With an alpha of close to zero, the IR image alone will be shown, but with a very high alpha, very sharp contours can be seen in the combined image. Theoretically, alpha can be an infinitely large number, but in practice a limitation will probably be necessary, to limit the size of alpha that can be chosen to what will be convenient in the current application. In the above equations, alpha may correspond to a blending parameter ζ.

Once the high spatial frequency content is blended with one or more infrared images, processing may proceed to block 4238, where blended data may be encoded into components of the combined images in order to form the combined images.

At block 4238, system 4000 may encode the blended data into one or more components of the combined images. For example, processor 4010 may be configured to encode blended data derived or produced in accordance with blocks 4235 and/or 4236 into a combined image that increases, refines, or otherwise enhances the information conveyed by either the visible spectrum or infrared images viewed by themselves.

Figure 33:
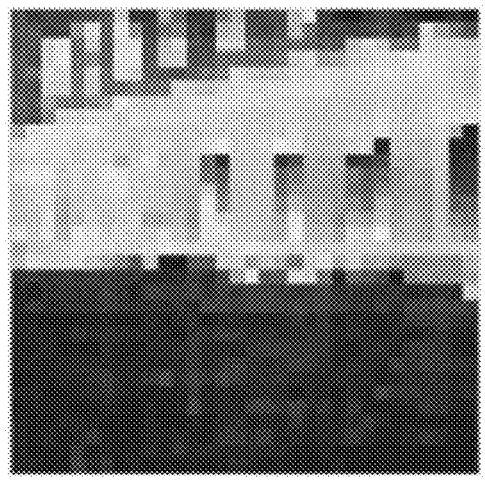
FIG. 33 illustrates a low resolution infrared image of a scene in accordance with an embodiment of the disclosure.
Figure 34:
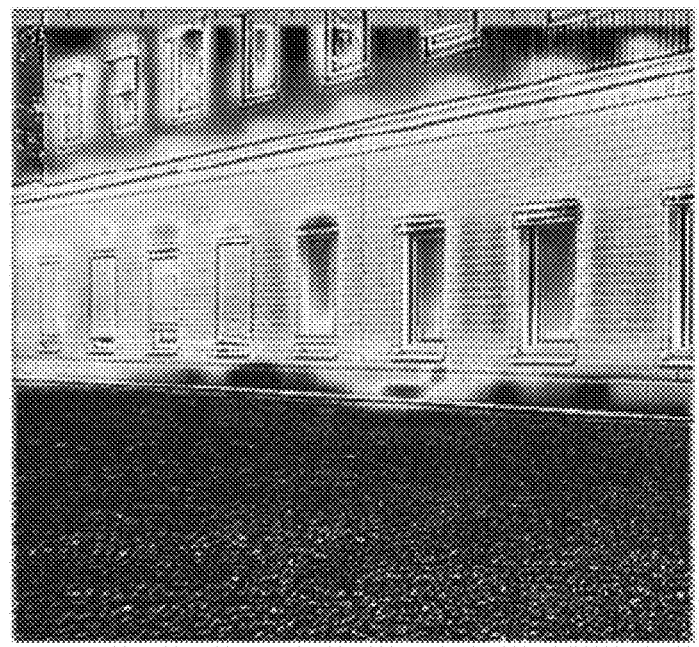
FIG. 34 illustrates the infrared image of FIG. 33 after being resampled, processed, and combined with high spatial frequency content derived from a visible spectrum image of the scene in accordance with an embodiment of the disclosure.

In some embodiments, encoding blended image data into a component of a combined image may include additional image processing steps, for example, such as dynamic range adjustment, normalization, gain and offset operations, noise reduction, and color space conversions, for instance. FIG. 34 illustrates a combined image 5000 comprising the low resolution infrared image 4900 of FIG. 33 after being resampled, processed, and combined with high spatial frequency content derived from a visible spectrum image of the scene in accordance with an embodiment of the disclosure.

In addition, processor 4010 may be configured to encode other image data into combined images. For example, if blended image data is encoded into a luminance component of a combined image, a chrominance component of either a visible spectrum image or an infrared image may be encoded into a chrominance component of a combined image. Selection of a source image may be made through user input, for example, or may be determined automatically based on context or other data. More generally, in some embodiments, a component of a combined image that is not encoded with blended data may be encoded with a corresponding component of a visible spectrum image or an infrared image. By doing so, a radiometric calibration of an infrared image and/or a color space calibration of a visible spectrum image may be retained in the resulting combined image. Such calibrated combined images may be used for enhanced infrared imaging applications, particularly where constituent visible spectrum images and infrared images of a scene are captured at different times and/or disparate ambient lighting levels.

Figure 36:
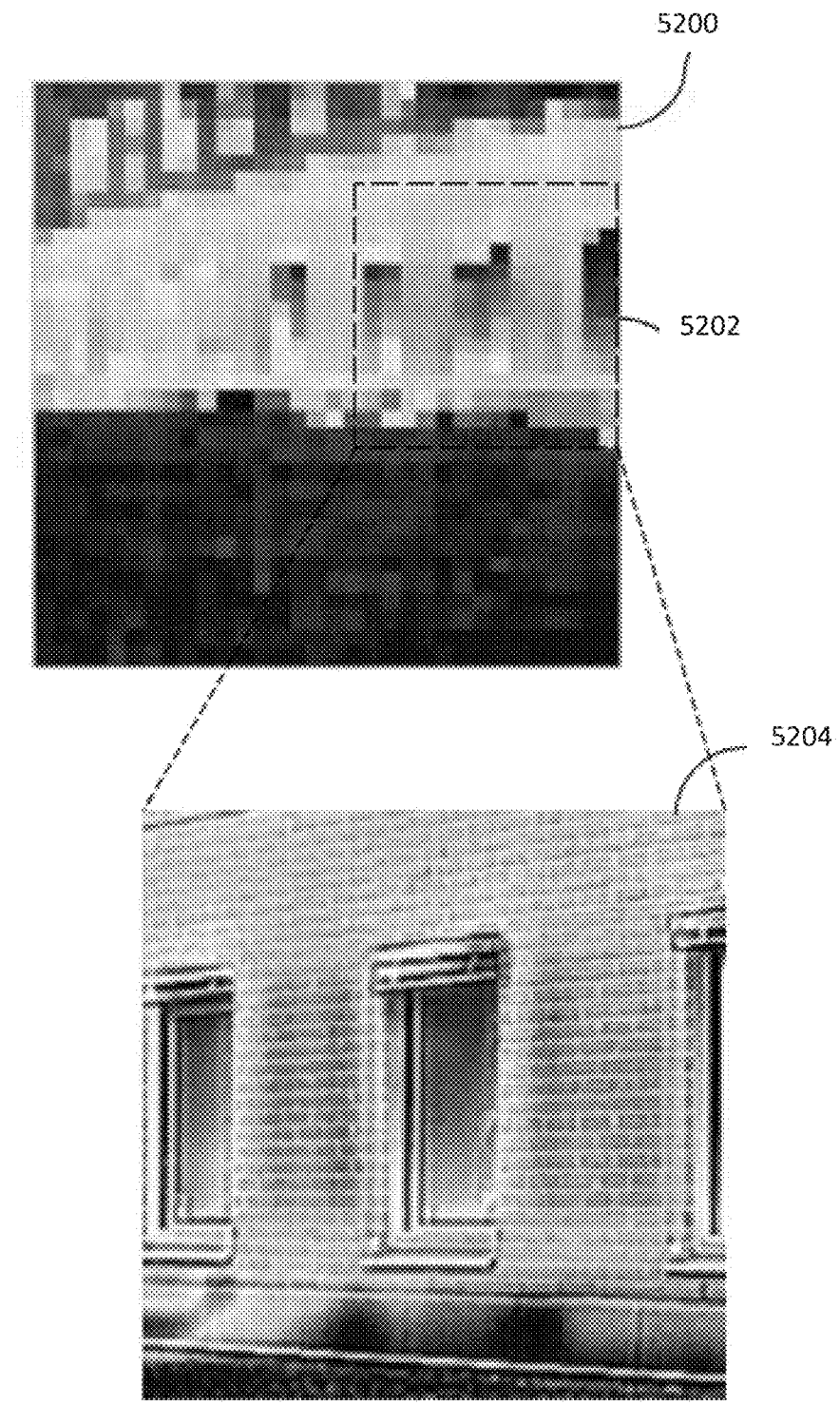
FIG. 36 illustrates scaling of a portion of an infrared image and a resulting combined image generated in accordance with an embodiment of the disclosure.

FIG. 35 illustrates a combined image 5100 generated in accordance with an embodiment of the disclosure. The combined image of FIG. 35 is in the form of a picture-in-picture combined image including a relatively low resolution infrared image 5102 captured at a first time enhanced with high spatial frequency content 5106 of a portion 5104 of a visible spectrum image captured at a second time. FIG. 36 illustrates a combined image 5204 generated in accordance with another embodiment of the disclosure. Combined image 5204 is in the form of a scaled portion 5202 of infrared image 5200 captured at a first time combined with high spatial frequency content of a visible spectrum image captured at a second time.

Figure 27:
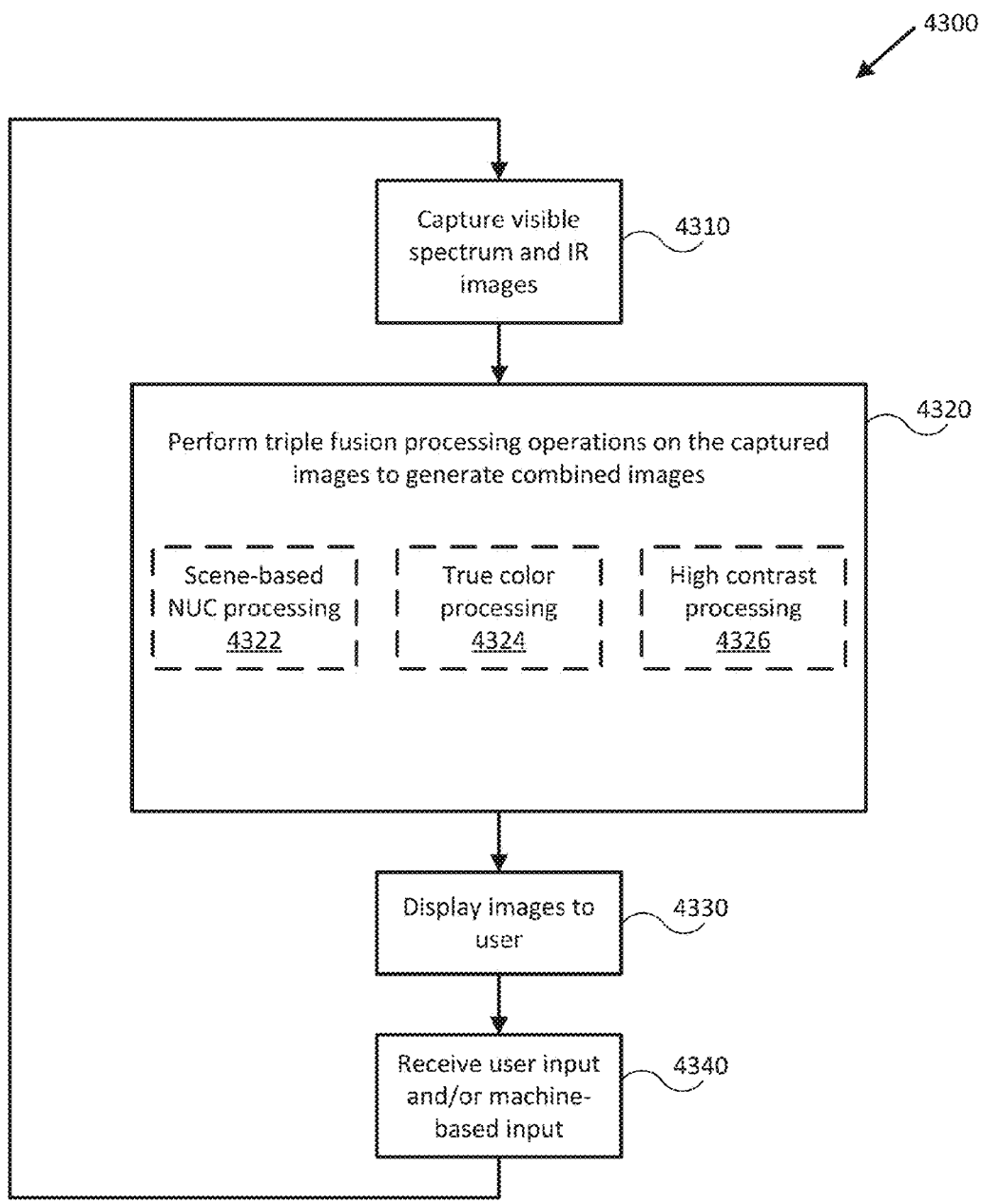
FIG. 27 illustrates a flow diagram of various operations to enhance infrared imaging of a scene in accordance with an embodiment of the disclosure.

Turning now to FIG. 27, FIG. 27 illustrates a flowchart of a process 4300 to enhance infrared imaging of a scene in accordance with an embodiment of the disclosure. For example, one or more portions of process 4300 may be performed by processor 4010 and/or each of imaging modules 4002a-b of system 4000 and utilizing any of memory 4012, communication module 4014, display 4016, or other components 4018.

It should be appreciated that system 4000 and scene 4030 are identified only for purposes of giving examples and that any other suitable system including images of any other type of scene may perform all or part of process 4300. It should also be appreciated that any step, sub-step, sub-process, or block of process 4300 may be performed in an order different from the embodiment illustrated by FIG. 27, and, furthermore, may be performed before, after, or in parallel with one or more blocks in process 4100 of FIG. 25 and/or process 4200 of FIG. 26. For example, although process 4300 describes receiving user input after capturing images, performing triple fusion processing operations, and/or displaying images to a user, in other embodiments, user input may be received at any point or points within process 4300.

At block 4310, system 4000 may capture visible spectrum and infrared images. For example, processor 4010 and/or imaging modules 4002a-b of system 4000 may be configured to capture one or more visible spectrum images and infrared images of scene 4030. In some embodiments, block 4310 may correspond to one or more of blocks 4110-4118 of process 4100 in FIG. 25. In other embodiments, visible spectrum images may be captured substantially simultaneously with infrared images. Once at least one visible spectrum image and/or infrared image is captured, process 4300 may continue to block 4320.

At block 4320, system 4000 may perform triple fusion processing operations on one or more captured images of scene 4030 to generate combined images (e.g., at least three processes performed on such images in some embodiments). For example, processor 4010 of system 4000 may be configured to perform adjustable scene-based NUC processing (e.g., block 4322), true color processing (e.g., block 4324), and high contrast processing (e.g., block 4326) on one or more images captured in block 4310, and then generate corresponding combined images of scene 4030 including relative contributions of the various processing operations. In some embodiments, the relative contributions to the combined images may be determined by one or more control parameters. In such embodiments, control parameters may be determined from one or more user inputs, threshold values, and/or from other operating parameters of system 4000. In some embodiments, greater or fewer than three processing operations may be performed in block 4320. In some embodiments, other processing operations may be performed in block 4320 instead of and/or in addition to the illustrated operations.

For example, a relative contribution of a particular processing operation may include one or more components of an intermediary image, such as a result of a true color processing operation (e.g., processing according to a true color mode in FIG. 26), for example, multiplied by a corresponding control parameter. The one or more control parameters used to determine the relative contributions may be interdependent, for example, so that a resulting combined image from block 4320 includes image components (e.g., luminance, chrominance, radiometric, or other components) within a dynamic range of a particular display or a dynamic range expected by a communicatively coupled monitoring system, for instance. In other embodiments, one control parameter may be used to arithmetically determine all relative contributions, similar to various blending processing operations described herein. In further embodiments, multiple control parameters may be used to determine one or more relative contributions, and post-processing operations (e.g., similar to embodiments of block 4140 of FIG. 25) may be used to adjust a dynamic range of a resulting combined image appropriately.

In still further embodiments, control parameters may be determined on a pixel-by-pixel basis, using threshold values, for example. Such threshold values may be used to compensate for too low and/or too high luminosity and/or chrominance values of intermediary and/or combined images, for example, or to select portions of intermediary images associated with particular control parameters and/or relative contributions. For example, in one embodiment, one or more threshold values may be used to apply a control parameter of 0.75 (e.g., 75% of the total contribution to a combined image) to portions of a true color processed intermediary image with luminance values above a median value (e.g., the threshold value in this embodiment), and apply a control parameter of 0.25 (e.g., 25% of the total contribution to the combined image) to portions of the true color processed intermediary image with luminance values below the median value.

In one embodiment, processor 4010 of system 4000 may be configured to receive control parameters for processing captured images from memory 4012, derive color characteristics of scene 4030 from at least one captured visible spectrum image and/or infrared image, derive high spatial frequency content from at least one captured visible spectrum image and/or infrared image (e.g., which may be the same or different from the image(s) used to derive the color characteristics of the scene), and generate a combined image including relative contributions of the color characteristics and the high spatial frequency content that are determined by one or more of the control parameters.

In some embodiments, deriving color characteristics of scene 1430 (e.g., true color processing 4324) may involve one or more processing steps similar to those discussed in reference to blocks 4233, 4235, and 4238 (e.g., a true color mode) of FIG. 26. In other embodiments, deriving high spatial frequency content (e.g., high contrast processing 4326) may involve one or more processing steps similar to those discussed in reference to blocks 4232, 4234, 4236, and 4238 (e.g., a high contrast mode) of FIG. 26. In further embodiments, any one or combination of scene-based NUC processing 4322, true color processing 4324, and high contrast processing 4326 may include one or more processing steps the same and/or similar to those discussed in reference to blocks 4110-4140 of FIG. 25. In addition, other image analytics and processing may be performed in place of or in addition to blocks 4322, 4324, and/or 4326, according to methodologies provided in U.S. patent application Ser. No. 12/477,828 and/or U.S. patent application Ser. No. 13/437,645.

In one embodiment, processor 4010 may be configured to selectively apply scene-based NUC processing to one or more infrared images by enabling or disabling the correction, for example, or by implementing corrections according to an overall gain applied to all or at least a portion of the correction terms. In some embodiments, the selectivity may be related to (e.g., proportional to) a control parameter, for example. In another embodiment, infrared imaging module 4002b may be configured to selectively apply scene-based NUC processing to one or more infrared images.

In some embodiments, true color processing 4324 may include deriving color characteristics of scene 4030 from a chrominance component of a visible spectrum image of scene 4030 captured by visible spectrum imaging module 4002a. In such embodiments, a combined image may include a relative contribution from a luminance component of an infrared image of scene 4030 captured by infrared imaging module 4002b, where the relative contribution (e.g., its multiplicative factor, gain, or strength) of the luminance component of the infrared image substantially matches the relative contribution of the color characteristics. In some embodiments, the control parameter determining the relative contribution of the color characteristics may be used to determine the relative contribution of the luminance component of the infrared image. In further embodiments, the luminance component of the infrared image may be blended with a luminance component of the visible spectrum image before the resulting blended image data is contributed to the combined image in place of the luminance component of the infrared image. In various embodiments, a luminance component of the infrared image may correspond to a radiometric component of the infrared image.

In some embodiments, high contrast processing 4326 may include deriving high spatial frequency content from a luminance component of a visible spectrum image of scene 4030 captured by visible spectrum imaging module 4002a. In such embodiments, a combined image may include a relative contribution from a chrominance component of an infrared image of scene 4030 captured by infrared imaging module 4002b, where the relative contribution of the chrominance component of the infrared image substantially matches the relative contribution of the high spatial frequency content. In some embodiments, the control parameter determining the relative contribution of the high spatial frequency content may be used to determine the relative contribution of the chrominance component of the infrared image. In further embodiments, high spatial frequency content may be blended with a luminance component of the infrared image before the resulting blended image data is contributed to the combined image in place of the high spatial frequency content. In various embodiments, a chrominance component of the infrared image may correspond to a radiometric component of the infrared image.

In various embodiments, the processing of blocks 4322, 4324, and 4326 may be performed in any desired order (e.g., serial, parallel, or combinations thereof).

Once one or more combined images are generated by processing in block 4320, process 4300 may move to block 4330 to display the combined images to a user.

At block 4330, system 4000 may display images to a user. For example, processor 4010 of system 4000 may be configured to use display 4016 to display combined images generated from block 4320, captured and/or processed images from block 4310, or other images, for example, such as images stored in memory 4012. In some embodiments, processor 4010 may be configured to display information, such as text indicating a relative contribution and/or a blending parameter value, for example, in addition to one or more images. In further embodiments, where display 4016 is implemented as a touchscreen display, for example, processor 4010 may be configured to display images representing user input devices that accept user input, such as slider controls, selectable buttons or regions, rotatable knobs, and other user input devices. In some embodiments, block 4330 may correspond to block 4152 of process 4100 in FIG. 25. In various embodiments, one or more embodiments of block 4330 may be implemented as part of one or more feedback loops, for example, which may include embodiments of blocks 4102 and/or 4104 of process 4100 in FIG. 25.

At block 4340, system 4000 may receive user input and/or machine-based input. For example, processor 4010 of system 4000 may be configured to receive user input from a user interface that selects, adjusts, refines, or otherwise determines one or more control parameters used to generate combined images according to block 4320. In some embodiments, such user input may select, adjust, refine, or otherwise determine one or more blending parameters, for example, such as a blending parameter for true color processing in block 4324 or a blending parameter for high contrast processing in block 4326. In other embodiments, such user input may select, adjust, refine, or otherwise determine a control parameter for selectively applying scene-based NUC processing in block 4322, as described herein. User input may be received from one or more user input devices of a user interface, such as a slider control, a knob or joystick, a button, or images of such controls displayed by a touchscreen display. Other types of user input devices are also contemplated. In some embodiments, user input may relate to a selected exit point of process 4300, for example, or an entry or re-entry point for one or more of processes 4100, 4200, and/or 4300. In one embodiment, once system 4000 receives user input, process 4300 may continue to block 4310, where already-captured images may be re-processed and/or re-displayed according to updated control, blending, or other operating parameters, for example, or where newly-captured images may be processed and displayed, as described herein.

In further embodiments, in addition to, or alternatively, processor 4010 of system 4000 may be configured to receive machine-based input (e.g., information provided from one or more other components 4018 and/or any components described herein), and adapted to select, adjust, refine, or otherwise determine one or more control parameters (e.g., blending parameters, control parameters for NUC processing, or other operational parameters, for example) used to generate combined images according to block 4320. In some embodiments, such parameters may be used to select a particular processing methodology, or morph from one selection of processing methodology to another, as described herein. In various embodiments, the machine-based input may relate to a particular time of day, a level of ambient light, an environmental temperature, other environmental conditions, and/or other data provided by various types of sensors, for example. In other embodiments, the machine-based input may be provided as a result of processing of one or more images, for example, in accordance with various techniques described herein.

In one embodiment, process 4300 may be adapted to capture visible spectrum and/or infrared images (e.g., block 4310), derive high spatial frequency content and/or visible spectrum color data (e.g., a chrominance component) from the visible spectrum images (e.g., portions of blocks 4324 and 4326), and blend the high spatial frequency content and visible spectrum color with corresponding infrared images (e.g., portions of blocks 4320-4326, and where the infrared images may be processed according to various NUC processing techniques, as in block 4322), to form combined images including various aspects of enhanced infrared imagery.

Figure 28:
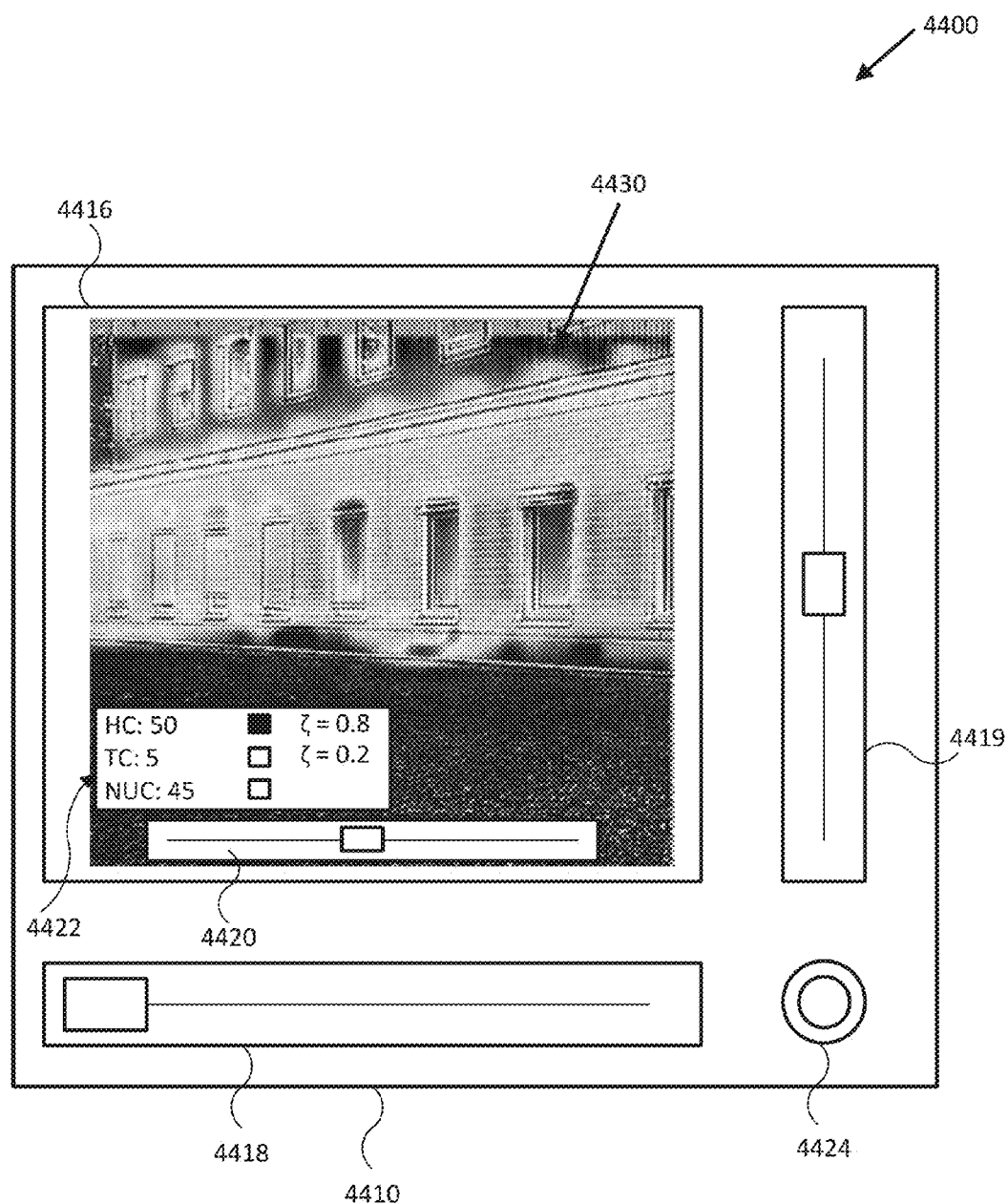
FIG. 28 illustrates a user interface for an imaging system adapted to image a scene in accordance with an embodiment of the disclosure.

Referring now to FIG. 28, FIG. 28 shows a user interface 4400 for imaging system 4000 in accordance with an embodiment of the disclosure. User interface 4400 may include interface housing 4410, display 4416, one or more slider controls 4418-4419, and/or knob/joystick 4424. In some embodiments, user interface 4400 may correspond to one or more of display 4016 and other components 4018 of system 4000 in FIG. 24. For example, display 4416 may be implemented as a touchscreen display and user interface 4400 may include user-selectable images of user input devices, such as slider control 4420 and/or selectable text box 4422. Each user input device may accept user input to determine a method of generating combined images, to select a radiometric interval, to input context and/or sensor data, to select a color or pseudo-color palette for one or more image types, to select or refine a blending parameter, to select or refine a control parameter, to select or refine threshold values, and/or to determine other operating parameters of system 4000, as described herein.

As shown in FIG. 28, display 4416 may be configured to display one or more combined images 4430, or a series of combined images (e.g., video) processed according to image analytics and other processing operations described herein. In some embodiments, display 4416 may be configured to display triple fusion processed combined images, true color processed combined or intermediary images, high contrast processed combined or intermediary images, NUC processed images, unprocessed captured images, and/or captured images processed according to any of the processing operations described herein.

In one embodiment, a user may adjust a user input device (e.g., by moving a slider up, down, left, or right, by rotating a knob, by manipulating a joystick, by selecting an image or region displayed by a touchscreen) and user interface 4400 and/or display 4014 may provide visible feedback related to the user input by displaying text in selectable text box 4422, for example, or by updating (e.g., using other components of system 4000) imagery displayed by display 4416. In one embodiment, a user may select a relative contribution (e.g., of a particular image processing technique, such as NUC processing, high contrast processing, true color processing, various pre-processing, various post-processing, and/or any other processing described herein) to adjust by selecting an image or region (e.g., a rectangular region within selectable text box 4422, shown as solid when selected, for example) in selectable text box 4422, for example, and then adjust a control parameter of that relative contribution by manipulating one or more of slider controls 4418-4420 and/or knob/joystick 4424.

For example, in some embodiments, one of slider controls 4418-4420 may be assigned to and vary a control parameter that is used to set the relative gain (e.g., a relative contribution) applied to one or more components of an intermediary image resulting from high contrast processing (e.g., block 4326), for instance, and thereby vary a contribution of the high contrast processing in the user-displayed image. In other embodiments, any one of slider controls 4418-4420 may be assigned to and vary corresponding control parameters used to set relative gains (e.g., relative contributions) applied to one or more components of an intermediary image resulting from true color processing (e.g., block 4324), and/or any other processing described herein (e.g., block 4320 and/or various blocks of processes 4100 and/or 4200), and thereby vary their relative contribution in a user-displayed image.

In other embodiments, a user may use selectable text box 4422 to assign one or more control parameters, blending parameters, or other operating parameters to any of slider controls 4418-4420 and/or knob/joystick 4424, for example, to select multiple operating parameters for adjustment at substantially the same time. Embodiments of imaging systems including a user interface similar to user interface 4400 may display combined and/or other processed or unprocessed images adjusted for a particular application and/or time-sensitive need. Such combined images may be used for enhanced infrared imaging applications benefiting from increased scene detail, contrast, or other processing operations disclosed herein.

Any of the various methods, processes, and/or operations described herein may be performed by any of the various systems, devices, and/or components described herein where appropriate.

For example, in various embodiments, imaging system 4000 in FIG. 24 may be adapted to use a variety of the image processing methods disclosed herein to provide a variable imaging experience throughout a number of different environmental conditions, application needs, and/or user requirements/expectations.

In one embodiment, imaging system 4000 may be adapted to select one or more methodologies depending on available light.

When there is sufficient daylight, imaging system 4000 may be adapted to provide combined images and/or video that include real-time visible spectrum characteristics blended with and/or otherwise enhanced with real-time infrared characteristics (e.g., visible spectrum images and infrared images are captured substantially simultaneously and then blended according to any one or combination of methods described herein). For example, a luminosity component of visible spectrum images may be blended with a radiometric luminosity component of corresponding infrared images such that the brightness of visible spectrum color is modulated according to a temperature of an object in the images (e.g., true color processing, similar to that described in relation to block 4324 and/or portions of process 4200). In other embodiments, any one or combination of triple fusion, high contrast, and/or true color processing may be used to generate such blended combined images (e.g., blocks 4320-4326). In further embodiments (e.g., when there is sufficient ambient light), imaging system 4000 may be adapted to provide non-infrared enhanced visible spectrum images and/or video (e.g., without blending visible spectrum images with infrared images).

When there is an intermediate amount of daylight, such as at dusk, or when there are other environmental conditions reducing the available light, imaging system 4000 may be adapted to provide combined images and/or video that include real-time infrared characteristics blended with time-spaced visible spectrum characteristics (e.g., captured prior to the infrared imagery), as described herein, with real-time visible spectrum characteristics (e.g., using available light), or a combination of time-spaced and real-time visible spectrum characteristics. For example, a radiometric luminosity component of infrared images may be blended with a chrominance component of corresponding real-time and/or time-spaced visible spectrum images such that the resulting combined images contain infrared imagery blended with accurate and/or semi-accurate visible spectrum colors (e.g., block 4324 and/or portions of process 4200). In another embodiment, a radiometric luminosity component of infrared images may be blended with high contrast content derived from corresponding real-time and/or time-spaced visible spectrum images (e.g., using high contrast processing, block 4326, portions of process 4200, and/or as described herein) such that the resulting combined images contain infrared imagery enhanced with edge and other detail typically unavailable in raw infrared imagery. In other embodiments, any one or combination of triple fusion, high contrast, and/or true color processing may be used to generate such blended combined images (e.g., blocks 4320-4326).

When there is an very little or no daylight and/or ambient light, such as at night, or when there are other environmental conditions reducing the available light, imaging system 4000 may be adapted to provide combined images and/or video that include real-time infrared characteristics blended with time-spaced visible spectrum characteristics (e.g., captured prior to the infrared imagery), as described herein. For example, a radiometric luminosity component of infrared images may be blended with a chrominance component of corresponding time-spaced visible spectrum images such that the resulting combined images contain infrared imagery blended with representative visible spectrum colors (e.g., block 4324 and/or portions of process 4200). In another embodiment, a radiometric luminosity component of infrared images may be blended with high contrast content derived from corresponding time-spaced visible spectrum images (e.g., using high contrast processing, block 4326, portions of process 4200, and/or as described herein) such that the resulting combined images contain infrared imagery enhanced with time-spaced edge and other detail typically unavailable in raw infrared imagery. In other embodiments, any one or combination of triple fusion, high contrast, and/or true color processing may be used to generate such blended combined images (e.g., blocks 4320-4326). In further embodiments (e.g., when there is substantially no ambient light), imaging system 4000 may be adapted to provide non-visible spectrum infrared images and/or video (e.g., without blending infrared images with visible spectrum images).

In various embodiments, imaging system 4000 may be adapted to select a particular processing methodology or morph from one selection of processing methodology to another based on a detected amount of available ambient light and/or daylight (e.g., detected by visible spectrum imaging module 4002a, for example, or by one or more of other components 4018). For example, different combined images resulting from different methodologies may be blended together according to a measure of available light in the combined images. In some embodiments, imaging system 4000 may be adapted to use different sets of processing methodology with respect to different portions of captured images depending on an amount of available ambient light and/or daylight detected in the portions of the captured images. In further embodiments, imaging system 4000 may be adapted to select and/or morph various processing methodologies according to a schedule, based on various information (e.g., sensor data measured by image sensors 4002a,b and/or various other components 4018), based on various processing operations (e.g., pre, post, high contrast, true color, NUC, triple fusion, time based, and/or other types of processing described herein), and/or based on other appropriate techniques. In such embodiments, imaging system 4000 may be adapted to vary one or more processing methodologies with and/or without user input (e.g., in response to machine-based input), as described herein.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
a first imaging module comprising a first plurality of sensors configured to capture a first image of a scene;
a second imaging module comprising a second plurality of sensors configured to capture a second image of the scene; and
a processor configured to communicate with the first imaging module and the second imaging module and to process the first image and the second image to generate a combined image comprising first characteristics of the scene derived from the first image and second characteristics of the scene derived from the second image; wherein:
the first plurality of sensors comprises a plurality of visible spectrum sensors configured to capture a visible spectrum image of the scene and the first image of the scene comprises the visible spectrum image of the scene; and
the processor and/or the first imaging module are configured to transmit, receive, store, and/or process the visible spectrum image of the scene according to an RGB color space, a YCbCr color space, a YUV color space, a color space derived through conversion from the RGB, YCbCr, and/or YUV color spaces, and/or a color space comprising an intensity component, a brightness component, and/or other color space components.

2. The system of claim 1, wherein:
the second plurality of sensors comprises a plurality of infrared sensors configured to capture a short wave infrared (SWIR) image of the scene and the second image of the scene comprises an SWIR image of the scene; and
the first characteristics of the scene comprise visible spectrum characteristics of the scene and the second characteristics of the scene comprise SWIR characteristics of the scene.

3. The system of claim 1, further comprising a display and a third imaging module comprising a plurality of infrared sensors configured to capture a thermal image of the scene, wherein:
the second imaging module comprises a plurality of non-thermal sensors configured to capture a non-thermal image of the scene and the second image of the scene comprises the non-thermal image of the scene;
the combined image comprises a first combined image; and
the processor is configured to communicate with the third imaging module, and to process the second image and the thermal image to generate a second combined image comprising non-thermal characteristics of the scene derived from the non-thermal image and thermal characteristics of the scene derived from the thermal image, wherein the display is configured to present the first combined image or the second combined image to a user.

4. The system of claim 3, wherein:
the plurality of non-thermal sensors of the second imaging module comprises a plurality of infrared sensors configured to capture a short wave infrared (SWIR) image of the scene and the second image of the scene comprises an SWIR image of the scene; and
the non-thermal characteristics of the scene comprise SWIR characteristics of the scene.

5. The system of claim 1, wherein:
the first imaging module is configured to capture the first image of the scene at a first time while the scene is sufficiently illuminated with visible light to capture visible light images of the scene including visible spectrum image detail of an object in the scene; and
the second image module is configured to capture the second image of the scene at a second time, different from the first time, while the scene is not sufficiently illuminated with visible light to capture visible light images of the scene including visible spectrum image detail of the object in the scene.

6. The system of claim 5, wherein:
the first and/or second imaging modules comprise one or more pan, tilt, and/or zoom features.

7. The system of claim 5, wherein:
the first plurality of visible spectrum sensors are configured to capture a first visible spectrum image of the scene according to a first optical axis of the first imaging module;
the second plurality of sensors comprises a second plurality of non-visible spectrum sensors configured to capture a non-visible spectrum image of the scene according to a second optical axis of the second imaging module;
the system further comprises a third imaging module comprising a second plurality of visible spectrum sensors configured to capture a second visible spectrum image of the scene according to a third optical axis of the third imaging module, wherein the first optical axis is different from the second optical axis or the second optical axis is different from the third optical axis.

8. The system of claim 7, wherein:
the first, second, and/or third imaging modules comprise one or more pan, tilt, and/or zoom features.

9. The system of claim 1, wherein:
the second plurality of sensors comprises a plurality of infrared sensors configured to capture a thermal image of the scene, the second image of the scene comprises the thermal image of the scene, and the thermal image is an unblurred thermal image of the scene;
the second imaging module is configured to capture an intentionally blurred infrared image of the scene; and
the processor is configured to determine a plurality of non-uniform correction (NUC) terms based on the intentionally blurred infrared image and apply the NUC terms to the unblurred infrared image to remove noise from the unblurred infrared image.

10. A method comprising:
receiving a first image of a scene captured by a first imaging module comprising a first plurality of sensors;
receiving a second image of the scene captured by a second imaging module comprising a second plurality of sensors;
processing the first image and the second image to generate a combined image comprising first characteristics of the scene derived from the first image and second characteristics of the scene derived from the second image, wherein the first plurality of sensors comprises a plurality of visible spectrum sensors configured to capture a visible spectrum image of the scene and the first image of the scene comprises the visible spectrum image of the scene; and
transmitting, receiving, storing, and/or processing the visible spectrum image of the scene according to an RGB color space, a YCbCr color space, a YUV color space, a color space derived through conversion from the RGB, YCbCr, and/or YUV color spaces, and/or a color space comprising an intensity component, a brightness component, and/or other color space components.

11. The method of claim 10, wherein:
the second plurality of sensors comprises a plurality of infrared sensors configured to capture a short wave infrared (SWIR) image of the scene and the second image of the scene comprises an SWIR image of the scene; and the first characteristics of the scene comprise visible spectrum characteristics of the scene and the second characteristics of the scene comprise SWIR characteristics of the scene.

12. The method of claim 10, wherein:
the second imaging module comprises a plurality of non-thermal sensors configured to capture a non-thermal image of the scene and the first second image of the scene comprises the non-thermal image of the scene;
the combined image comprises a first combined image; and
the method further comprises:
  processing the second image and a thermal image of the scene captured by a third imaging module comprising a plurality of infrared sensors configured to capture the thermal image of the scene to generate a second combined image comprising non-thermal characteristics of the scene derived from the non-thermal image and thermal characteristics of the scene derived from the thermal image; and
  displaying the first combined image or the second combined image to a user.

13. The method of claim 12, wherein:
the plurality of non-thermal sensors of the second imaging module comprises a plurality of infrared sensors configured to capture a short wave infrared (SWIR) image of the scene and the second image of the scene comprises an SWIR image of the scene; and
the non-thermal characteristics of the scene comprise SWIR characteristics of the scene.

14. The method of claim 10, wherein:
the first imaging module is configured to capture the first image of the scene at a first time while the scene is sufficiently illuminated with visible light to capture visible light images of the scene including visible spectrum image detail of an object in the scene; and
the second image module is configured to capture the second image of the scene at a second time, different from the first time, while the scene is not sufficiently illuminated with visible light to capture visible light images of the scene including visible spectrum image detail of the object in the scene.

15. The method of claim 14, wherein:
the first and/or second imaging modules comprise one or more pan, tilt, and/or zoom features.

16. The method of claim 14, wherein:
the first plurality of visible spectrum sensors are configured to capture a first visible spectrum image of the scene according to a first optical axis of the first imaging module;
the second plurality of sensors comprises a second plurality of non-visible spectrum sensors configured to capture a non-visible spectrum image of the scene according to a second optical axis of the second imaging module;
the method further comprises receiving a second visible spectrum image of the scene captured by a third imaging module comprising a second plurality of visible spectrum sensors configured to capture the second visible spectrum image of the scene according to a third optical axis of the third imaging module, wherein the first optical axis is different from the second optical axis or the second optical axis is different from the third optical axis.

17. The method of claim 16, wherein:
the first, second, and/or third imaging modules comprise one or more pan, tilt, and/or zoom features.

18. The method of claim 10, wherein:
the second plurality of sensors comprises a plurality of infrared sensors configured to capture a thermal image of the scene, the second image of the scene comprises the thermal image of the scene, and the thermal image is an unblurred thermal image of the scene; and
the method further comprises:
  receiving an intentionally blurred thermal image of the scene from the second imaging module;
  determining a plurality of non-uniform correction (NUC) terms based on the intentionally blurred infrared image; and
  applying the NUC terms to the unblurred infrared image to remove noise from the unblurred infrared image.

19. A system comprising:
a display;
a first imaging module comprising a first plurality of sensors configured to capture a first image of a scene;
a second imaging module comprising a second plurality of sensors configured to capture a second image of the scene;
a third imaging module comprising a plurality of infrared sensors configured to capture a thermal image of the scene; and
a processor configured to communicate with the first imaging module and the second imaging module and to process the first image and the second image to generate a combined image comprising first characteristics of the scene derived from the first image and second characteristics of the scene derived from the second image, wherein:
  the first imaging module comprises a plurality of non-thermal sensors configured to capture a non-thermal image of the scene and the first image of the scene comprises the non-thermal image of the scene;
  the combined image comprises a first combined image; and
  the processor is configured to communicate with the third imaging module and to process the first image and the thermal image to generate a second combined image comprising the first characteristics of the scene derived from the non-thermal image and thermal characteristics of the scene derived from the thermal image, wherein the display is configured to present the first or the second combined images to a user.

* * * * *

UNITED STATES PATENT AND TRADEMARK OFFICE
CERTIFICATE OF CORRECTION

PATENT NO.         : 10,033,944 B2
APPLICATION NO.    : 15/269905
DATED              : July 24, 2018
INVENTOR(S)        : Nicholas Högasten et al.

It is certified that error appears in the above-identified patent and that said Letters Patent is hereby corrected as shown below:

In the Specification

In the Detailed Description:

In Column 10, Line 60, change "ROTC" to --ROIC--.

In Column 11, Line 8, change "ROTC" to --ROIC--.

In Column 23, Line 27, change "factor 2" to --factor $\lambda$--.

In Column 29, Line 17, change "ROTC" to --ROIC--.

In Column 40, Line 58, change "a" to --$\alpha$--.

In the Claims

In Claim 12, Column 91, Line 8, change "the first second image" to --the second image--.

Signed and Sealed this
Fourth Day of September, 2018

Andrei Iancu
*Director of the United States Patent and Trademark Office*